United States Patent
Shigeta et al.

(10) Patent No.: US 6,266,121 B1
(45) Date of Patent: Jul. 24, 2001

(54) LIQUID CRYSTAL DISPLAY ELEMENT AND METHOD OF MANUFACTURING SAME

(75) Inventors: Mitsuhiro Shigeta; Hideki Uchida; Kazuhiko Tamai; Shuji Miyoshi, all of Kashiwa; Masami Kido, Mizunami, all of (JP)

(73) Assignees: Sharp Kabushiki Kaisha, Osaka (JP); The Secretary of State for Defence in Her Brittanic Majesty's Government of the United Kingdom of Great Britain and Northern Ireland, Hants (GB)

( * ) Notice: Subject to any disclaimer, the term of this patent is extended or adjusted under 35 U.S.C. 154(b) by 0 days.

(21) Appl. No.: 08/977,486

(22) Filed: Nov. 24, 1997

(30) Foreign Application Priority Data

| Nov. 28, 1996 | (JP) | 8-318286 |
| Nov. 28, 1996 | (JP) | 8-318313 |
| Feb. 10, 1997 | (JP) | 9-026956 |
| Feb. 14, 1997 | (JP) | 9-030963 |
| Mar. 27, 1997 | (JP) | 9-076118 |

(51) Int. Cl.$^7$ ............ G02F 1/1337; G02F 1/1339; G02F 1/13
(52) U.S. Cl. ............ 349/156; 349/123; 349/187
(58) Field of Search .............. 349/155, 156, 349/157, 187, 189

(56) References Cited

U.S. PATENT DOCUMENTS

| 3,978,580 | * | 9/1976 | Leupp et al. | 29/592 |
| 4,720,173 | * | 1/1988 | Okada et al. | 350/341 |
| 4,763,995 | * | 8/1988 | Katagiri et al. | 350/341 |
| 4,846,560 | * | 7/1989 | Tsuboyama et al. | 350/341 |
| 5,064,697 | * | 11/1991 | Takiguchi et al. | 359/76 |
| 5,089,905 | * | 2/1992 | Sasaki et al. | 359/64 |
| 5,268,782 | | 12/1993 | Wenz et al. | 359/81 |
| 5,523,128 | * | 6/1996 | Itoh et al. | 428/1 |

(List continued on next page.)

FOREIGN PATENT DOCUMENTS

| 0772071 | 5/1997 | (EP) . |
| 1434509 | 5/1976 | (GB) . |
| 61-173221 | 8/1986 | (JP) . |
| 63-116126 | 5/1988 | (JP) . |
| 2201424 | 8/1990 | (JP) . |
| 5158053 | 6/1993 | (JP) . |
| 05203970 | 8/1993 | (JP) . |
| 6331970 | 2/1994 | (JP) . |
| 06175133 | 6/1994 | (JP) . |
| 07084241 | 3/1995 | (JP) . |

OTHER PUBLICATIONS

Hideki Uchida, et al., "The Shock Stability of Ferroelectric Liquid Crystal Display (FLCD) with Spacer Wall by Two Step Annealing of Alignment Layer", 23$^{rd}$ Lecture on Liquid Crystal , University of Tokyo Engineering, Sep. 27, 1997.

R.P. Wenz, et al., "Plastic Microstructure–Spaced LCD", 3M, St. Paul, MN, SID 93 Digest, pp. 961–964 (1993).

*Primary Examiner*—Kenneth Parker
(74) *Attorney, Agent, or Firm*—Renner, Otto, Boisselle & Sklar LLP

(57) ABSTRACT

A method of manufacturing a liquid crystal display element includes the steps of (a) forming a spacer having a uniform height on a glass substrate having formed thereon scanning lines, a black matrix, an insulating layer and an alignment layer in an area to which the black matrix is projected in a direction perpendicular to a substrate surface; (b) forming an adhesive layer on a transfer substrate; (c) pressing an upper surface of the spacer against the adhesive layer on the transfer substrate; and (d) selectively applying an adhesive only onto the upper surface of the spacer by the step (c). In the step (a), it is preferable that the spacer be formed so as to have a trapezoidal cross section with respect to a plane perpendicular to the lengthwise direction.

28 Claims, 32 Drawing Sheets

U.S. PATENT DOCUMENTS

| | | |
|---|---|---|
| 5,545,280 | 8/1996 | Wenz . |
| 5,686,019 * | 11/1997 | Nakamura ............................. 349/187 |
| 5,798,813 * | 8/1998 | Ohashi et al. ........................ 349/154 |
| 5,818,560 * | 10/1998 | Kouno et al. ......................... 349/124 |
| 5,880,803 * | 3/1999 | Tamai et al. ......................... 349/156 |
| 5,929,957 * | 7/1999 | Noh ...................................... 349/187 |
| 5,952,676 * | 9/1999 | Sato et al. ............................ 349/156 |
| 5,995,191 * | 11/1999 | Tamai et al. ......................... 349/156 |

\* cited by examiner

FIG.3(a)
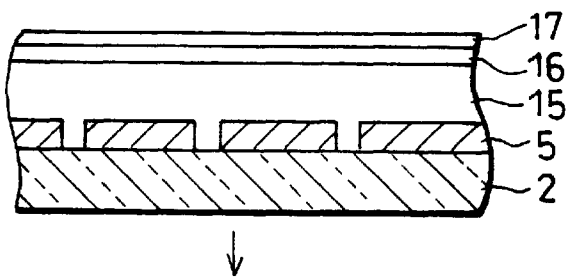
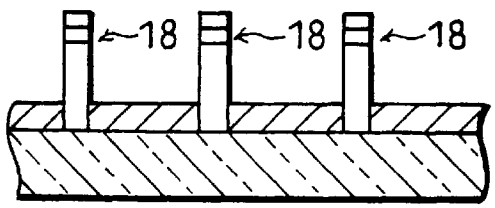
FIG.3(b)
FIG.3(c)
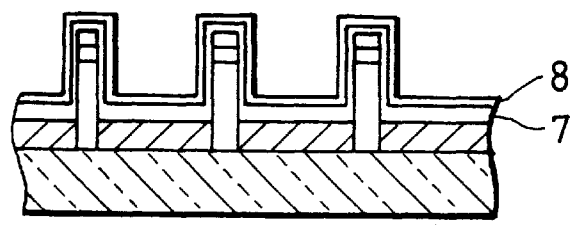
FIG.3(d)
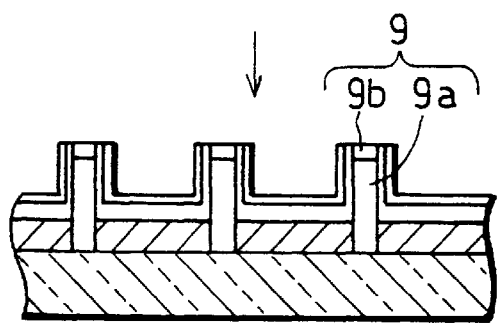
FIG.3(e)
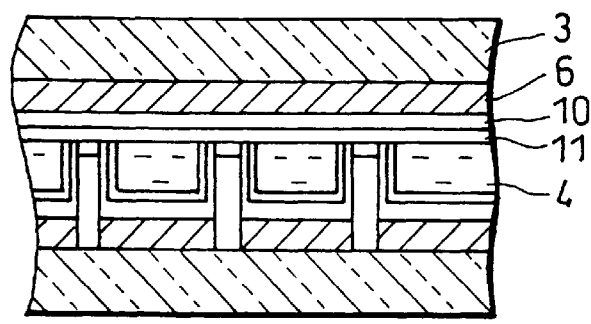

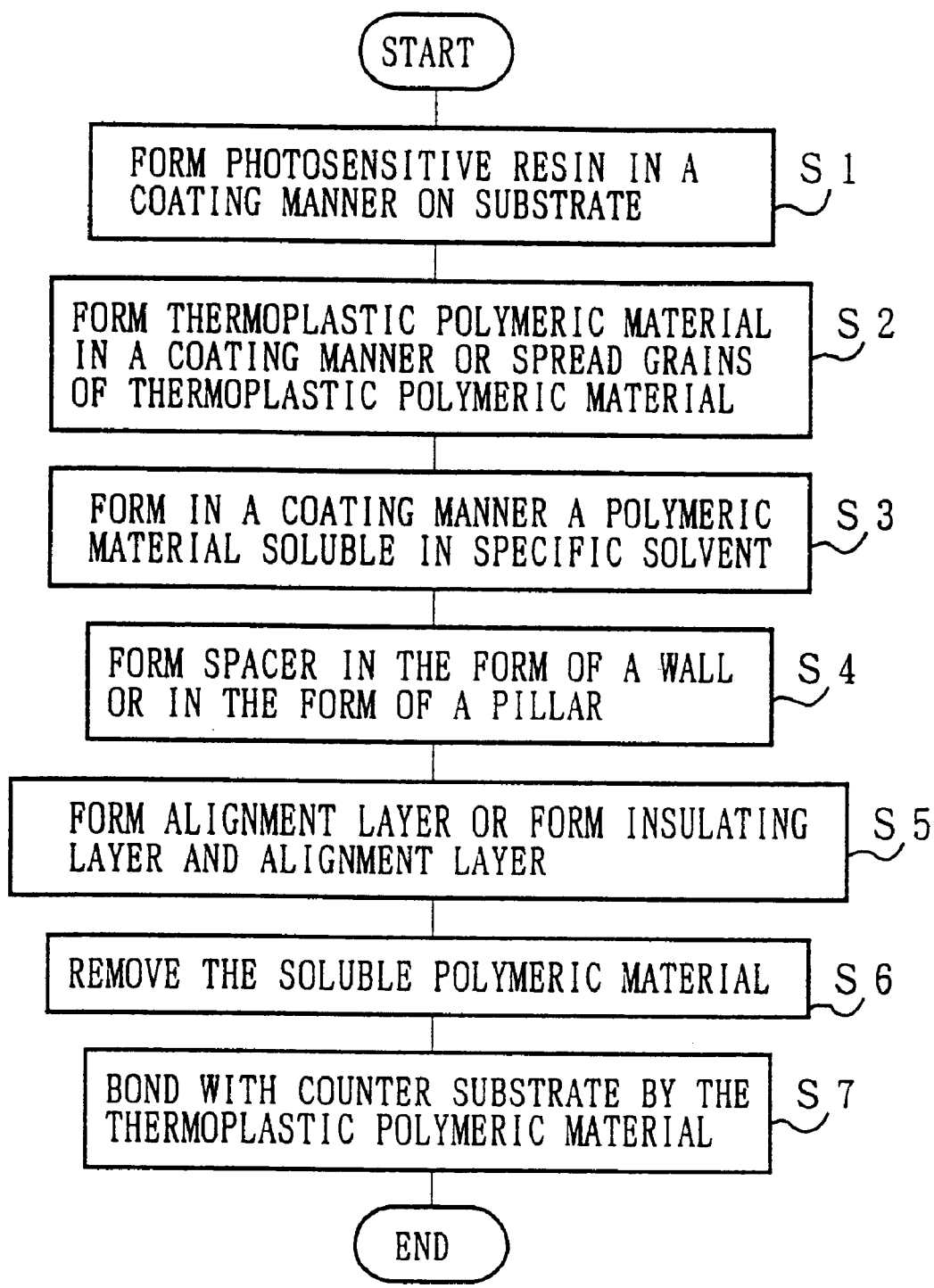

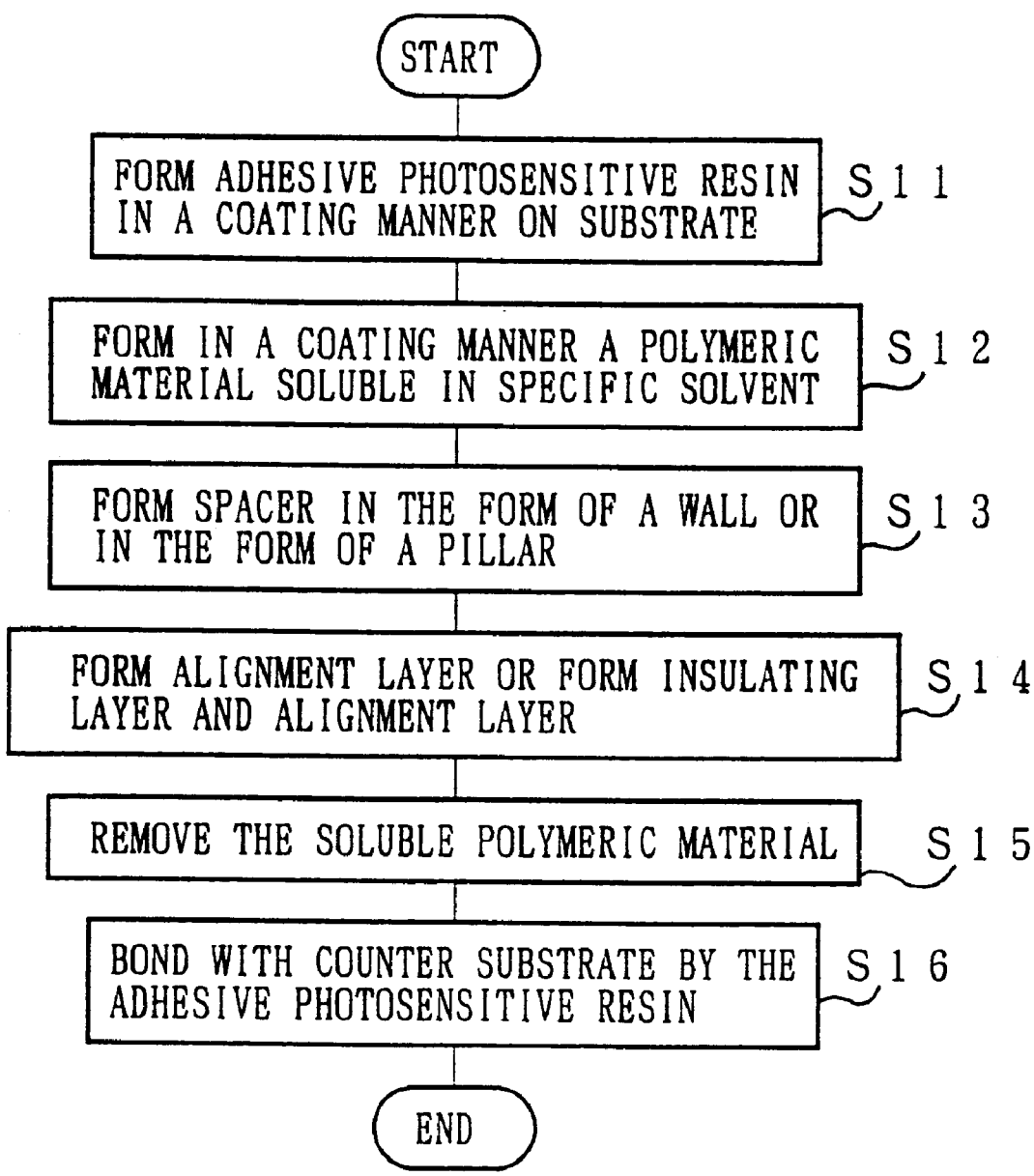

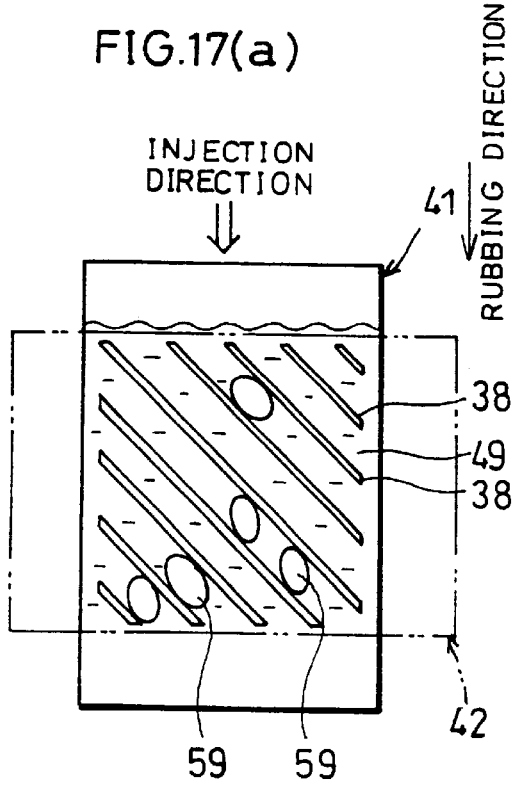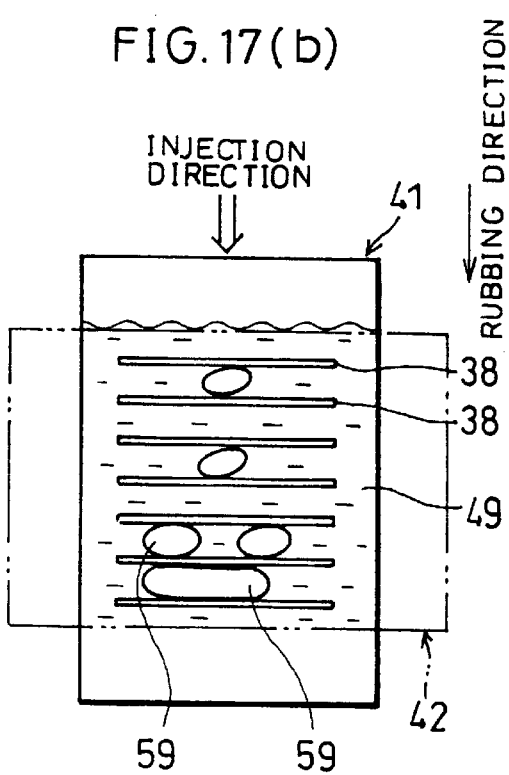

LIQUID CRYSTAL DISPLAY ELEMENT AND METHOD OF MANUFACTURING SAME

FIELD OF THE INVENTION

The present invention relates to a liquid crystal display element for use in a flat panel display, etc., and to a method of manufacturing the same, and more particularly relates to a liquid crystal display element having excellent resistance to impact and desirable display quality.

BACKGROUND OF THE INVENTION

Conventionally known display devices include liquid crystal display devices adopting a liquid crystal display element which includes a liquid crystal sandwiched between a pair of substrates, each having at least electrodes, wherein a display is performed based on an optical response of the liquid crystal by selectively applying a voltage to the electrodes. For beneficial feature which enables a thin structure, earnest researches have been made on such liquid crystal display devices as the best candidate for the flat panel display in practical applications.

A ferroelectric liquid crystal as an example of such liquid crystal has excellent characteristics in its memory effect, high speed response, wide viewing angle, etc., which permits high precision and large capacity display using a simple matrix system [N. A. Clark and S. T. Lagerwall: Appl. Phys. Lett., vol. 36(1980)899]. FIG. 30 is a cross-sectional view schematically showing one example of the conventional structure of a ferroelectric liquid crystal display device.

Conventional ferroelectric liquid crystal display device includes two glass substrates 122a and 122b. On the surface of the glass substrate 122a, a plurality of transparent signal electrodes 123a made of indium tin oxide (generally abbreviated as ITO), etc., are formed in parallel. Further, a transparent insulating layer 124a is formed on the entire surface of the glass substrate 122a so as to coat the plurality of transparent signal electrodes 123a.

On the other hand, on the surface, facing the signal electrodes, of the other glass substrate 122b, a plurality of transparent scanning electrodes 123b made of ITO, etc., are formed in parallel in a direction orthogonal to the signal electrodes 123a. These scanning electrodes 123b are also coated with a transparent insulating layer 124b made of $SiO_2$, etc.

On the transparent insulating layers 124a and 124b, alignment layers 125a and 125b having applied thereto uniaxial alignment treatment by the rubbing process, etc., are formed respectively. For these alignment layers 125a and 125b, organic polymeric layers such as polyimide layers, nylon layers, polyvinyl alcohol layers, etc., or SiO oblique vaporation layers, etc., may be used. In the case of adopting the organic polymeric layers for the alignment layers 125a and 125b, respective alignment treatments are applied in such a manner that liquid crystal molecules are aligned parallel to electrode substrates.

Hereinafter, the glass substrate 122a having formed thereon the signal electrodes 123a, the transparent insulating layer 124a, and the alignment layer 125a in this order is defined as an electrode substrate 120. Similarly, the glass substrate 122b whereon the scanning electrodes 123b, the transparent insulating layer 124b and the alignment layer 125b are laminated in this order is defined to be an electrode substrate 121.

The electrode substrates 120 and 121 are connected together by a sealing agent 126 except for a part which serves as an injection opening, to allow a ferroelectric liquid crystal 127 to be injected therethrough into the spacing formed between the alignment layers 125a and 125b. After the ferroelectric liquid crystal 127 has been injected, the injection opening is sealed with a sealing agent 130.

The electrode substrates 120 and 121 thus connected are sandwiched between polarization plates 128a and 128b. The polarization plates 128a and 128b are placed such that respective polarizing axes cross at right angle. In the case of a large display area, peripheral spacers 129 are dispersed so that the electrode substrates 120 and 121 are placed in parallel opposing each other with a predetermined cell thickness.

As shown in FIG. 31, a molecule 30 of the ferroelectric liquid crystal has a spontaneous polarization 27 perpendicular to a major molecule axis. Therefore, the molecule 30 of the ferroelectric liquid crystal rotates on a conical locus 28 by receiving a force in proportion to a vector product of (1) an electric field generated from a voltage applied across the signal electrodes 123a and the scanning electrodes 123b and (2) the spontaneous polarization 27.

Therefore, when seen from an observer, the molecule 30 of the ferroelectric liquid crystal switches between the position A and the position B of the axes of the conical locus 28. Here, for example, by arranging such that one polarization axis of the polarization plates 128a and 128b coincides with a major molecular axis direction 29a in the state the molecule 30 is switched to the position A, and the other polarization axis coincides with a direction 29b, a dark view can be achieved. On the other hand, when the molecule 30 is switched to the position B, a bright view can be achieved by birefringence.

The respective alignment states of the molecule 30 of the ferroelectric liquid crystal in the positions A and B are equivalent in terms of elastic energy. Therefore, even after the electric field is removed by the signal electrodes 123a and the scanning electrodes 123b, the alignment state and the optical state of the molecule 30 can be maintained, which is known as a memory effect of the ferroelectric liquid crystal. The described memory effect cannot be achieved from the conventional nematic liquid crystal, and the memory effect and the high speed response characteristic by the spontaneous polarization enable the ferroelectric liquid crystal display device to offer high precision and large capacity display by the simple matrix method.

In general, in the large-size liquid crystal display device, a deformation of the substrate is likely to occur due to externally applied forces such as a buckling due to a weight of the substrate itself, an impact, etc. When a thickness between the substrates opposing one another varies by a deformation of the substrates due to externally applied pressure, the alignment of the liquid crystal molecules is disturbed, and irregularities in threshold voltage are likely to occur due to a leakage of the electrode, thereby presenting a problem that a desirable display is difficult to be achieved.

In order to counteract the described problems, either one of the following methods adopting a spacer for maintaining a uniform spacing between the substrates has been adopted: (1) A method of dispersing spherical particles; and (2) A method of forming a wall in a pillar shape of an organic or inorganic series.

However, the described method (1) has the following drawbacks. Firstly, as the agglomeration of the fine particles is likely to occur, it is difficult to disperse fine particles uniformly on the substrate, which, in turn, makes it difficult to achieve a uniform cell thickness. Secondly, as it is difficult to control the position of the particles, the disturbance of alignment is likely to occur due to the particles dispersed in the pixel region, which results in the deterioration of the display quality. Thirdly, in the method (1), the substrate is supported only by a fulcrum of the spacer, and the substrates are not connected together by the spacer, a precise control of the spacing between the substrates is difficult to be achieved, and a sufficient strength for maintaining a spacing between the substrates against the externally applied pressure cannot be obtained.

As an example of the method (1), a method of dispersing adhesive particles and spacer beads simultaneously has been proposed (for example, by Japanese Unexamined Patent Publication No. 174726/1987 (Tokukaisho 62-174726)). However, in order to ensure sufficient adhesiveness for practical applications, it is required to disperse the adhesive particles and the spacer beads at high density. Moreover, a display quality may be lowered due to the spacer as dispersed.

According to the method (2), a spacer is formed in a form of a pillar shape by the photolithography using an organic or inorganic film. In this method, as a pole can be selectively formed outside the pixel region, a contact surface between the substrate and the pole can be controlled as desired. The described method (2) is superior to the aforementioned method (1) as it offers a solution to the described three problems associated with the method (1).

As an example of the method (2), Japanese Unexamined Patent Publication No. 257824/1989 (Tokukaihei 1-257824) discloses a method of forming a resin spacer material in a shape as desired, for example, by the photolithography for example.

Recently, for the liquid crystal material, the described ferroelectric liquid crystal has been viewed with interest. The ferroelectric liquid crystal has excellent characteristics such as high speed response achieved by its spontaneous polarization, or being independent of a viewing angle by a switching on the plane. In contrast, however, as the ferroelectric liquid crystal has a still closer molecule regularity to crystal, if the molecular regularity is disturbed by an externally applied pressure, an original state cannot be attained. In other words, the ferroelectric liquid crystal does not have a sufficient resistance to impact.

For the described reason, for the spacer designed for the liquid crystal display element adopting the ferroelectric liquid crystal, the method (2) is considered to be the most effective method. To be specific, the following methods are known: (a) after forming the alignment control layer of the polyimide type or polyamic acid type which is completely imidized, the spacer is formed in its upper layer and (b) after forming the spacer, the alignment control layer is formed and subjected to the rubbing process so as to combine the substrates with each other.

However, as described, in the case where the resin spacer material is formed on the alignment control layer, the following problem arises. Namely, since the alignment control layer is soiled by (1) a solvent for use in applying the spacer material on the alignment control layer, (2) the resin as the spacer material itself, and (3) the developer for use in the photolithography, the effects of the rubbing process applied to the alignment control layer are lowered, or the alignment control force with respect to the liquid crystal is lowered.

In order to counteract the described problem, an attempt is made to apply a rubbing process after the spacer is formed. However, when adopting this method, as the rubbing process is applied also to the spacer itself, a uniaxial alignment of the polymeric chain is formed on the surface of the spacer. As a result, as the liquid crystal is aligned unnecessary, another problem arises in that an abnormal alignment or a switching inferior occurs in the liquid crystal in a vicinity of the spacer.

The liquid crystal display element including a spacer in a pillar or wall shape manufactured by the conventional method has drawbacks in that an adhesive force is not generated between the upper and lower substrates, or these substrates as connected together are easy to come off.

For example, in the case of forming the alignment control layers, for example, by an imide compound such as polyimide resin, etc., it is difficult to connect respective alignment control layers made of polyimide resin together. For this reason, the polyimide resin has low response characteristics and is determined to be a relatively hard layer as a polymer layer.

When laminating the substrates by forming a spacer in a pillar shape on the alignment control layer formed on one of the substrates and making the other substrate adhere to the spacer, the adhesiveness can be achieved to some degree by adopting an adhesive resin for the spacer; however, a sufficient strength cannot be achieved, and the two substrates as laminated are likely to come off.

Moreover, in the case of adopting an organic or inorganic resin which does not apply the adhesiveness to the spacer, the upper and lower substrates cannot be connected together.

As described, an insufficient adhesiveness between the upper and lower substrates causes cell thickness deviations, which, in turn, cause a deterioration of display characteristics. Moreover, an unwanted spacing is formed between the upper and lower substrates, which allows the movement of the liquid crystal, and significantly lowers the resistance to externally applied pressure.

In order to counteract the described problem, the method of making the described spacer in a wall or pillar shape adhere to the substrate by an adhesive has been proposed. However, in the case of adopting the adhesive, if the adhesive is protruded from the pixel section, the adhesive as protruded would disturb the alignment of the liquid crystal, which give raise to another problem of the deterioration of the display quality.

For example, the method of forming the adhesive layer which serves as the spacer on the surface of the substrate (for example, as disclosed by Japanese Unexamined Patent Publication No. 116126/1988 (Tokukaisho 63-116126) is considered to be effective for improving the adhesive characteristics as well as for precisely controlling a spacing between the substrates. However, the described methods do not offer a solution to the problem that the alignment control layer is soiled in the process of forming the spacer layer on the alignment control layer, and thus the disturbance of the alignment of the liquid crystal remains unsolved.

Another arrangement wherein the adhesive layer is formed only on the spacer has been proposed as a solution to the problem of soiling the alignment control layer (see SID 93 Digest, p961–964). However, in this method, as the plastic film is adopted for the substrates, and the glass substrate which is the most generally used for the substrates of the liquid crystal display element cannot be used. Thus, a device for transferring or applying the adhesive on the substrates with a precision of sub micron order is required, and thus it is not suited for practical applications.

The conventional liquid crystal display element also has other drawbacks as will be explained through another example of the conventional liquid crystal display element in reference to FIG. 33.

As shown in FIG. 33, the conventional liquid crystal display element (liquid crystal cell) has a pair of light transmissive substrates 131 and 132 wherein a plurality of electrodes 133 and a plurality of electrodes 134 are formed respectively in a stripe shape. The electrodes 133 are formed in a direction orthogonal to the electrodes 134.

The electrodes 133 are entirely coated with an insulating layer 135 and an alignment layer 136, and light shielding members 137 are formed on both sides of each electrode 133. The electrodes 134 are entirely coated with an insulating layer 138 and an alignment layer 139, and light shielding members (not shown) similar to the liquid shielding members 137 are formed on both sides of each electrode 134.

As described, an electrode substrate 140 is prepared by forming the electrodes 133, the insulating layer 135, the alignment layer 136 and the light shielding members 137 on the substrate 131 in this order. Similarly, an electrode substrate 141 is prepared by forming the electrodes 134, the insulating layer 138, the alignment layer 139 and the light shielding members on the substrate 132 in this order.

The described electrode substrates 140 and 141 are connected together by a sealing agent 142 with a spacing between them in such a manner that respective surfaces having formed thereon the electrodes 133 and the electrodes 134 oppose each other. In the spacing, spherical spacers 143 are formed, and the liquid crystal is injected therein, thereby preparing a liquid crystal layer 144.

The spacing between the electrode substrates 140 and 141 is extremely narrow, generally in a range of from 1 to 20 µm. In order to inject the liquid crystal in such a narrow spacing, generally, either one of the following methods is adopted: (a) A method of injecting the liquid crystal under an atmospheric pressure; and (b) A method of injecting the liquid crystal under a reduced pressure.

As a concrete example of the method (a), the method of injecting the liquid crystal through a plurality of injection openings formed in the sealing agent 142 under an atmospheric pressure utilizing the capillarity is known. In this method, as air in a form of bubbles remains in the spacing after the liquid crystal is injected, the display quality deteriorates.

Specifically, the method (b) includes the first step of placing empty cells in a container a pressure of an inside of which can be reduced and reducing the pressure of the spacing formed between the electrode substrates 140 and 141 and the atmosphere, the second step of heating empty cells to or above a temperature at which liquid crystals show a nematic phase or an isotropic phase, the third step of sealing the injection opening with the liquid crystal, and the fourth step of increasing the pressure to the original atmospheric pressure. In the described method, as the injection opening is sealed with the liquid crystal in the third step, the pressure in the spacing between the substrates can be kept at a reduced pressure even after increasing the pressure back to the atmospheric pressure in the fourth step, thereby causing a difference in pressure from the atmosphere.

As described, according to the described method (b), as liquid crystals are deformed between the substrates by reducing pressure, an amount of residual foams can be reduced compared with the case of adopting the method (a), and the method (b) offers superior display quality to that achieved by the method (a).

The inventors of the present invention has examined the effects of an angle formed by the injection direction and the rubbing direction on alignment characteristics, and have found that when varying the angle for each pixel, a uniform alignment cannot be obtained.

As shown in FIG. 34(a) and FIG. 34(b), in the conventional injection method, when injecting a liquid crystal 115 through an injection opening 116, the liquid crystal is spread in a fan shape. Therefore, it is difficult to control an angle formed by the injection direction and the rubbing direction. As described, in the conventional method, as the angle differs for each pixel, the liquid crystal 115 becomes in disorder, which, in turn, may impair a display quality.

Moreover, in the case of injecting the liquid crystal in the manner shown in FIG. 34(a) and FIG. 34(b), a long time is required. For this reason, when injecting the liquid crystal by the method (b) using a liquid crystal compound of low boiling point, after the liquid crystal composition is placed under reduced pressure for a long period of time, the liquid crystal volatizes, thereby presenting the problem that the liquid crystal composition deviates. On the other hand, in the liquid crystal display element of FIG. 34(b) having a plurality of injection openings 116, the liquid crystal 115 does not move into a vicinity of both ends of the sealing agent 142 close to the injection opening 116, and a liquid crystal non injected area 117 appears. The described deficiency with regard to the injection of the liquid crystal causes the deterioration of the display quality.

On the other hand, when the adhesive force generated between the electrode substrates 140 and 141 by the sealing agent 142 is not sufficient, due to changes in temperature of the panel and the pressure in the injection process and also depending on an amount of the liquid crystal injected, the spacing between the electrode substrates 140 and 141 differs before and after the injection, thereby causing a non-uniform cell gap. As described, when the adhesive force between the electrode substrates 140 and 141 is not sufficient, a precise control of the cell gap may be difficult to be achieved.

In the conventional liquid crystal display element shown in FIG. 33, as the spacers 143 are dispersed in a spacing between the electrode substrates 140 and 141, the effect of reducing the impact is weak, and for this deficiency, the conventional liquid crystal display element shown in FIG. 33 is not suited for the ferroelectric liquid crystal.

SUMMARY OF THE INVENTION

An object of the present invention is to provide a liquid crystal display element having a uniform cell thickness which enables a sufficient resistance to impact and desirable and uniform display quality by firmly connecting upper and lower substrates together.

In order to achieve the above object, the first manufacturing method of the present invention for a liquid crystal display element which includes a liquid crystal sandwiched between a pair of substrates, each having at least electrodes and an alignment layer, is characterized by including the steps of:

(a) forming along a lengthwise direction of the electrodes a spacer wall on the alignment layer on one of the pair of substrates, the spacer wall having a uniform height and a trapezoidal cross section with respect to a plane perpendicular to the lengthwise direction so that a lower surface corresponding to a longer base of the trapezoidal cross section contacts the alignment layer;

(b) applying an adhesive onto a flat transfer substrate;

(c) transferring the adhesive from the transfer substrate to an upper surface of the spacer wall by pressing the upper surface against the transfer substrate having the adhesive applied thereto, the upper surface of the spacer wall corresponding to a shorter base of the trapezoidal cross section; and (d) making the other of the pair of substrates adhere to the adhesive transferred to the upper surface.

According to the described manufacturing method, as a pair of substrates are connected together using the adhesive, an improved resistance of the substrates against external forces such as compression, tensile force, etc., can be achieved, and the method offers a solution to the problem of deteriorating the display quality due to cell thickness deviations associated with the conventional arrangement.

As the adhesive is selectively applied only on the upper surface of the spacer wall, adverse effects of the adhesive on the alignment of the liquid crystal in the pixel region can be prevented. Furthermore, even if the adhesive is protruded from the upper surface of the spacer wall, as the spacer wall has a trapezoidal cross section, the adverse effects of the adhesive as protruded from the upper surface of the spacer wall on the liquid crystal does not extend beyond the lower surface of the spacer wall. As a result, a liquid crystal display element which enables improved strength of the substrates without giving rise to disturbance of alignment of the liquid crystal and offers excellent display quality can be achieved.

In order to achieve the object of the present invention, the second manufacturing method of the present invention for a liquid crystal display element which includes a liquid crystal sandwiched between a pair of substrates, each having at least electrodes and an alignment layer, is characterized by including the steps of:

(a) forming along a lengthwise direction of the electrodes a spacer wall on the alignment layer on one of the pair of substrates, the spacer wall having a uniform height and a trapezoidal cross section with respect to a plane perpendicular to the lengthwise direction so that a lower surface corresponding to a longer base of the trapezoidal cross section is positioned on a side of the one of the pair of substrates;

(b) forming an alignment layer so as to cover the spacer wall;

(c) applying an adhesive onto a flat transfer substrate;

(d) transferring the adhesive from the transfer substrate to an upper surface of the spacer wall by pressing the upper surface against the transfer substrate having the adhesive applied thereto, the upper surface of the spacer wall corresponding to a shorter base of the trapezoidal cross section; and (e) making the other of the pair of substrates adhere to the adhesive transferred to the upper surface.

According to the described manufacturing method, as the pair of substrates are connected together using the adhesive, an improve resistance of the substrates against external forces such as compression, tensile force, etc., can be achieved. Additionally, as the alignment layer is formed so as to cover the spacer wall, the liquid crystal can be aligned more desirably without giving rise to disturbance of alignment of the liquid crystal in a vicinity of the spacer wall compared with the above-defined first method of manufacturing a liquid crystal display element.

As the adhesive is selectively applied only on the upper surface of the spacer wall, adverse effects of the adhesive on the alignment of the liquid crystal in the pixel region can be prevented.

Furthermore, even if the adhesive is protruded from the alignment layer which covers the upper surface of the spacer wall, as the spacer wall has a trapezoidal cross section, the adverse effects of the adhesive as protruded from the alignment layer does not extend beyond the lower surface of the spacer wall. As a result, a liquid crystal display element which enables an improved resistance of the substrates without giving rise to disturbance of alignment of the liquid crystal and which offers excellent display quality can be achieved.

In order to achieve the above object, the first liquid crystal display element of the present invention, which includes a liquid crystal sandwiched between a first substrate and a second substrate, each having at least electrodes and an alignment layer, is characterized by including:

a spacer wall formed along a lengthwise direction of the electrodes on the alignment layer formed on the first substrate, the spacer wall having a uniform height and a trapezoidal cross section with respect to a plane perpendicular to the lengthwise direction, wherein a lower surface of the spacer wall corresponding to a longer base of the trapezoidal cross section contacts the alignment layer on the first substrate, and the spacer wall is made adhere to the second substrate by an adhesive applied only onto the upper surface of the spacer wall corresponding to a shorter base of the trapezoidal cross section.

According to the described arrangement, as the pair of substrates are connected together using the adhesive, an improved resistance of the substrates against external forces such as compression, tensile force, etc., can be achieved, and the arrangement offers a solution to the problem of deteriorating the display quality due to cell thickness deviations associated with the conventional arrangement.

As the adhesive is selectively applied only on the upper surface of the spacer wall, adverse effects of the adhesive on the alignment of the liquid crystal in the pixel portion can be prevented. Furthermore, even if the adhesive is protruded from the upper surface of the spacer wall, as the spacer wall has a trapezoidal cross section, the adverse effects of the adhesive as protruded from the upper surface of the spacer wall on the liquid crystal does not extend beyond the lower surface of the spacer wall. As a result, a liquid crystal display element which enables improved resistance of the substrates without giving rise to disturbance of alignment of the liquid crystal and which offers excellent display quality can be achieved.

In order to achieve the above object, the second liquid crystal display element of the present invention is characterized by including:

a liquid crystal sandwiched between a pair of substrates, each having at least electrodes and an alignment layer; and a spacer wall formed along a lengthwise direction of the electrodes on the alignment layer formed on one of the pair of substrates, the spacer wall having a uniform height and a trapezoidal cross section with respect to a plane perpendicular to the lengthwise direction, wherein the alignment layer formed on the one of the pair of substrates provided with the spacer wall is provided so as to cover the spacer wall, and an adhesive is applied to the alignment layer at a portion which covers a surface corresponding to a shorter base of the trapezoidal cross section, and the other of the pair of substrates is made adhere to the adhesive.

According to the described arrangement, as a pair of substrates are connected together using the adhesive, improved resistance of the substrates against external forces such as compression, tensile force, etc., can be achieved, and the described arrangement offers a solution to the problem of deteriorating the display quality due to cell thickness deviations associated with the conventional arrangement.

Additionally, as the alignment layer is formed so as to cover the spacer wall, the liquid crystal can be aligned more desirably without giving rise to disturbance of alignment of the liquid crystal in a vicinity of the spacer wall compared with the above-defined first liquid crystal display element.

As the adhesive is selectively applied only on the upper surface of the spacer wall, adverse effects of the adhesive on the alignment of the liquid crystal in the pixel region can be prevented.

Furthermore, even if the adhesive is slightly protruded from the alignment layer which covers the upper surface of the spacer wall, as the spacer wall has a trapezoidal cross section, the adverse effects of the adhesive as protruded from the alignment layer does not extend beyond the lower surface of the spacer wall. As a result, a liquid crystal display element which enables improved resistance of the substrates without giving rise to disturbance of alignment of the liquid crystal and which offers excellent display quality can be achieved.

In order to solve the above object, the third liquid crystal display element of the present invention is characterized by including:

a pair of substrates; alignment control layers formed on the pair of substrates respectively;

a liquid crystal sandwiched between the pair of substrates; and a spacer in a pillar or wall shape formed on at least one of the pair of substrates, wherein at least one of the alignment control layers is made of thermally polymerizable polyamic acid resin, and the pair of substrates are connected together by a heat treatment.

According to the described arrangement, as the pair of substrates are connected together while maintaining a uniform spacing between them by the spacer in a pillar or wall shape, a uniform cell thickness can be achieved. Moreover, an improved resistance against impact, pressure, etc., can be achieved compared with the arrangement of adopting the conventional method of dispersing granular spacer on the substrate.

Furthermore, the alignment control layer formed on at least one of the substrates is made of the thermally polymerizable polyamic acid resin, a portion which becomes softened or welds with an application of the heat treatment adheres to the other substrate, thereby achieving a strong adhesive force between the pair of substrates. Additionally, the contact surface of the other substrate with the alignment control layer made of the thermally polymerizable polyamic acid resin may be the alignment control layer or the spacer formed on the other substrate when necessary.

Especially, in the case where the alignment control layers formed on the pair of substrates respectively are made of the thermally polymerizable polyamic acid resin, and these alignment control layers are made adhere to each other, the imidization is promoted at the contact portion between the alignment control layers, and a strong adhesive force is generated by the chemical bond.

As the polyamic acid resin includes a hydroxyl group and a hydrogen group in a molecule, when the alignment control layer made of the polyamic acid resin adheres to the spacer formed on the other substrate, an adhesive force is generated by the intermolecular bond exerted between the hydroxyl groups and the hydrogen groups on the side of the alignment control layer and the functional groups in the spacer. Similarly, the intermolecular bond exerted between the amino group and other functional groups contained in the alignment control layer also offers an effect of improving the adhesiveness.

Furthermore, with an application of the heat treatment, the polyamic acid resin and the other substrate weld together, thereby achieving an improved adhesiveness between the pair of substrates.

As described, in the described arrangement, the substrates are connected together via the spacer in a pillar or wall shape using a strong adhesive force of the alignment control layer made of polyamic acid resin, thereby providing a liquid crystal display element which has a uniform cell thickness, a high resistance to impact, and a quality display.

The third liquid crystal display element may be arranged such that the alignment control layer is formed in an upper layer than the spacer, and that the alignment control layer formed on one of the pair of substrates is made adhere to an alignment control layer formed on the other of the pair of substrates.

In the described arrangement, the spacer in a pillar or wall shape provided on at least one of the substrates is covered with the alignment control layer of respective substrates. Namely, in the manufacturing process of the substrates, because the spacer is formed before the alignment control layer is formed, the alignment layer is prevented from soiled or damaged by a solvent or developer generally adopted in a spacer forming process, thereby providing a liquid crystal display element capable of high quality displaying without nonuniformity.

Also, in the case where a baking step is required in forming the spacer, it is possible to adopt a spacer material requiring a baking temperature higher than the baking temperature of the alignment control layer, thereby having an advantage in that a spacer material can be selected from a variety of different materials.

The third liquid crystal display element may be arranged such that an alignment control layer made of thermally polymerizable polyamic acid resin is made adhere to the tip part of the spacer formed on the other substrate.

According to the described arrangement, the pair of substrates are connected together by a bonding of the alignment control layer made of thermally polymerizable polyamic acid resin and the spacer. Additionally, on each substrate, electrodes, a light shielding layer and an insulating layer, etc., can be formed when necessary. According to the described arrangement, as the alignment control layer is made of thermally polymerizable polyamic acid resin which shows excellent adhesive properties, the pair of substrates can be firmly connected together irrespectively of the material of the spacer.

For example, in the case of adopting the alignment control layer of the polyimide type, as the polyimide itself does not have the adhesive property, sufficient adhesiveness between the substrates cannot be obtained. Especially, in the case of forming the spacer by an inorganic material which does not have adhesive properties, the adhesiveness between the substrates is greatly lowered.

In contrast, according to the described arrangement of the present invention, as the pair of substrates are firmly connected together, a uniform cell thickness can be achieved, thereby providing a liquid crystal display element which offers an improved resistance to impact and a high quality display.

The third liquid crystal display element may be arranged such that the liquid crystal is a ferroelectric liquid crystal.

For its spontaneous polarization and a memory effect, the ferroelectric liquid crystal enables a high speed response. On the other hand, the ferroelectric liquid crystal, compared with the nematic liquid crystal, etc., for example, has a molecular alignment closer to crystal. Thus, when the alignment of the molecules is once disturbed, it is difficult to restore the original state. Namely, the ferroelectric liquid crystal has a low resistance to impact. In order to ensure a desirable display quality, it is required to achieve a uniform cell thickness with very high precision.

As the described arrangement enables a uniform cell thickness and improved resistance to impact, the deficiencies of the ferroelectric liquid crystal are compensated, and by adopting the ferroelectric liquid crystal having excellent properties, the arrangement enables a liquid crystal display element which offers a large capacity and high precision image display for practical applications.

In order to achieve the above object, the third manufacturing method of the present invention for a liquid crystal display element which includes a liquid crystal sandwiched between a pair of substrates is characterized by including the steps of:

(a) forming an alignment control layer on at least one of the pair of substrates by applying thereto thermally polymerizable polyamic acid resin and baking it; and (b) connecting the pair of substrates together by baking them.

The described third manufacturing method includes the baking process (a) for the formation of the alignment control layer and the baking process (b) for connecting the substrates together. As described, by performing the first baking process for the formation of the alignment control layer and the second baking process for connecting the substrates after applying a rubbing process, etc. if necessary, a strong adhesive force can be applied to the polyamic acid resin, thereby firmly connecting the pair of substrates together.

The adhesive force generated from the alignment control layer made of polyamic acid resin with the other substrate mainly includes (1) an intermolecular bond exerted between (a) a hydroxyl group, a hydrogen group and an amino group which remain unreacted in the polyamic acid resin and (b) a functional group on a contact surface of the other substrate opposing the aforementioned substrate; and (2) a welding force generated from the contact surface by heat generated from the second baking process.

Especially, in the case where the alignment control layers made of the thermally polymerizable polyamic acid resin are formed on both of the pair of substrates, and these alignment control films are made adhere to each other, (3) a chemical bond generated by a condensation polymerization from the polyamic acid to the polyimide generated between the alignment control films on the pair of substrates, which serve as the contact surfaces is added to the described adhesive force, thereby achieving a still improved adhesiveness between the pair of substrates.

As described, according to the described manufacturing method, as the pair of substrates are firmly connected together, a liquid crystal display element which enables a uniform cell thickness and an excellent resistance to impact and which offers a high quality display can be achieved.

The described third manufacturing method may be arranged so as to further includes the step of:

forming a spacer in a wall or pillar shape on at least one of the pair of substrates before carrying out the step (a), wherein in the step (a), alignment control layers made of thermally polymerizable polyamic acid resin are formed on the pair of substrates respectively, and in the step (b), the alignment control layers formed on the pair of substrates respectively are made adhere to each other on an upper surface of the spacer by baking them at a higher baking temperature than a baking temperature in the step (a).

The described manufacturing method is effective in increasing the adhesive force generated by the imidization (polymerization) of the polyamic acid between the alignment control layers formed on the pair of substrates respectively. Namely, as shown in FIG. 26, the baking temperature and the imidization ratio have such relationship that the higher is the baking temperature, the higher is the imidization ratio.

Thus, by carrying out the baking in the step (b) (combining substrates) at a temperature higher than the baking temperature of the step (a) (forming alignment control layers), it is possible to promote imidization in the step (c). Namely, chemical bonding due to imidization is generated when combining the substrates, thereby making it possible to obtain a high bonding strength.

Additionally, by forming the spacer before the formation of the alignment control layers, the alignment control layers can be prevented from being soiled or damaged by a solvent or a developing solution which is generally used in the process of forming the spacer. Furthermore, in the case where a baking process is required for the formation of the spacer, a material having a higher baking temperature than the alignment control layer can be used, thereby providing a wider selection for the material of the spacer. In this manufacturing method, electrodes, a light shielding layer or an insulating layer may be formed if necessary before carrying out the step (a).

It is preferable that the third method of manufacturing a liquid crystal display element satisfies the condition of:

$$10 \leq b-a \leq 90,$$

wherein an imidization ratio of the thermally polymerizable polyamic acid resin at the baking temperature in the step (a) is "a" percent, and an imidization ratio of the thermally polymerizable polyamic acid resin at the baking temperature in the step (b) is "b" percent.

According to the described arrangement of the third manufacturing method, the second baking process for the substrate connecting process (step (b)) is carried out at a higher baking temperature than that of the baking process for the formation of the alignment control layers (step (a)).

As described, by performing the second baking process at higher temperature than the first baking process, an imidization in the second baking process is promoted, and also a chemical reaction at the contact surface between the alignment control layer on one substrate and the alignment control layer on the other substrate is promoted, thereby making these two alignment control layers adhere to each other. Here, the grater is the difference between the baking temperature in the first baking process and the baking temperature in the second baking process, the more promoted is the imidization in the second baking process, and the greater is the resulting adhesiveness.

Specifically, by selecting the respective baking temperatures such that a difference between the imidization ratio a (%) at the baking temperature in the step (a) and the imidization ratio b (%) at the baking temperature in the step (b) falls with in a range of 10 to 90 percent, a desirable adhesiveness can be obtained. Additionally, the greater is the difference in imidization ratio, the more is promoted a chemical bond by the imidization of the thermally polymerizable polyamic acid resin in the step (b), and the stronger is the adhesive force between the pair of substrates. As a result, a liquid crystal display element which enables a uniform cell thickness and a desirable display quality can be achieved.

The described third manufacturing method can be applied to thermally polymerizable polyamic acid resin having an imidization ratio at the baking temperature in the step (a) in a range of 10 to 50 percent.

In this case, after the baking process in the step (a), from 50 to 90 percent of unreacted groups remain in the alignment control layer made of the thermally polymerizable polyamic acid resin. Namely, as a large amount of residue of unreacted groups which can be bonded to the surface of the alignment control layer remains, the imidization in the step (b) can be promoted, and a stronger adhesiveness between the pair of substrates can be achieved. As a result, a liquid crystal display element which enables a uniform cell thickness and a desirable display quality can be achieved.

The third manufacturing method can be applied to a thermally polymerizable polyamic acid resin having an imidization ratio at the baking temperature in the step (b) in a range of 50 to 100 percent.

In this case, in the step (b), the imidization of the alignment control layer made of the thermally polymerizable polyamic acid resin is promoted, and a still stronger adhesiveness between the pair of substrates can be achieved. As a result, a liquid crystal display element which enables a uniform cell thickness and a desirable display quality can be achieved.

The third manufacturing method may be arranged such that the baking temperature in the step (a) is equal to the baking temperature in the step (b).

When adopting the described method, compared with case of adopting the method wherein the second baking process is carried out at higher baking temperature than that in the first baking step, the resulting adhesiveness between the substrates is lowered; however, for the liquid crystal display element which does not require a significant mechanical strength, the pair of substrates can be connected together with a sufficient adhesiveness. There is a correlation between the alignment of the liquid crystal and the baking temperature of the alignment control layer, and the baking temperature of the alignment layer which offers a desirable alignment of the liquid crystal is determined by the kind and the composition of the liquid crystal. Therefore, with an optimal selection of the baking temperature in the step (a) and the baking temperature in the step (b) for the kind and the composition of the liquid crystal, a desirable liquid crystal display element in terms of both the adhesiveness of the substrates and the alignment of the liquid crystal can be achieved.

In order to achieve the object of the present invention, the fourth liquid crystal display element in accordance with the present invention is characterized by including:

a pair of substrates placed opposing each other, and a liquid crystal sealed between the pair of substrates, wherein each of the pair of substrates includes electrodes for applying a voltage to the liquid crystal and an alignment control layer for controlling an alignment of the liquid crystal, the alignment control layer being formed so as to cover the electrodes, a spacer for connecting the pair of substrates together while maintaining a predetermined spacing between them is formed in a wall or pillar shape, the spacer being formed in an area between adjoining electrodes formed on one of the pair of substrates, and the alignment control layers are formed on the pair of substrates respectively after the spacer is formed.

According to the described arrangement, by controlling and adjusting the height of the spacer in a wall or pillar shape, a spacing between the pair of substrates can be controlled and adjusted to the entire surface with precision, thereby maintaining a spacing between the substrates as desired with high precision.

Additionally, as the substrates can be connected by a stronger adhesive force, an improved resistance to impact can be achieved, and the substrates can be connected and fixed with a predetermined spacing between them. For the described beneficial features, the described arrangement is suited for a large size panel, or a display adopting a ferroelectric liquid crystal which requires a uniform spacing between the substrates to be maintained with high precision.

Furthermore, it is not arranged such that the spacer is placed on the alignment control layer but arranged such that the alignment control layer is formed after the formation of the spacer. As this permits the alignment control layer from being soiled or deteriorating due to the formation of spacer, a liquid display element which enables a high quality display without giving rise to the disturbance of the alignment of the liquid crystal can be achieved.

In the fourth liquid crystal display element, it is preferable that the pair of substrates be connected together in the described manner. That is, the spacer includes an adhesive material required for connecting the pair of substrates, and after the formation of the spacer, the alignment control layer is formed not only on the electrode but also on the spacer. Then, the alignment control layer on the tip portion of the spacer is removed, thereby connecting the pair of substrates together by the adhesive material thus exposed.

As described, the alignment control layer is formed on the substrate after the formation of the spacer including the adhesive, and the pair of substrates are connected together by the adhesive exposed by removing the alignment control layer applied to the spacer. As a result, the fourth liquid crystal display element can be manufactured without requiring the processes of transferring and applying the adhesive only on the spacer after the formation of the alignment control layers. Moreover, the kinds of the substrates are not limited by the described processes.

The fourth liquid crystal display element may be arranged such that a base portion of the spacer is made of photosensitive resin, and a tip portion of the spacer is made of a thermoplastic polymeric material, and the pair of substrates are connected together by the thermoplastic polymeric material.

According to the described arrangement, the thermoplastic polymeric material used in the tip portion of the spacer serves as an adhesive layer (adhesive material), and a pair of substrates are connected together by the adhesive layer. As a result, a strong adhesive force can be generated between the substrates, and even under an unwanted applied external force, a predetermined spacing between the substrates can be maintained.

The fourth liquid crystal display element may be arranged such that the spacer is made of photosensitive resin having adhesive properties, and the pair of substrates are connected together by the photosensitive resin.

According to the described arrangement, the photosensitive resin as a material for the spacer has adhesive properties, and a pair of substrates are connected together by the photosensitive resin having the adhesive properties. As a result, a still stronger adhesive force can be achieved between the substrates, and even under an unwanted applied external pressure, the substrates can be connected and fixed at a predetermined spacing between them.

In the arrangement of the fourth liquid crystal display element, it is desirable that the liquid crystal is a ferroelectric liquid crystal.

As described, for the display element adopting the ferroelectric liquid crystal, it is required to maintain a constant spacing between the substrates at high precision, and the described arrangement of the fourth liquid crystal display element is suited for such display element. For the display element adopting the ferroelectric liquid crystal, due to the flow of the liquid crystal under an externally applied pressure, the element may become out of use. In contrast, by providing the spacer in the stripe shape, such flow of the liquid crystal can be effectively prevented.

As described, the fourth liquid crystal display element is not arranged so as to place the spacer on the alignment control layer, and the alignment control layer can be prevented from being soiled or deteriorating when manufacturing the display element. As a result, disturbances on the alignment of the liquid crystal can be prevented. Also in this point, the described arrangement is suited for the ferroelectric liquid crystal display element which requires a precise control of the alignment compared with the nematic liquid crystal.

In order to achieve the object of the present invention, the fourth manufacturing method of the present invention for a liquid crystal display element is characterized by including the steps of:

(a) forming on one of the pair of substrates the spacer in a wall or pillar shape, at least a tip portion of the spacer being made of a material which exhibits adhesive properties by a heat treatment in a state where a dissolvable layer of a material dissolvable in a predetermined solvent is laminated on the tip portion;

(b) forming an alignment control layer so as to cover the spacer and the dissolvable layer;

(c) removing the dissolvable layer together with the alignment control layer formed thereon by dissolving them in the predetermined solvent; and (d) connecting the tip portion of the spacer and the other one of the pair of substrates at or in a vicinity of a glass transition point of the material used in the tip portion of the spacer.

According to the fourth manufacturing method, after forming on one of the substrates the spacer at least the tip portion of which is made of a material which exhibits adhesive properties by the heat treatment is formed in a state where the dissolvable layer is laminated on the tip portion, the alignment control layer is laminated on the spacer and the dissolvable layer, i.e., on the entire surface of the substrate. If necessary, an insulating layer etc. may be formed before the formation of the alignment control layer. As described, by removing the dissolvable layer after the alignment control layer is laminated, the tip portion made of the material which exhibits the adhesive properties by the heat treatment can be exposed. Then, by pressing the other substrate against the tip portion thus exposed, a pair of substrates can be connected together.

As described, according to the fourth manufacturing method, the spacer is formed on the substrate before the formation of the alignment control layer. Therefore, in the manufacturing process, the alignment control layer can be prevented from being soiled or deteriorating, thereby preventing the disturbance of the alignment of the liquid crystal. The material for the spacer to be formed before the formation of the alignment control layer includes the adhesive material required for connecting the two substrates together. This permits the complicated processes for transferring and applying the adhesive only on the spacer before the formation of the alignment control layer to be omitted from the conventional method.

According to the described arrangement, by controlling and adjusting the height of the spacer in a wall or pillar shape, a spacing between the pair of substrates can be controlled and adjusted to the entire surface with precision, thereby maintaining a uniform spacing between the substrates as desired with high precision.

Additionally, as the substrates can be connected together with stronger adhesiveness, an improved resistance to impact can be achieved, and the substrates can be connected and fixed with a predetermined spacing between them. For the described beneficial features, the described method is suited for manufacturing a large size panel, or a display adopting a ferroelectric liquid crystal which requires a uniform spacing between the substrates to be maintained with high precision.

In order to achieve the above object, the fifth manufacturing method of the present invention for a liquid crystal display element is characterized by including:

a first step of forming photosensitive resin in a form of a coat after forming electrodes on a substrate;

a second step of dispersing either a first polymeric material having thermoplasticity or powders of the first polymeric material onto the photosensitive resin; and a third step of forming a second polymeric material in a form of a coat which is dissolvable in a predetermined solvent on the first polymeric material; and a fourth step of forming an original spacer in a stripe or pillar shape from residues of the photosensitive resin, the first polymeric material and the second polymeric material, remaining after removing them from regions other than a predetermined region;

a fifth step of laminating on the electrodes and the original spacer, either (i) an alignment control layer or (ii) an insulating layer and an alignment control layer in this order;

a sixth step of removing either (i) the alignment control layer or (ii) the insulating layer and the alignment control layer from the original spacer, by stripping the second polymeric material; and a seventh step of connecting the substrate and another substrate together by making them adhere to each other at or in a vicinity of a glass transition point of the first polymeric material.

According to the described method, after the electrodes are formed, in order to form the original spacer, the photosensitive resin, the first polymeric material and the second polymeric material are formed in this order. Then, after the original spacer is formed, on the electrodes and the spacer, the alignment control layer, etc., are laminated on the entire surface of the substrate. After the alignment control layers, etc., are laminated, in the sixth step, the original spacer is formed into a spacer made of photosensitive resin and the first polymeric material, and the two substrates are connected together using first polymeric material.

As described, according to the described method, before the formation of the alignment control layer, the material for use in the spacer is formed on the substrate. Therefore, the alignment control layer can be prevented from being soiled or deteriorating, thereby preventing the disturbance of the alignment of the liquid crystal. Additionally, as the material for the spacer to be formed before the formation of the alignment control layer includes the adhesive required for connecting the two substrates together, the complicated processes for transferring and applying the adhesive only on the spacer before the formation of the alignment control layer can be omitted from the conventional method.

According to the described arrangement, by controlling and adjusting the height of the spacer in a wall or pillar shape, a spacing between the pair of substrates can be controlled and adjusted to the entire surface with precision, thereby maintaining a spacing between the substrates as desired with high precision.

Additionally, as the substrates can be connected together with a stronger adhesiveness, an improved resistance to impact can be achieved, and the substrates can be connected and fixed with a predetermined spacing between them. For the described beneficial features, the described method is suited for manufacturing a large size panel, or a display adopting a ferroelectric liquid crystal which requires a uniform spacing between the substrates to be maintained with high precision.

The described fifth manufacturing method of a liquid crystal display element may be arranged such that in the second step, the first polymeric material is not formed, and in the first step, photosensitive resin having adhesive properties is formed in a form of a coat, and in the seventh step, the two substrates are connected together at or in a vicinity of a glass transition point of the photosensitive resin having adhesive properties.

In the described arrangement, the photosensitive resin having adhesive properties is adopted, and the two substrates are connected together using the photosensitive resin. As this permits a still stronger adhesive force to be generated between the substrates, even under an unwanted applied external pressure, the substrates can be connected and fixed with a predetermined spacing between them.

In order to achieve the above object, the fifth liquid crystal display element which includes a liquid crystal sandwiched between a pair of substrates, each having at least electrodes, is characterized by including:

an alignment control layer, and a spacer in a wall or pillar shape on the alignment control layer, the spacer being made of an organic material having a shape memory.

According to the described arrangement, even if the rubbing process is applied after the formation of the spacer, by subsequently applying the heat treatment, the effect of the rubbing process on the spacer, which causes the abnormality in the alignment of the liquid crystal in a vicinity of the spacer, can be eliminated, thereby improving the alignment of the liquid crystal. As a result, the liquid crystal display element which permits high quality display without irregularities in the alignment or the switching inferior of the liquid crystal.

Additionally, as the spacer is formed in a wall or pillar shape, for example, compared with the case where the spherical spacers such as glass beads, etc., are dispersed, an improved resistance to pressure can be achieved, thereby enabling a large size panel to be manufactured.

The explanations on the shape memory are given below.

For many polymeric materials, a temperature region called glass transition point (Tg) which is defined for each material is known.

For example, when an external force is applied at or above a glass transition point to the object made of a certain polymeric material, the polymeric chains are aligned in the direction of the externally applied force, and as a result, the object is deformed. In this state, by cooling off the object below the glass transition point, the polymeric chains thus aligned are fixed so as to retain the shape. Thereafter, when the object is heated to or above the glass transition point, the alignment of the polymeric chains collapses to restore the original shape.

The property of sequentially repeating the aligned state and non aligned state is called a shape memory. Needless to mention, for most organic materials having the shape memory, even after they are forcefully deformed by an externally applied force in a temperature region below the glass transition temperature, the alignment of the polymeric chains collapses by heating them again to or above their glass transition points to restore their original shapes.

In practice, however, the described shape memory function is not necessarily be perfect as long as such inconvenient condition as an alignment abnormality in a vicinity of the spacer, a switching inferior, etc., does not occur. Specifically, even when a heat treatment is applied at a temperature slightly below the glass transition point, although a long time is required to complete the heat treatment, the shape memory function which eliminates the effect of the rubbing process on the spacer can be obtained.

In the fifth liquid crystal display element, polyurethane may be used as the organic material for use in the spacer.

Further, in the fifth liquid crystal display element, it is preferable that the liquid crystal is the ferroelectric liquid crystal.

The ferroelectric liquid crystal has bistability, and when adopting it in the simple matrix structure without using an active element such as a transistor, it can be driven at higher speed than the nematic liquid crystal, etc. However, the ferroelectric liquid crystal is more likely to be affected by externally applied forces such as impact, pressure, etc., compared with the nematic liquid crystal, and it is required to control a spacing between the substrates more precisely.

In contrast, the fifth liquid crystal display element of the present invention has a high resistance to pressure, and enables a uniform spacing between the substrates to be maintained with high precision, thereby enabling the liquid crystal display element adopting the ferroelectric liquid crystal having superior characteristics to those of the nematic liquid crystal for practical applications by compensating for the described deficiencies of the ferroelectric liquid crystal.

In order to achieve the above object, the sixth manufacturing method of the present invention for a liquid crystal display element which includes a liquid crystal sandwiched between a pair of substrates, each having electrodes, is characterized by including the steps of:

(a) forming an alignment control layer in a form of a coat on the substrate;

(b) forming on the alignment control layer a spacer in a wall or pillar shape including an organic material having a shape memory;

(c) applying a rubbing process on the alignment control layer after the spacer is formed; and (d) applying a heat treatment at or in a vicinity of a glass transition point of the organic material after carrying out the step (c).

According to the described arrangement, by forming the spacer in a wall or pillar shape on the alignment control layer, a spacing between the substrates can be controlled with higher precision and an improved resistance to pressure can be achieved compared with the conventional method of dispersing the spacer such as glass beads, etc.

According to the described sixth manufacturing method, as the rubbing process is applied to the alignment control layer after the formation of the spacer, the effect of the rubbing process applied to the alignment layer is not lowered, for example, by the solvent used in the process of forming the spacer. As a result, the spacer can be formed without reducing the alignment control force.

Furthermore, the spacer in a wall or pillar shape is formed by an organic material having the shape memory, and the heat treatment is applied at or above a vicinity of the glass transition point of the organic material after applying the rubbing process, thereby eliminating the effect of the rubbing process on the spacer. As a result, the final product, i.e., the liquid crystal display element does not have such conventional problem as irregularities in the alignment of the liquid crystal or switching inferior of the liquid crystal caused by the rubbing process applied to the spacer.

As a result, a liquid crystal display element which has high resistance to pressure and which offers a high quality display without giving rise to the disturbance of the alignment or to the switching inferior can be achieved.

In order to achieve the above object, the sixth liquid crystal display element of the present invention is characterized by including:

- a pair of substrates;
- a liquid crystal layer sandwiched between the pair of substrates;
- alignment control layers for controlling an alignment of the liquid crystal layer, the alignment control layers and a plurality of electrodes formed in a stripe shape for applying a voltage to the liquid crystal layer being formed on each of the pair of substrates; and
- a plurality of spacers, each having a wall shape, formed on at least one of the pair of substrates, the spacers having a uniform height,
- wherein an opening for injecting therethrough the liquid crystal is formed on one end side in a lengthwise direction of the spacers.

According to the described arrangement, when injecting the liquid crystal into a spacing between the substrates in forming the liquid crystal layer, the liquid crystal is injected along the spacers. Namely, the liquid crystal is injected in the lengthwise direction of the spacers, thereby permitting the liquid crystal injection direction to be controlled by the direction of forming the spacers. Further, as this permits respective angles formed by the liquid crystal injection direction and the direction of the alignment treatment to be equal for all the pixels, a uniform alignment can be achieved. Furthermore, as the liquid crystal is injected uniformly in respective areas bordered by adjoining spacers, the area in which the liquid crystal is not injected can be eliminated. Moreover, as the liquid crystal is injected in many long and narrow areas bordered by the spacers, the time required for injecting the liquid crystal can be reduced. As a result, changes in composition of the liquid crystal which becomes the problem when injecting the liquid crystal under a reduced pressure can be suppressed.

As described, by controlling the direction of injecting the liquid crystal by the spacers, a liquid crystal display element which offers a high reliability can be achieved.

In order to achieve the above object, the seventh manufacturing method of the present invention for a liquid crystal display element is characterized by including the steps of:

(a) forming a plurality of spacers, each having a wall shape, in parallel so as to have a uniform height on at least one of the pair of substrates;
(b) connecting the pair of substrates together via the spacers; and
(c) injecting a liquid crystal between the pair of substrates along a lengthwise direction of the spacers.

As the described arrangement control the direction of injecting the liquid crystal to be constant, the liquid crystal can be injected in each pixel in the same direction, and a uniform alignment can be achieved. Moreover, by the spacers having a uniform height, the cell gap can be maintained constant before and after injecting the liquid crystal. Furthermore, as in many long and narrow areas bordered by the spacers, the liquid crystal can be injected quickly and uniformly, the area in which the liquid crystal is not injected can be eliminated, and the time required for injecting the liquid crystal can be reduced, thereby suppressing a change in composition of the liquid crystal.

As described, by controlling the direction of injecting the liquid crystal by the spacers, a reliable liquid crystal display element can be achieved.

The other objects, features, and superior points of this invention will be made clear by the description below. Further, the advantages of this invention will be evident from the following explanation which refers to the Figures.

BRIEF DESCRIPTION OF THE DRAWINGS

FIG. 3(a) through FIG. 3(e) are cross sectional views showing steps in a manufacturing method of the liquid crystal display element.

FIG. 4 is a flowchart showing the manufacturing method of the liquid crystal display element.

FIG. 7 is a flowchart showing main manufacturing steps of the liquid crystal display element.

FIG. 17(a) and FIG. 17(b) are plan views showing how liquid crystal is injected into a liquid crystal cell as a comparative example.

DESCRIPTION OF THE EMBODIMENTS

First Embodiment

The following will describe one embodiment of the present invention referring to FIG. 1 through FIG. 4.

Figure 1:
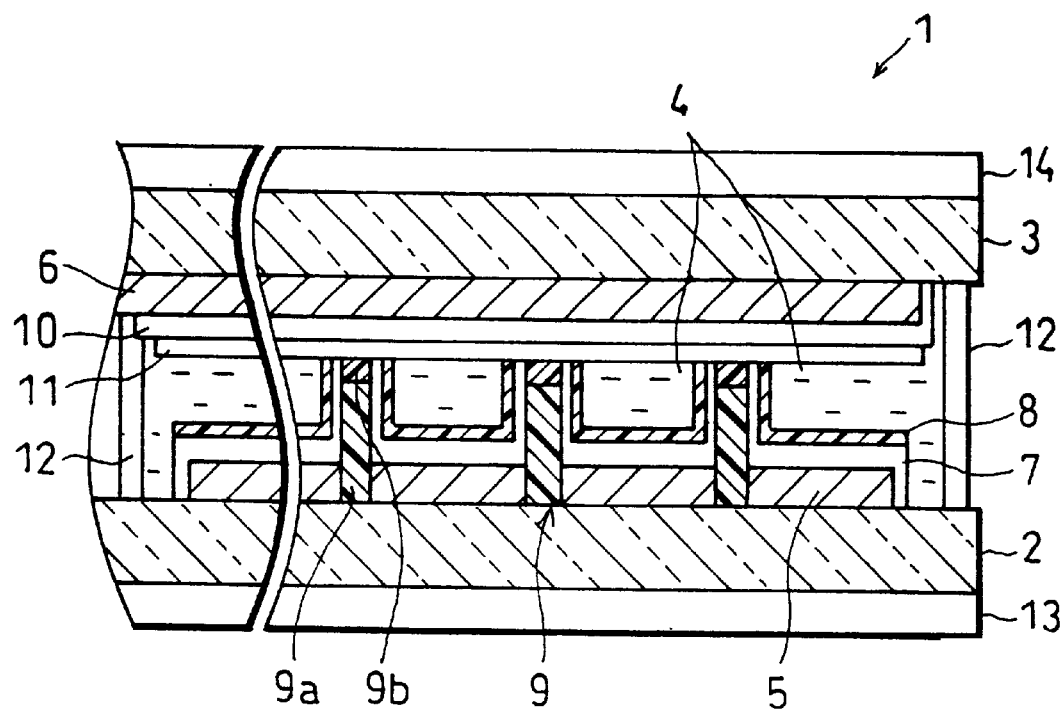
FIG. 1 is a cross sectional view showing a schematic structure of a liquid crystal display element in accordance with one embodiment of the present invention.

As shown in FIG. 1, a liquid crystal display element 1 in accordance with the present embodiment is provided with a pair of substrates 2 and 3, and between the pair of substrates 2 and 3, liquid crystal 4 (ferroelectric liquid crystal) is enclosed.

The pair of substrates 2 and 3 are glass substrates having translucent and insulating characteristics. On one surface of the substrate 2, there are provided a plurality of transparent signal electrodes 5 made of indium-tin-oxide (ITO). As shown in FIG. 2, the signal electrodes 5 are provided in stripes so as to be parallel to each other. Likewise, on one surface of the substrate 3, there are provided a plurality of transparent scanning electrodes 6 made of ITO. The scanning electrodes 6 are provided in stripes so as to be parallel to each other. The substrates 2 and 3 are provided so as to face each other such that the signal electrodes 5 and the scanning electrodes 6 are orthogonal to each other.

On each signal electrode 5, an insulating layer 7 is laminated, and an alignment layer 8 for controlling the alignment of the liquid crystal 4 is laminated on the insulating layer 7. Namely, the signal electrodes 5 are covered with the insulating layer 7 and the alignment layer 8.

Between adjacent signal electrodes 5, a spacer 9 is provided. As shown by the shaded area in FIG. 2(a), the spacer 9 is provided in stripes, and is composed of a base part 9a made of photosensitive resin and a tip part 9b made of a thermoplastic polymeric material. The spacer 9 (1) maintains a uniform spacing between the substrates 2 and 3 and (2) bonds the substrates 2 and 3 with each other by the thermoplastic polymeric material.

On each scanning electrode 6, an insulating layer 10 is laminated, and an alignment layer 11 for controlling the alignment of the liquid crystal 4 is laminated on the insulating layer 10. Namely, the scanning electrodes 6 are covered with the insulating layer 10 and the alignment layer 11.

As mentioned above, the alignment of the liquid crystal 4 is controlled by the alignment layers 8 and 11, and the liquid crystal 4 is enclosed in a predetermined spacing surrounded by a sealant 12, between the substrates 2 and 3. The liquid crystal 4 is injected through an injection opening (not shown) provided on the sealant 12 after combining the substrates 2 and 3. The liquid crystal 4 thus injected is enclosed by sealing of the injection opening after the injection.

Two polarizing plates 13 and 14 are provided so as to sandwich the substrates 2 and 3. The polarizing plates 13 and 14 are provided such that the respective polarizing axes thereof are orthogonal to each other.

Figure 2A:
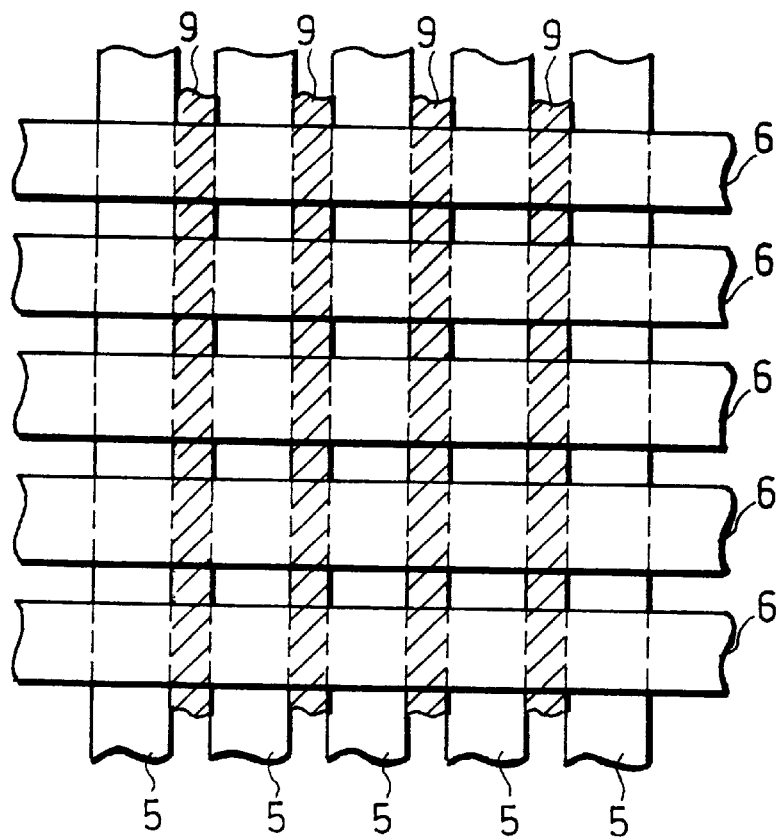
FIG. 2(a) and FIG. 2(b) are plan views respectively showing an example of an arrangement pattern of signal electrodes, scanning electrodes, and spacers in the liquid crystal display element.

In the present liquid crystal display element 1, as shown in FIG. 2(a), the signal electrodes 5 and the scanning electrodes 6 intersect each other, and each portion where the signal electrodes 5 and the scanning electrodes 6 intersect makes up a pixel for displaying. That is to say, when a voltage is selectively applied to the signal electrodes 5 and the scanning electrodes 6 by voltage applying means (not shown), the optical axis of the liquid crystal 4 between the signal electrodes 5 and the scanning electrodes 6 is switched. Displaying is carried out as the intensity of the light transmitting through the liquid crystal display element 1 "optically recognizes" the switching of the optical axis.

In the present liquid crystal display element 1, the height of the spacing enclosing the liquid crystal 4, namely, the height of the spacing between the substrates is determined by the height of the spacer 9 (mainly by the height of the base part 9a). The height of the base part 9a can be controlled precisely as will be described later in the manufacturing method of the liquid crystal display element 1. Also, since the substrates 2 and 3 are strongly bonded with each other by the thermoplastic polymeric material of the tip part 9b, the liquid crystal display element 1 is highly shock resistant, and a uniform spacing between the substrates can be maintained.

Next, a manufacturing method of the liquid crystal display element 1 will be described referring to FIG. 3 and FIG. 4 based mainly on the substrate 2.

First, on the substrate 2, ITO having a film thickness of 0.1 $\mu$m is formed by the spattering method, and the ITO thus formed is patterned in stripes so as to form the signal electrodes 5. Thereafter, photosensitive resin 15 is formed in a coating manner (Step 1). Specifically, photosensitive resin (Lithocoat PI 400) provided by Ube Industries, Ltd., which is adopted as the photosensitive resin 15, is applied on the substrate 2, and dried thereon.

Thereafter, on the photosensitive resin 15 thus formed, after forming in a coating manner a first polymeric material 16 having thermoplasticity, a second polymeric material 17, which is soluble in a certain solvent such as low alcohols, is formed (Steps 2 and 3). Here, a thermoplastic bonding agent (STAYSTIK383) provided by Techno Alpha Co., Ltd., which is adopted as the polymeric material 16, is applied to the photosensitive resin 15, and dried thereon. Thereafter, an isopropyl alcohol-soluble thermoplastic bonding agent (STAYSTIK393) provided by Techno Alpha Co., Ltd., which is adopted as the polymeric material 17, is applied to the polymeric material 16, and dried thereon (see FIG. 3(*a*)).

Note that, by currently available film forming techniques, it is possible to precisely control and adjust the film thickness of the photosensitive resin 15 formed in Step 1. Here, the photosensitive resin 15 is formed so that the final film thickness thereof is 1.5 $\mu$m. Likewise, it is also possible to precisely control and adjust the respective thicknesses of the polymeric materials 16 and 17. Here, the polymeric materials 16 and 17 are formed so that the respective thicknesses thereof are 100 nm and 200 nm.

Next, in Step 4, the photosensitive resin 15 and the polymeric materials 16 and 17 on the signal electrodes 5 are removed by photolithography so as to form in stripes an original spacer 18 composed of residues of the photosensitive resin 15 and the polymeric materials 16 and 17 (see FIG. 3(*b*)). Namely, in order to form the original spacer 18 in stripes, the substrate 2, by using a mask, is exposed, developed, and baked.

Thereafter, in Step 5, the insulating layer 7 and the alignment layer 8 are formed in this order on the substrate 2 (see FIG. 3(*c*)). Here, an insulating layer material (NHC A-2014) provided by Nissan Chemical Industries Ltd., which is adopted as the insulating layer 7, is laminated so that the thickness of the insulating layer 7 is 0.1 $\mu$m. Also, an alignment layer material (AL 5417) provided by Japan Synthetic Rubber Co., Ltd., which is adopted as the alignment layer 8, is laminated so that the thickness of the alignment layer 8 is 70 nm.

Then, after rubbing the alignment layer 8, the substrate 2 is soaked in isopropyl alcohol. This, as shown in FIG. 3(*d*), removes (1) the polymeric material 17 which is soluble in isopropyl alcohol and (2) the insulating layer 7 and the alignment layer 8 on the original spacer 18 (Step 6), thereby realizing an arrangement wherein the spacers 9, each of which is composed of the base part 9a and the tip part 9b respectively made of the photosensitive resin 15 and the thermoplastic polymeric material 16, are formed in stripes.

Then, in Step 7, (1) the substrate 2 complex thus prepared and (2) the substrate 3 provided with the scanning electrode 6, the insulating layer 10, and the alignment layer 11 are bonded with each other by solderless-connecting at a glass transition point of the polymeric material 16 or at a temperature in a vicinity thereof. Specifically, after applying the sealant 12 (see FIG. 1) to either one of the substrates 2 and 3, the substrates 2 and 3, while being positioned so that the signal electrodes 5 and the scanning electrodes 6 are orthogonal, are solderless-connected under the pressure of 2 kg/cm$^2$ and heated to a temperature of 180° C. so as to be bonded with each other, thereby making it possible to (a) provide a uniform spacing of 1.5 $\mu$m between the substrates 2 and 3, which substantially equals to the height of the base part 9a and (b) strongly bond the substrates 2 and 3.

Thereafter, the spacing between the substrates 2 and 3 is filled with the liquid crystal 4. Namely, after injecting the liquid crystal 4 through the injection opening of the sealant 12, the injection opening is sealed by a two liquid mixed-type bonding agent provided by Konishi Co., Ltd. (see FIG. 3(*e*)). As the material of the liquid crystal 4 filling the space, a ferroelectric liquid crystal material (SCE 8) provided by Merck & Co., Inc. is adopted. To finish, the polarizing plates 13 and 14 (see FIG. 1) are provided, thereby completing the manufacturing of the liquid crystal display element 1.

In the liquid crystal display element 1 manufactured in the described manner, compared with the display element of the comparative example 1 (mentioned later), no deterioration of the alignment characteristic of the liquid crystal 4 is observed. Also, a change in the alignment characteristic or fracture of the bonded portion is not observed up to an applied pressure of 10 kg/cm$^2$, thereby showing that the bonding strength of the liquid crystal display element 1 is strong enough to be applied in practical applications.

As described, in the above manufacturing method, the component materials of the spacer 9 are formed on the substrate 2 before the alignment layer 8 is formed. This prevents the alignment layer 8 from being contaminated or deteriorated in the manufacturing process, thereby preventing the deterioration of the alignment characteristic of the liquid crystal 4. Hence, the described manufacturing method is suitable for manufacturing of a ferroelectric liquid crystal display element requiring a precise alignment control.

Also, in the described manufacturing method, it is possible to (1) precisely control and adjust the height of the spacer 9 and (2) strongly bond the substrates 2 and 3, thereby providing the liquid crystal display element 1 wherein (a) the spacing between the substrates can be precisely controlled and (b) a uniform spacing between the substrates can be maintained against an external pressure, due to the highly shock resistant structure.

Further, in the described manufacturing method, the alignment layer 8 is formed on the substrate 2 after forming the spacer 9 containing the polymeric material 16 required for bonding the substrates 2 and 3, thereafter the alignment layer 8 on the spacer 9 is removed. This exposes the polymeric material 16, thereby permitting the substrates 2 and 3 to be bonded with each other. Thus, an additional step such as transferring and applying of a bonding agent specifically to the spacer after forming the alignment layer 8 is not required, and the material of the substrates is not limited by such an additional step.

Note that, as the substrate 3, a substrate having a color filter may be adopted. When a liquid crystal display element is manufactured by adopting, as the substrate 3, a color filter-equipped substrate provided by Shinto Paint Co., Ltd.

by the steps of (1) providing the insulating layer 10 and the alignment layer 11 on such a substrate, (2) carrying out a rubbing process, and (3) combining the substrate with the substrate 2, it was found that the alignment characteristic and the bonding strength of the liquid crystal display element thus manufactured were the same as those of the liquid crystal display element 1, thereby showing that the present manufacturing method is also applicable to a liquid crystal display element adopting a color filter.

Figure 2B:
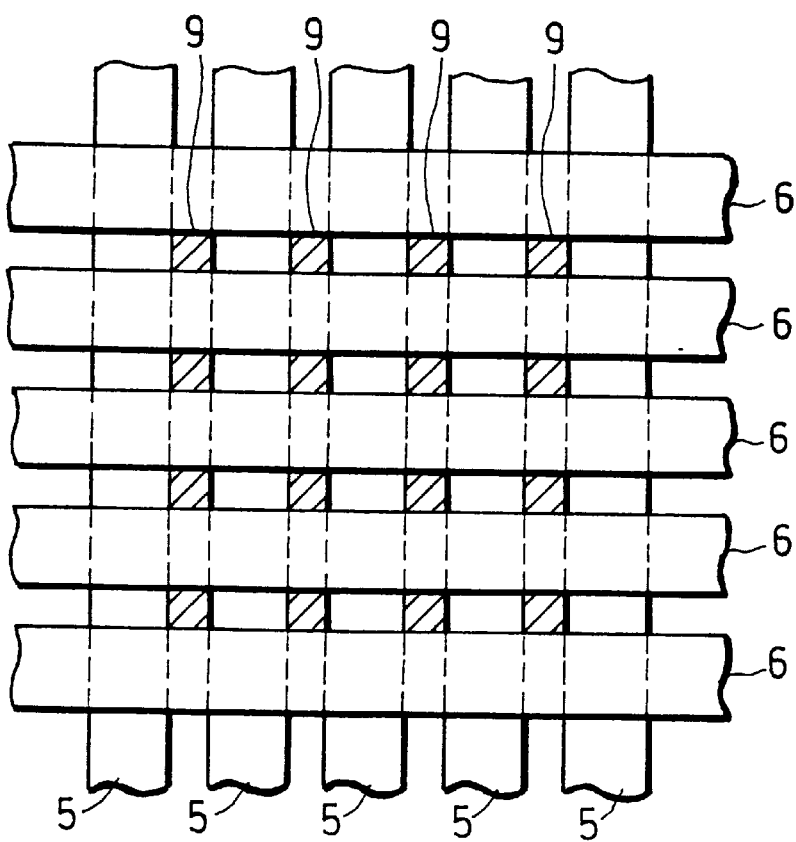

Also, in the liquid crystal display element 1, as shown in FIG. 2(a), the spacers 9 are provided in stripes. However, as shown in FIG. 2(b), it is possible to arrange the spacer 9 in the form of a pillar.

Also, in the described manufacturing method, in Step 2, the polymeric material 16 is formed on the photosensitive resin 15 in a coating manner. However, as the polymeric material 16, it is possible to adopt a thermoplastic polymeric material whose grains are diffused in a solvent. As such a granular thermoplastic polymeric material, for example, epoxy beads (Toray Pearl) provided by Toray Industries, Inc. is available.

Also, in the described manufacturing method, in Step 3, a thermoplastic bonding agent (STAYSTIK 393) provided by Techno Alpha Co., Ltd. is adopted as the polymeric material 17. However, provided that the material adopted as the polymeric material 17 is (1) not corroded by the etching solution for the photosensitive resin 15 and (2) soluble in a solvent such as isopropyl alcohol which does not cause deterioration of the alignment characteristic of the alignment layer 8, other materials may be adopted.

Further, in the described manufacturing method, the insulating layer 7 and the alignment layer 8 are laminated in this order. However, it is possible to provide only the alignment layer 8.

Second Embodiment

Figure 5:
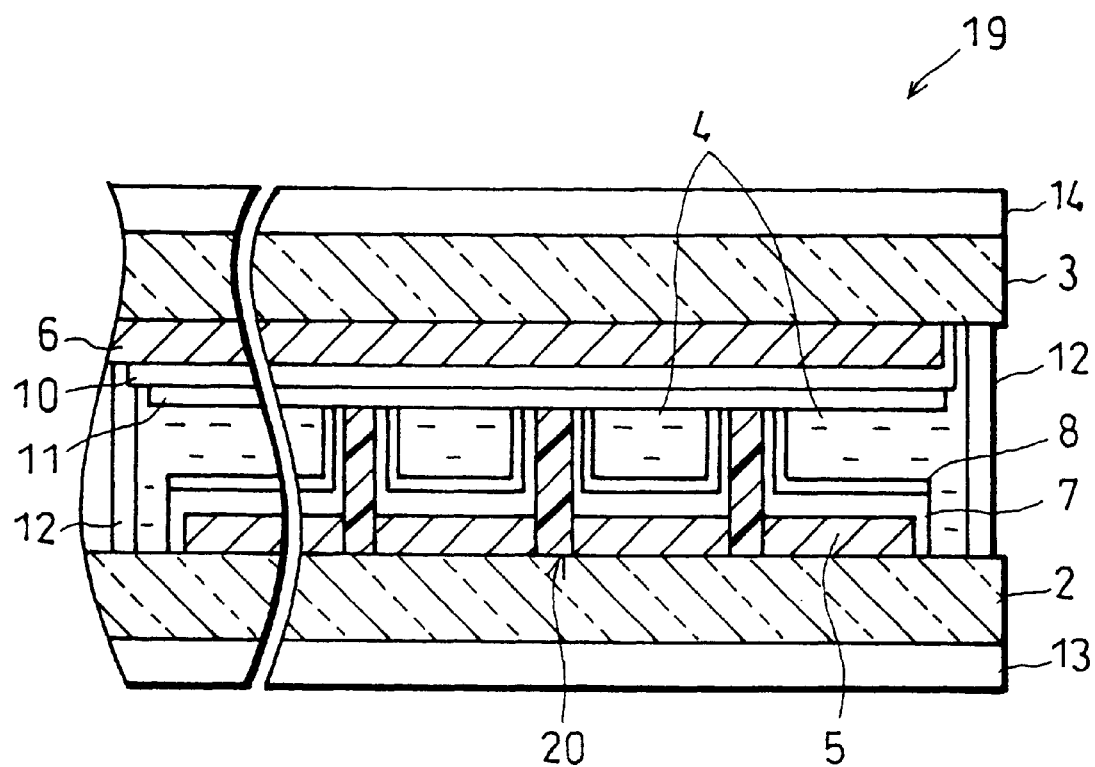
FIG. 5 is a cross sectional view showing a schematic structure of a liquid crystal display element in accordance with a second embodiment of the present invention.

The following will describe the second embodiment of the present invention referring to FIG. 5 through FIG. 7. Note that, for convenience, members having the same functions as the members indicated in the first embodiment are given the same reference numerals, and the explanations thereof are omitted.

As shown in FIG. 5, a liquid crystal display element 19 of the present embodiment is provided with spacers 20 in stripes instead of the spacers 9. Except this, the arrangement of the liquid crystal display element 19 is the same as that of the liquid crystal display element 1.

The spacer 20 is made of an adhesive photosensitive resin which bonds the substrates 2 and 3. Thus, it is not required to provide the tip part of the spacer 20 with other bonding materials in order to bond the substrates 2 and 3.

The manufacturing method of the liquid crystal display element 19, as shown in FIG. 6 and FIG. 7, differs from that of the liquid crystal display element 1 with respect to the following.

In the manufacturing method of the liquid crystal display element 19, because a photosensitive resin 21 formed in a coating manner on the substrate 2 in Step 11 is adhesive, a step, such as Step 2, for forming the thermoplastic polymeric material 16 is not required. Thus, in Step 12, a polymeric material 22, which is soluble in a certain solvent such as low alcohols, is formed in a coating manner on the photosensitive resin 21. In Step 13 through Step 15, the described processes of Step 4 through Step 6 are carried out. In Step 16, the pair of substrates 2 and 3 are bonded with each other by solderless-connecting at a glass transition point of the photosensitive resin 21 or at a temperature in a vicinity thereof.

Namely, in the manufacturing method of the liquid crystal display element 19, in Step 11, the adhesive photosensitive resin 21 is formed in a coating manner on the substrate 2 provided with the signal electrodes 5 formed in stripes. Here, photosensitive resin (V 259PA) provided by Nippon Steel Chemical Co., Ltd., which is adopted as the photosensitive resin 21, is applied to the substrate 2, and dried thereon. Thereafter, in Step 12, the polymeric material 22 is formed in a coating manner on the photosensitive resin 21 (see FIG. 6(a)). As the polymeric material 22, a thermoplastic bonding agent (STAYSTIK 393) provided by Techno Alpha Co., Ltd., which is also adopted as the polymeric material 17, is adopted.

Figure 6A:
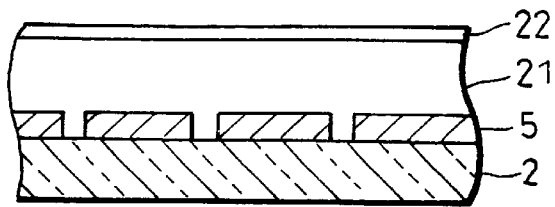
FIG. 6(a) through FIG. 6(e) are cross sectional views showing steps in a manufacturing method of the liquid crystal display element.
Figure 6B:
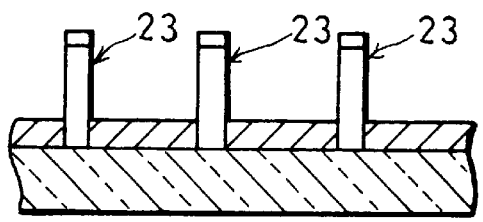
Figure 6C:
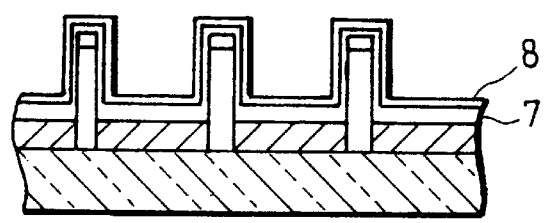
Figure 6D:
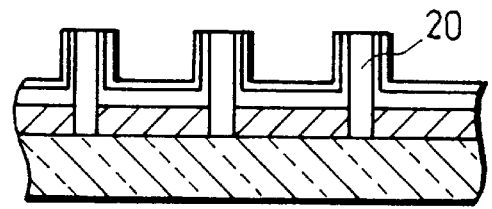
Figure 6E:
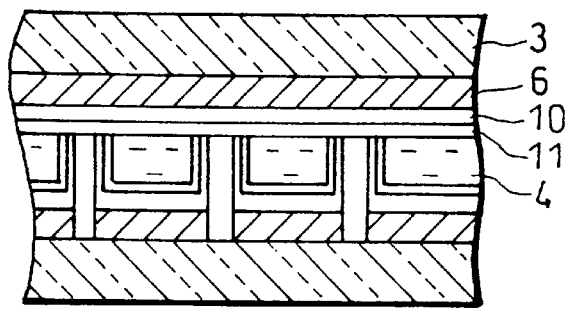

Then, in Step 13, the photosensitive resin 21 and the polymeric material 22 on the signal electrodes 5 are removed by photolithography so as to form in stripes original spacers 23, each of which is composed of residues of the photosensitive resin 21 and the polymeric material 22 (see FIG. 6(b)). Thereafter, in Step 14, as in Step 5, the insulating layer 7 and the alignment layer 8 are formed on the substrate 2 in this order (see FIG. 6(c)). After rubbing the alignment layer 8, in Step 15, the substrate 2 is soaked in isopropyl alcohol. This, as shown in FIG. 6(d), removes (1) the polymeric material 22 and (2) the insulating layer 7 and the alignment layer 8 on the original spacer 23, thereby realizing an arrangement wherein the spacers 20 made of the photosensitive resin 21 are formed in stripes.

Then, in Step 16, (1) the substrate 2 thus prepared and (2) the substrate 3 provided with the scanning electrode 6, the insulating layer 10, and the alignment layer 11 are bonded with each other by solderless-connecting at a glass transition point of the photosensitive resin 21 or at a temperature in a vicinity thereof. Thereafter, the spacing between the substrates 2 and 3 is filled with the liquid crystal 4 (see FIG. 6(e)), and the polarizing plates 13 and 14 (see FIG. 1) are provided, thereby completing the manufacturing of the liquid crystal display element 19.

In the liquid crystal display element 19 manufactured in the described manner, as in the liquid crystal display element 1, no deterioration of the alignment characteristic of the liquid crystal 4 is observed, and the bonding strength is strong enough to be applied in practical applications. Also, in the liquid crystal display element 19, as in the liquid crystal display element 1, it was found by actual manufacturing of the liquid crystal display element 19 that a substrate having a color filter can also be adopted as the substrate 3.

Note that, in the present liquid crystal display element 19, the spacers 20 are provided in stripes. However, it is possible to arrange the spacer 20 in the form of a pillar.

Comparative Example 1

To elucidate the respective characteristics of the first embodiment and the second embodiment, a liquid crystal display element in which the spacing between substrates is controlled so as to maintain a uniform spacing by a conventional bead spacer was manufactured as a comparative example 1. Specifically, by adopting the same substrates as the substrates 2 and 3 of the first and second embodiment, electrodes, an insulating layer, and an alignment layer were formed on the respective substrates. After rubbing the alignment layers, silica beads (1.6 µm) provided by Ube-Nitto Kasei Co., Ltd. were dispersed over one of the substrates so as to bond the substrates with each other by the two liquid mixed-type bonding agent provided by Konishi Co., Ltd., thereby completing the liquid crystal display element.

In the liquid crystal display element manufactured in the described manner, an initial alignment characteristic of the liquid crystal was found to be desirable. However, it was observed in an experiment that the alignment of the liquid crystal fractured under the pressure of 0.5 kg/cm$^2$.

Comparative Example 2

In the present comparative example, by adopting the substrates 2 and 3 of the first and second embodiment, electrodes, an insulating layer, and an alignment layer were formed on one of the substrates, and after carrying out a rubbing process, photosensitive resin (V 259PA) provided by Nippon Steel Chemical Co., Ltd. was applied to the substrate, and dried thereon. Thereafter, by using a mask, exposing, developing, and baking processes were carried out so as to form spacers in stripes. Finally, the substrates were combined, thereby completing the manufacturing of a liquid crystal display element.

In the liquid crystal display element manufactured in the described manner, compared with the liquid crystal display element of the comparative example 1, deterioration of the alignment characteristic of the liquid crystal was observed. This is a likely result of applying and removing the photosensitive resin after forming the alignment layer.

As described, the liquid crystal display element in accordance with the first and second embodiment has an arrangement including a pair of substrates provided so as to face each other, and liquid crystal injected between the pair of substrates, wherein the pair of substrates are respectively provided with electrodes for applying a voltage to the liquid crystal, and an alignment layer, provided so as to cover the electrodes, for controlling the alignment of the liquid crystal, and on regions between adjacent electrodes on one of the pair of substrates, spacers for maintaining a spacing between the pair of substrates and for bonding the pair of substrates are provided in stripes or in a form of pillars, the alignment layer is provided on one of the substrates after forming the spacers.

With this arrangement, it is possible to precisely control and adjust the spacing between the pair of substrates with respect to the entire surface. Also, since the substrates can be strongly bonded with each other, it is possible to (1) improve the shock resistance and (2) securely maintain and fix the spacing between the substrates.

Also, since the liquid crystal display element of the first and second embodiment has an arrangement wherein instead of providing the spacers on the alignment layer, the alignment layer is provided after forming the spacers. This permits to minimize the occurrence of contamination and deterioration of the alignment layer, thereby providing a liquid crystal display element having a quality displaying ability with no deterioration of the alignment characteristic of the liquid crystal.

Further, in the liquid crystal display element of the first and second embodiment, the alignment layer is formed on the substrate after forming the spacers containing a bonding material, thereafter the alignment layer on the spacers is removed so as to expose the bonding material which bonds the pair of substrates. Thus, an additional step such as transferring and applying of a bonding agent specifically to the spacers after forming the alignment layer is not required, and the problem that the material of the substrates is limited by such an additional step is not presented.

The liquid crystal display element of the first and second embodiment may have an arrangement wherein the base part and the tip part of the spacer are respectively made of photosensitive resin and a thermoplastic polymeric material, and the pair of substrates are bonded together by the thermoplastic polymeric material.

With this arrangement, it is possible to (a) strengthen the bonding made by the thermoplastic polymeric material between the substrates and (b) maintain a uniform spacing between the substrates against an undesirable external pressure.

The liquid crystal display element of the first and second embodiment may have an arrangement wherein the spacer is made of adhesive photosensitive resin, and the pair of substrates are bonded together by such adhesive photosensitive resin.

With this arrangement, it is possible to (1) strengthen the bonding made by the photosensitive resin between the substrates and (2) maintain and fix a uniform spacing between the substrates against an undesirable external pressure.

In the liquid crystal display element of the first and second embodiment, it is desirable that a ferroelectric liquid crystal is adopted as the liquid crystal.

With this arrangement, in a liquid crystal display element adopting the ferroelectric liquid crystal, it is possible to (a) precisely maintain the spacing between substrates and (b) effectively prevent the flow of the liquid crystal by spacers provided in stripes. Further, in a ferroelectric liquid crystal display element requiring a more precise alignment control, deterioration of the alignment characteristic of the liquid crystal can be prevented.

The manufacturing method of the liquid crystal display element in accordance with the first and second embodiment includes the steps of (1) forming photosensitive resin in a coating manner after forming electrodes on a substrate, (2) forming in a coating manner a first polymeric material having thermoplasticity on the photosensitive resin, or dispersing grains of the first polymeric material on the photosensitive resin, (3) forming in a coating manner a second polymeric material, which is soluble in a predetermined solvent, on the first polymeric material, (4) removing the photosensitive resin, the first polymeric material, and the second polymeric material, formed on a region other than a predetermined region, so as to form, in stripes or in a form of pillars, original spacers composed of residues of the photosensitive resin, the first polymeric material, and the second polymeric material, (5) laminating an alignment layer on the electrodes and the original spacer, or laminating in this order an insulating layer and the alignment layer on the electrodes and the original spacer, (6) removing the second polymeric material so as to remove (a) the alignment layer on the original spacer or (b) the insulating layer and the alignment layer on the original spacer, and (7) bonding the substrate and another substrate with each other by solderless-connecting at a glass transition point of the first polymeric material or at a temperature in a vicinity thereof.

With the described manufacturing method, since the alignment layer is prevented from being contaminated or deteriorated in the manufacturing process, deterioration of the alignment characteristic of the liquid crystal can be prevented. Also, the two substrates can be strongly bonded with each other without requiring an additional step of transferring and applying a bonding agent specifically on the spacer after forming the alignment layer.

Further, since the height of the spacer to be formed can be precisely controlled and adjusted, it is possible to precisely control the spacing between the substrates with respect to the entire surface so as to obtain a desirable distance therebetween.

Also, since the substrates are strongly bonded with each other, it is possible to (1) improve the shock resistance and (2) securely maintain and fix the spacing between the substrates, thereby providing a manufacturing method which can be suitably adopted in manufacturing of a large panel or a liquid crystal display element adopting a ferroelectric liquid crystal, requiring precise maintenance of the spacing between the substrates.

In the described manufacturing method, instead of providing the first polymeric material in step (2), adhesive photosensitive resin can be formed in step (1). Also, in step (7), it is possible to bond the two substrates by solderless-connecting at a glass transition point of the adhesive photosensitive resin or at a temperature in a vicinity thereof.

With this arrangement, it is possible to (a) strengthen the bonding made by the photosensitive resin between the substrates and (b) maintain and fix a uniform spacing between the substrates against an undesirable external pressure.

Third Embodiment

The following will describe a liquid crystal display element in accordance with the third embodiment of the present invention referring to FIG. 8 through FIG. 17. Here, explanations will be given based on first through third liquid crystal cells as examples of the present embodiment. Note that, members common to the first through third liquid crystal cells are given the same reference numerals.

(First Liquid Crystal Cell)

Figure 8:
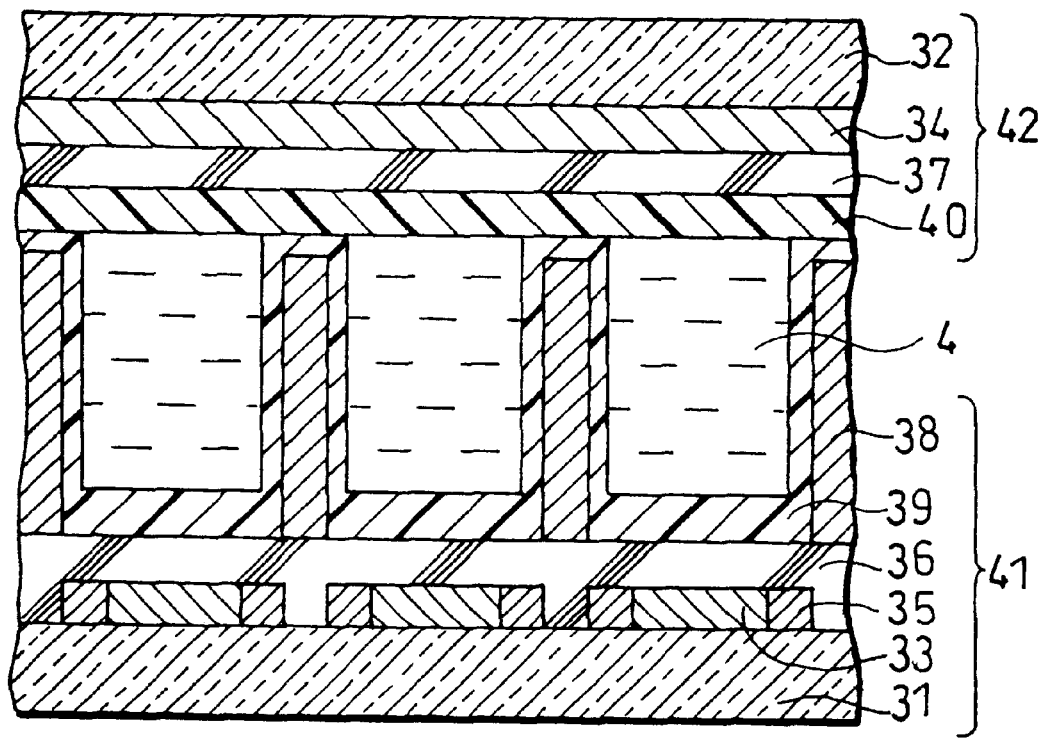
FIG. 8 is a cross sectional view showing a detailed structure of a first liquid crystal cell in accordance with a third embodiment of the present invention.

As shown in FIG. 8, the first liquid crystal cell is provided with substrates 31 and 32 respectively having insulating characteristics. The substrates 31 and 32 are provided so as to face each other, and are made of glass, plastic, or silicon. At least one of the substrates 31 and 32 is made of a transparent material.

The substrates 31 and 32 are respectively provided with electrodes 33 and 34 formed in stripes. The electrodes 33 and the electrodes 34 are provided so as to intersect each other, and each portion where the electrodes 33 and the electrodes 34 intersect makes up a pixel. As the electrodes 33 and the electrodes 34, generally, transparent electrodes made of ITO (Indium Tin Oxide) are suitably adopted. Nonetheless, transparent electrodes made of other metals may be adopted as well.

On the substrate 31, light-shields 35 are provided along the both sides of each electrode 33. The light-shields 35 are provided so as to shied light on the both sides of the electrodes 33, and are made of (1) a metal such as Cr, Mo, or Al or (2) non-transparent organic resin. Likewise, on the substrate 32, light-shields (not shown) made of a material same as that of the light-shields 35 are provided along the both sides of each electrode 34.

Also, on the substrate 31, an insulating layer 36 is provided so as to cover the electrodes 33 and the light-shields 35. Likewise, on the substrate 32, an insulating layer 37 is provided so as to cover the electrodes 34 and the light-shields. On the insulating layer 36, a plurality of spacers 38 and an alignment layer 39 (alignment control layer) are provided. On the insulating layer 37, an alignment layer 40 (alignment control layer) is provided. The alignment layers 39 and 40 are subjected to an alignment process by rubbing such that respective alignment-process directions of the alignment layers 39 and 40 coincide when the substrates 31 and 32 are combined with each other.

A spacer 38 is continuously provided on regions of the insulating layer 36 in the form of a wall extending in a direction parallel to the electrodes 33, which are projected portions of regions between the light-shields 35 in a direction perpendicular to the surface of the substrate 31. Although the position of the spacers 38 is not limited to the specified one, in order to avoid lowering of the displaying quality, it is preferable that the spacers 38 are provided on regions other than the regions above the electrodes 33 constituting pixels. As a material of the spacers 38, (1) light-curable resin such as photosensitive polyimide or photosensitive acrylic resin, (2) organic resin such as polyimide or acrylic resin, or (3) a metal such as Cr, Mo, or Al is adopted.

The spacers 38 are optically isotropic, and quench under a cross nicol condition. In order for the spacers 38 to quench under a cross nicol condition, it is required that (1) the spacers 38 are made of a material whose index of refraction is not anisotropic and (2) no liquid crystal is found between the alignment layers 39 and 40 on the top portion of the spacers 38.

The alignment layer 39 is laminated so as to cover the surfaces of the spacers 38 and portions of the insulating layer 36 between the spacers 38.

The substrate 31, the electrodes 33, the light-shields 35, the insulating layer 36, the spacers 38, and the alignment layer 39 constitute an electrode substrate 41. The substrate 32, the electrodes 34, the light-shields (not shown), the insulating layer 37, and the alignment layer 40 constitute an electrode substrate 42.

Respective peripheral portions of the electrode substrates 41 and 42 are combined with each other by a sealing material, and a spacing therebetween is filled with liquid crystal 4. The electrode substrates 41 and 42 are also combined by the bonding of a large number of projected top portions of the alignment layer 39 and the alignment layer 40 so that the electrode substrates 41 and 42 are tightly connected to each other.

Note that, provided that the sealing of the peripheral portions of the electrode substrates 41 and 42, made by the bonding of the alignment layers 39 and 40 via the spacers 38 is strong enough, it is not required to combine the electrode substrates 41 and 42 by the sealing material.

As the liquid crystal 4, a ferroelectric liquid crystal composite is adopted. Because ferroelectric liquid crystal has desirable characteristics such as a high speed response and a memory effect, it is possible to realize large capacity and highly detailed displaying.

Also, though not shown in FIG. 8, on respective surfaces of the electrode substrates 41 and 42 not provided with the electrodes 33 and 34, polarizing plates are provided, respectively. The polarizing plates are provided so that the respective polarizing axes are orthogonal (cross nicol).

The liquid crystal cell having the described arrangement is manufactured by the following steps.

First, on the surface of the substrate 31, a film having a thickness of substantially 100 nm made of a metal such as molybdenum (Mo), or transparent organic resin is formed so as to be patterned by photolithography, thereby forming, as shown in FIG. 9(a), the light-shields 35 having a predetermined pattern. Note that, in the case where the light-shields 35 are not required, this step is skipped.

Figure 9:
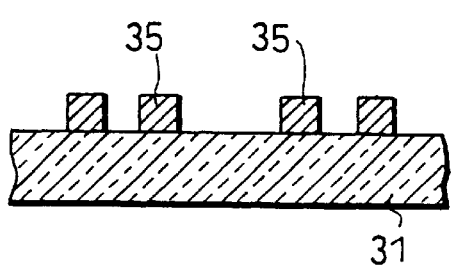
FIG. 9(a) through FIG. 9(e) are cross sectional views showing manufacturing steps of the first liquid crystal cell.
Figure 9:
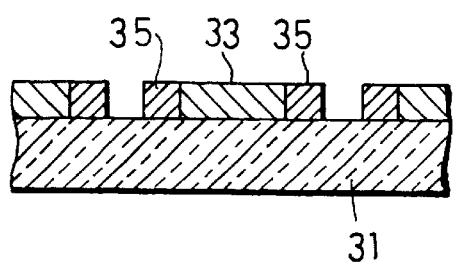
Figure 9:
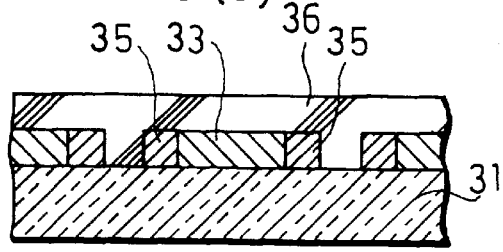
Figure 9:
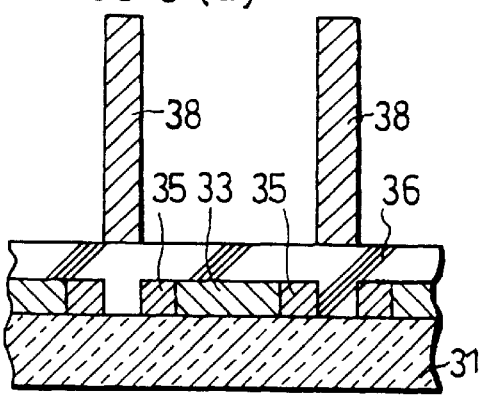
Figure 9:
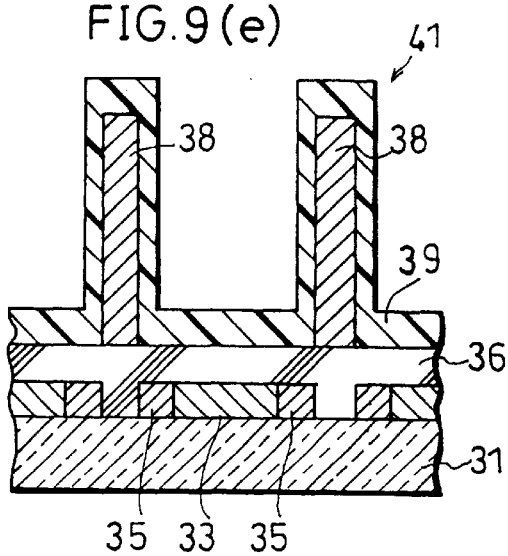

Secondly, on the substrate 31, an ITO film having a thickness of substantially 100 nm is formed by the spattering method, thereby forming, as shown in FIG. 9 (b), electrodes 33 provided with the light-shields 35 which are positioned along the both sides of each electrode 33.

Thirdly, $SiO_2$ is applied by the spin coating method so as to form, as shown in FIG. 9(c), the insulating layer 36 having a flat surface. Note that, in the case where the insulating layer 36 is not required, this step is skipped. Also, this step may be carried out after the step of forming the spacers 38 (mentioned later).

Fourthly, on the insulating layer 36 thus formed, negative-type photosensitive resin such as OMR-83 provided by Tokyo Ohka Kogyo Co., Ltd. is applied by the spin coating method so that the film thickness thereof after the baking is 1.5 μm. Then, after irradiating UV light, via a photo mask, on regions of the negative-type photosensitive resin where the spacers 38 are to be formed in order to remove the unexposed regions, primary baking is carried out for 30 minutes at a temperature of substantially 145° C., thereby forming, as shown in FIG. 9(d), the spacers 38 having a uniform height.

Fifth, PSI-A-2101 (polyamide carboxylic acid) provided by Chisso Corporation is applied so that the film thickness thereof is 50 nm, and after carrying out temporary baking for 1 hour at a temperature of substantially 180° C., the surface of the film thus formed is rubbed, thereby forming, as shown in FIG. 9(e), the alignment layer 39.

The electrode substrate 41 is manufactured in the described manner. The electrode substrate 42 is also manufactured in the described manner except that the step of forming the spacers 38 is skipped. Specifically, the electrode substrate 42 is manufactured by forming on the substrate 32 the electrodes 34, the light-shields, and the insulating layer 37 in this order by the steps of FIG. 9(a) through FIG. 9(c), and on the insulating layer 37, the alignment layer 40 is formed by the step of FIG. 9(e).

Finally, the electrode substrates 41 and 42 thus prepared are faced each other so that the respective rubbing directions of the alignment layers 39 and 40 are coincident, thereafter, the alignment layers 39 and 40 are bonded with each other by applying a pressure of 0.6 kgf/cm² for 1 hour at a temperature of substantially 200° C. Then, a liquid crystal material is injected into the spacing between the electrode substrates 41 and 42 along a lengthwise direction of the spacers 38 so as to form the liquid crystal 4, and to finish, the polarizing plates are provided, thereby completing the liquid crystal cell.

Note that, the above explanations are based on the case where the spacers 39 are provided only on the electrode substrate 41. However, the present invention is not limited to the specified arrangement. For example, it is possible to separately provide the spacers 38 on both of the electrode substrates 41 and 42, and by bonding (a) the alignment layer formed on the spacer of one of the substrates and (b) a region on the alignment layer of the other substrate not provided with the spacer, the electrode substrates 41 and 42 are combined.

(Second Liquid Crystal Cell)

Figure 10:
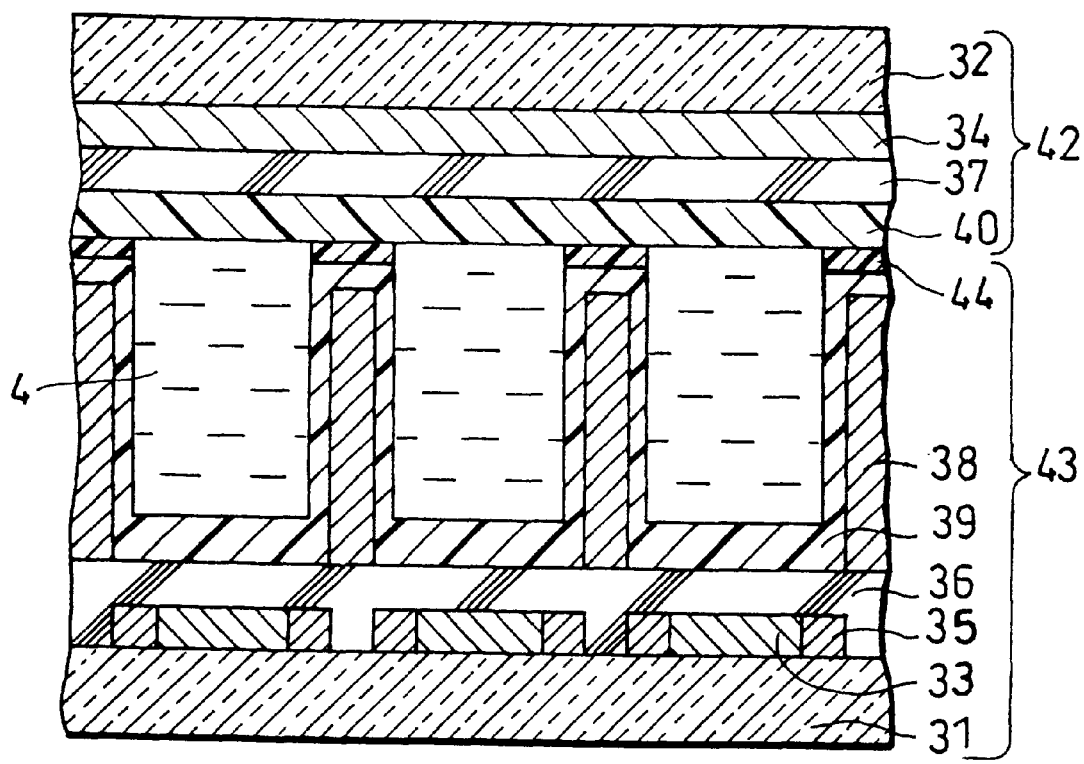
FIG. 10 is a cross sectional view showing a detailed structure of a second liquid crystal cell in accordance with the third embodiment of the present invention.

The second liquid crystal cell, as shown in FIG. 10, is provided with electrode substrates 43 and 42, and the liquid crystal 4 is injected into a spacing between the electrode substrates 43 and 42 combined together. The electrode substrate 43 has the arrangement of the electrode substrate 41 of the first liquid crystal cell except that an adhesive layer 44 is additionally provided. The adhesive layer 44 is provided on the alignment layer 39 on each top portion of the spacers 38, and the electrode substrates 43 and 42 are bonded with each other by the adhesive layer 44.

The second liquid crystal cell is manufactured by the following steps.

First, by following the steps of FIG. 9(a) through FIG. 9(e), an electrode substrate having the same arrangement as that of the electrode substrate 41 is manufactured. Thereafter, a bonding agent is transferred to each top portion of the alignment layer 39 by the stamping method or the film transferring method so as to form the adhesive layer 44. As the bonding agent, for example, epoxylic resin or thermoplastic resin is adopted.

The electrode substrate 43 is manufactured in the described manner. The electrode substrate 42 is manufactured in the same manner as the manufacturing of the electrode substrate 42 of the first liquid crystal cell. The electrode substrates 43 and 42 thus prepared are faced each other so that the respective rubbing directions of the alignment layers 39 and 40 are coincident, thereafter, the adhesive layer 44 and the alignment layer 40 are bonded with each other by applying a pressure of 0.6 kgf/cm² for 1 hour at room temperature. Then, a liquid crystal material is injected into the spacing between the electrode substrates 43 and 42 along a lengthwise direction of the spacers 38 so as to form the liquid crystal 4, and to finish, the polarizing plates are provided, thereby completing the liquid crystal cell.

(Third Liquid Crystal Cell)

Figure 11:
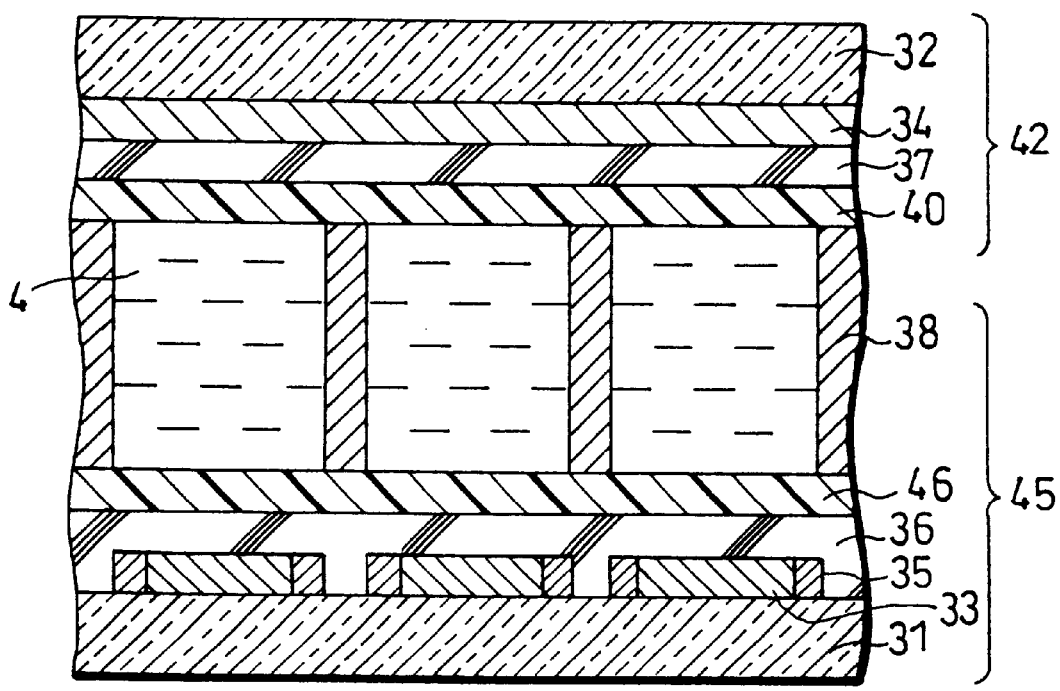
FIG. 11 is a cross sectional view showing a detailed structure of a third liquid crystal cell in accordance with the third embodiment of the present invention.

The third liquid crystal cell, as shown in FIG. 11, is provided with electrode substrates 45 and 42 which are combined with each other, and the liquid crystal 4 is sandwitched therebetween. The electrode substrate 45, in the same manner as the alignment layer 40 of the electrode substrate 42, is provided with, on the insulating layer 36, an alignment layer 46 formed in a flat manner. The spacers 38 are provided on regions of the alignment layer 46, which are projected portions of regions between the light-shields 35 in a direction perpendicular to the surface of the substrate 31. The electrode substrates 45 and 42 are combined with each other by the spacers 38.

The third liquid crystal cell having the described arrangement is manufactured by the following steps.

First, by the steps of FIG. 9(a) through FIG. 9(c), the electrodes 33, the light-shields 35, and the insulating layer 36 are formed on the substrate 31 in this order. Thereafter, the PSI-A-2101 provided by Chisso Corporation is applied so that the film thickness thereof is 50 nm, and after carrying out baking for 1 hour at a temperature of substantially 200° C., the surface of the film thus formed is rubbed, thereby forming the flat alignment layer 46 on the insulating layer 36. Note that, the rubbing process may be carried out after the step of forming the spacers 38.

Secondly, on the alignment layer 46, negative-type photosensitive resin such as OMR-83 provided by Tokyo Ohka Kogyo Co., Ltd. is applied by the spin coating method so that the film thickness thereof after baking is 1.5 μm. Then, after irradiating UV light, via a photo mask, on regions of the negative-type photosensitive resin where the spacers 38 are to be formed in order to remove the unexposed regions, primary baking is carried out for 30 minutes at a temperature of substantially 145° C., thereby forming, as shown in FIG. 11, the spacers 38 on the alignment layer 46.

The electrode substrate 45 is manufactured in the described manner. The electrode substrate 42 is manufactured in the same manner as the manufacturing of the electrode substrate 42 of the first liquid crystal cell. Thirdly, the electrode substrates 45 and 42 thus prepared are faced each other so that the respective rubbing directions of the alignment layers 46 and 40 are coincident, thereafter, the spacers 38 and the alignment layer 40 are bonded with each other by applying a pressure of 0.6 kgf/cm² for 1 hour at a temperature of substantially 200° C. Here, by appropriately selecting a condition (temperature and pressure) of combining the electrode substrates 45 and 42, it is possible to strengthen, to some degree, the bonding strength of the electrode substrates 45 and 42 regardless of the material adopted for the spacers 38.

Finally, a liquid crystal material is injected into the spacing between the electrode substrates 45 and 42 along a lengthwise direction of the spacers 38 so as to form the liquid crystal 4, and to finish, the polarizing plates are provided, thereby completing the liquid crystal cell.

As described, the respective spacers 38 of the first through third liquid crystal cells, as is clear from FIG. 8, FIG. 10, and FIG. 11, respectively, are strongly bonded with the alignment layer 40 of the electrode substrate 42, either directly, or via the alignment layer 39 or the adhesive layer 44. Thus, the injection of liquid crystal is regulated by the spacers 38 such that the liquid crystal is injected in a specific direction. As a result, the angle made by the injection direction and the rubbing direction are substantially coincident with respect to each pixel, thereby making it possible to obtain a desirable displaying quality.

Also, since the spacers 38, provided in the form of a wall, are provided between the electrode substrates 41 and 43 or between the electrode substrates 45 and 42, it is possible to (1) maintain a uniform spacing between the substrates facing each other and (2) improve the shock resistance.

Further, since the spacers 38 are optically isotropic, the spacers 38 quench under a cross nicol condition. This makes the spacers 38 to function also as a black matrix so that the spacers 38 shield light on regions between the electrodes 33 other than the pixel regions, thereby improving the contrast.

The first through third liquid crystal cells having the described arrangements have the following advantages.

The first liquid crystal cell is manufactured by the step of forming the alignment layer 39 after forming the spacers 38. Hence, the alignment layer 39 is prevented from being contaminated, deteriorated, or destroyed in the step of forming the spacers 38, thereby making it possible to obtain a uniform alignment. The second liquid crystal cell is provided with the adhesive layer 44. Thus, the electrode substrates 43 and 42 are bonded together with a bonding strength higher than that of the first liquid crystal cell. Further, in the case where the bonding strength of the alignment layers is low, it is possible, as in the third liquid crystal cell, to strongly bond the electrode substrates 45 and 42 by the bonding of (a) the spacers 38 and (b) the alignment layers 46 and 40.

(Injection of Liquid Crystal)

The following will describe, based on the first through third liquid crystal cells, (1) a method for injecting liquid crystal and (2) a spacer structure suitably adopted in such an injection method. Note that, in the following explanations, for convenience, as an electrode substrate having the spacers 38, the electrode substrate 41 of the first liquid crystal cell is adopted. Nevertheless, the electrode substrate 43 or 45 of the second or third liquid crystal cell, respectively, may be adopted as well.

Figure 12A:
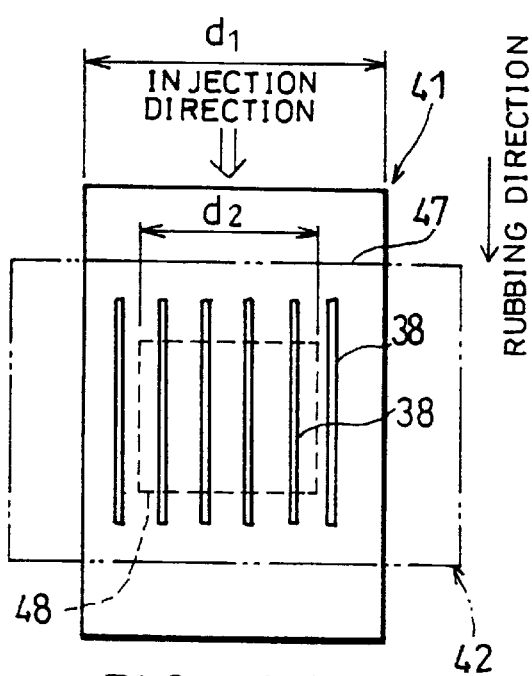
FIG. 12(a) through FIG. 12(c) are plan views respectively showing a schematic structure of a liquid crystal cell and how liquid crystal is injected into such a liquid crystal cell in accordance with the third embodiment of the present invention.

In the liquid crystal cell shown in FIG. 12(a), the electrode substrates 41 and 42 are rectangles, and are provided so that the respective long sides of the electrode substrates 41 and 42 are orthogonal to each other. The spacers 38 are provided in stripes parallel to the long sides of the electrode substrate 41.

Figure 13A:
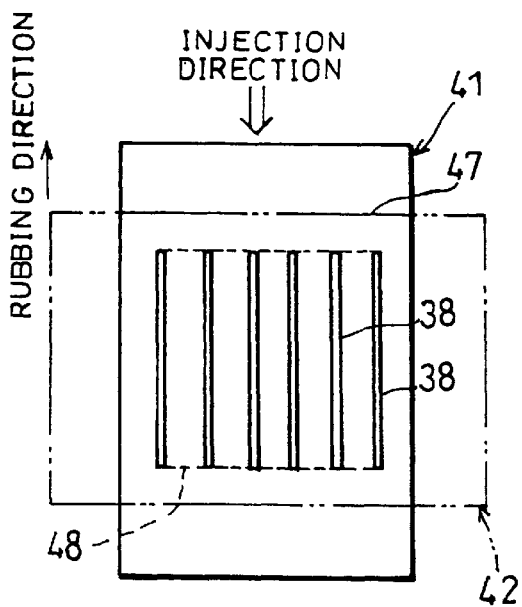
FIG. 13(a) and FIG. 13(b) are plan views respectively showing a structure of another liquid crystal cell in accordance with the third embodiment of the present invention.
Figure 13B:
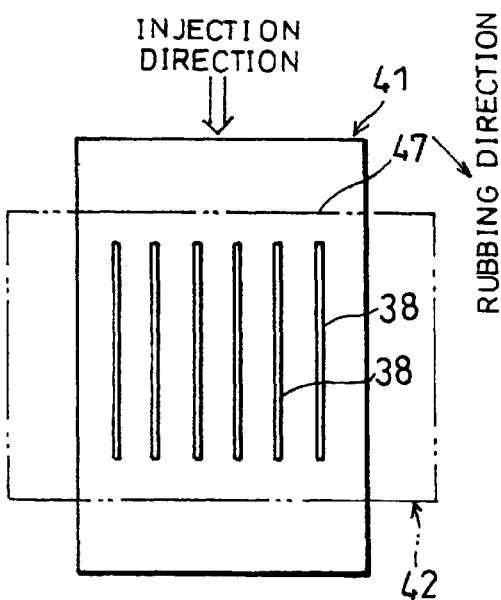

A displaying region 48 of the present liquid crystal cell is provided on a region where the electrode substrates 41 and 42 face with each other, namely, on a region where the liquid crystal is injected. As shown in FIG. 12(a) or FIG. 13(a), between the electrode substrates 41 and 42, the spacers 38 are provided so as to maintain a certain spacing at least on the displaying region 48.

Also, the present liquid crystal cell is provided with an injection opening 47 along the long sides of the electrode substrate 42 so that liquid crystal is injected from the side of one of the short sides of the electrode substrate 41. The injection opening 47 is provided so as to have a width $d_1$ which is (a) the same as the width $d_2$ of the displaying region 48 in a direction orthogonal to the lengthwise direction of the spacers 38 or (b) longer than the width $d_2$.

In the liquid crystal cell having the described arrangement, liquid crystal is injected along the lengthwise direction of the spacers 38 through the injection opening 47, and the injection direction coincides with the rubbing direction. In the described manner, since the liquid crystal is injected along the lengthwise direction of the spacers 38, the injection direction becomes uniform with respect to each pixel, thereby making it possible to align the liquid crystal uniformly.

Also, because the region to be filled with the liquid crystal is divided into narrow regions by the spacers 38, the liquid crystal flows smoothly through each region by capillary action, thereby permitting the liquid crystal to be injected in a short period of time. Hence, in the case of injecting the liquid crystal under a low pressure, it is prevented that the liquid crystal composite is placed under a low pressure for a long period of time, thereby preventing a change in composition of the liquid crystal composite. Further, because the injection of the liquid crystal in the narrow regions proceeds uniformly, it is ensured that the liquid crystal is injected into all the regions to be filled with liquid crystal.

Figure 12B:
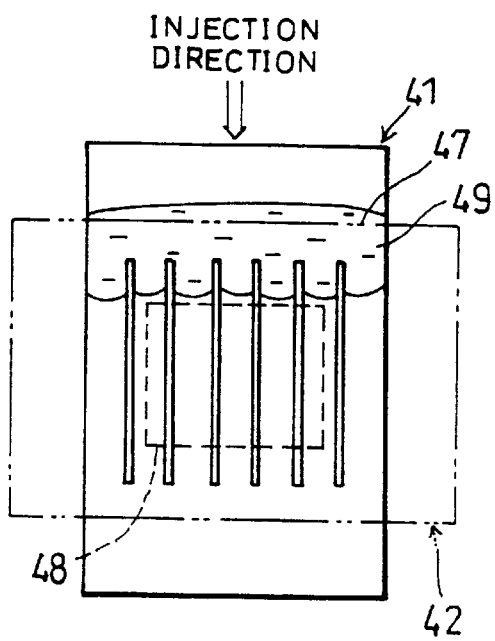
Figure 12C:
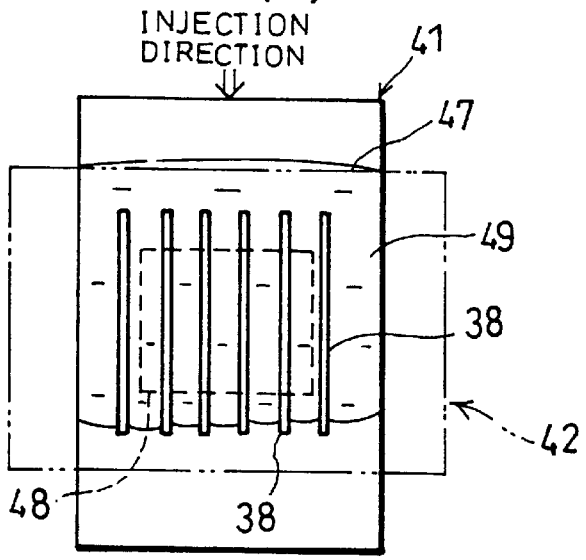

For example, in the case of adopting a ferroelectric liquid crystal composite (SCE 8) provided by Merck & Co., Inc. as the liquid crystal to be injected into the liquid crystal cell, as shown in FIG. 12(b) and FIG. 12(c), it was observed that liquid crystal 49 is injected along the lengthwise direction of the spacers 38, and therefore is not interfered by the spacers 38.

It was also observed that the injection of the liquid crystal 49 proceeds uniformly in the regions between adjacent spacers 38. This is because the width $d_1$ of the injection opening 47 is the same as, or longer than the width $d_2$ of the display region 48 so that the liquid crystal 49 from the injection opening 47 reaches each spacer 38 substantially at the same time. Therefore, injection of the liquid crystal can be carried out efficiently in a short period of time, and no injection failure is caused. Further, since the liquid crystal 49 from the injection opening 47 reaches each spacer 38 uniformly, it is possible to provide the spacers 38 close to the injection opening 47, thereby improving the shock resistance of the liquid crystal cell in a vicinity of the injection opening 47.

When the liquid crystal cell having the described arrangement is manufactured to have a size of 150 mm×150 mm, and the liquid crystal is injected into such a liquid crystal cell, it took two hours to complete the injection. There was no change in a cell gap before and after the injection, and the uniformity of the cell gap was 1.5±0.2 µm after the injection. Also, no alignment failure was generated when a pressure of 2 kgf/cm² was applied to the liquid crystal cell.

Further, the electrode substrates 41 and 42 are combined with each other by the spacers 38, each being formed in a wall shape, so as to maintain a uniform spacing therebetween. This permits to (1) uniformalize the spacing (cell gap) with precision higher than that in the conventional arrangement and (2) strongly bond the electrode substrates 41 and 42, thereby making it possible to (a) improve the shock resistance and (b) prevent the deterioration of the alignment even when the ferroelectric liquid crystal, which is not shock resistant, is adopted.

Note that, to achieve desirable alignment, it is desirable that the angle made by the injection direction and the rubbing direction is, as shown in the liquid crystal cell of FIG. 12(a) or FIG. 13(a), 0° (same direction) or 180° (opposite direction). However, in the liquid crystal cell of FIG. 13 (b), the angle made by the injection direction and the rubbing direction is 45°. When the injection direction and the rubbing direction are not parallel to each other, as in the liquid crystal cell of FIG. 13(b), the alignment failure is caused more frequently. Therefore, compared with the liquid crystal cell of FIG. 13(b), the alignment of the liquid crystal cell of FIG. 12(a) or FIG. 13(a) is preferable.

The following will describe a liquid crystal cell having another arrangement.

Figure 14:
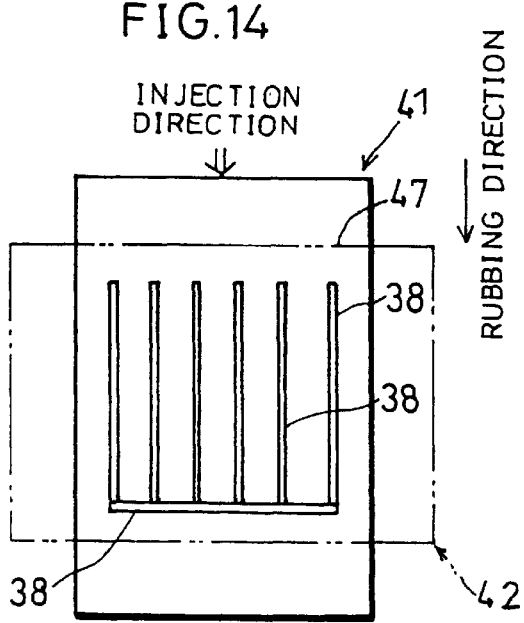
FIG. 14 is a plan view showing a structure of a liquid crystal cell wherein spacers are arranged in a U-shape with one opening on one side.

For example, in the liquid crystal cell shown in FIG. 14, the spacers 38 are provided along each side of the electrode substrate 42 except the side the injection opening 47 is provided. When the injection is carried out by the low-pressure injection method in the liquid crystal cell having such an arrangement, a pressure difference is generated across the injection opening side and the opposite side so that the injection proceeds faster. Also, since the low-pressure injection method is adopted, bubbles do not remain in the region filled with the liquid crystal, and regions not filled with the liquid crystal are not generated, thereby making it possible to obtain a desirable displaying quality. Alternatively, in the liquid crystal cell of FIG. 12(a) having the spacers 38, a sealing material or a sealant is applied to the end portion of the spacers 38 on the far side of the injection opening 47 so that the spacers 38 are arranged in a square shape with one opening on one side. This arrangement also permits to generate the pressure difference, thereby reducing the injection time.

Figure 15A:
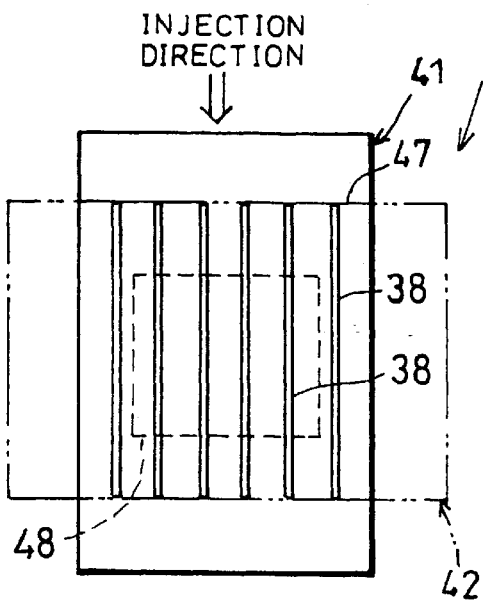
FIG. 15(a) and FIG. 15(b) are plan views respectively showing a structure of a liquid crystal cell having long spacers.
Figure 15B:
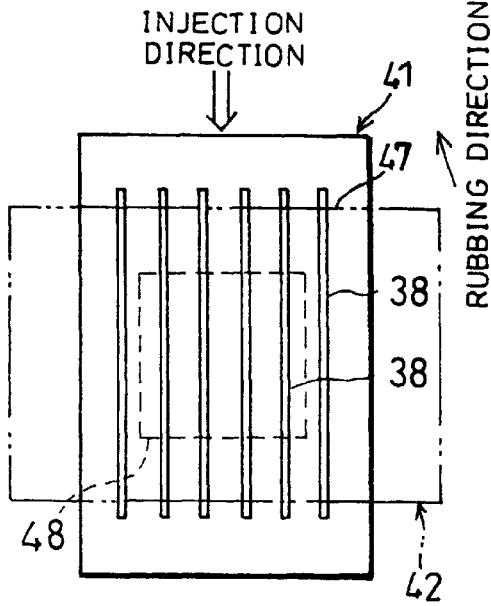

Also, in the respective liquid crystal cells of FIG. 15(a) and FIG. 15(b), the spacers 38 are provided in stripes not only on the displaying region 48 but also on a region other than the displaying region 48. Specifically, in the liquid crystal cell of FIG. 15(a), the spacers 38 are provided so as to have a length equal to the short side of the electrode substrate 42 such that the spacers 38 do not protrude from the electrode substrate 42. On the other hand, in the liquid crystal cell of FIG. 15(b), the spacers 38 are provided so as to have a length longer than the short side of the electrode substrate 42 such that the both ends of the spacers 38 slightly protrude from the electrode substrate 42. These two arrangements permit to (1) uniformalize the cell gap not only on the displaying region but also on the entire region which has been filled with the liquid crystal and (2) improve the shock resistance, thereby making it possible to obtain a desirable displaying quality.

Note that, in the liquid crystal cells of FIG. 15(a) and FIG. 15(b), because both sides of the spacers 38 provided in stripes also function as a sealing material, it is not required to provide a sealing material along the long sides of the electrode substrate 41. If still desired, a sealing material may be provided on the sides along the long sides of the electrode substrate 41 so as to be parallel to the spacers 38.

Figure 16:
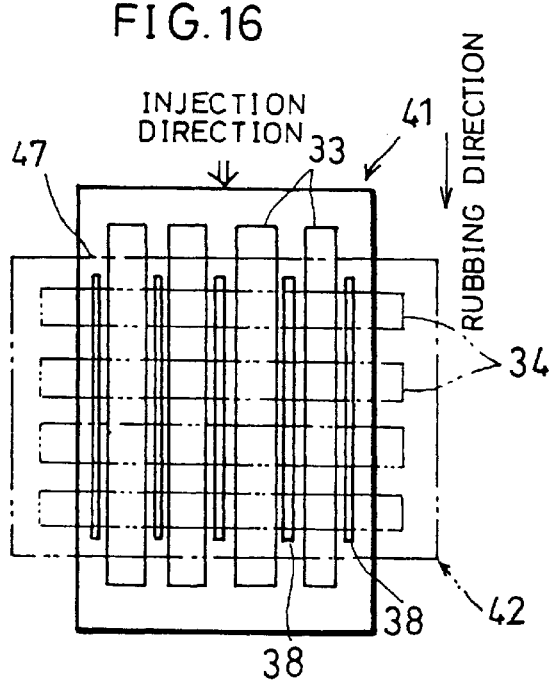
FIG. 16 is a plan view showing a structure of a liquid crystal cell provided with spacers on regions other than pixel regions.

Further, in the liquid crystal cell of FIG. 16, the spacers 38 are provided so as to avoid the pixel regions where the electrodes 33 and 34 intersect. This prevents lowering of transmittance of the pixel regions caused by the spacers 38, thereby preventing lowering of the displaying quality.

Comparative Example 3

Figure 33:
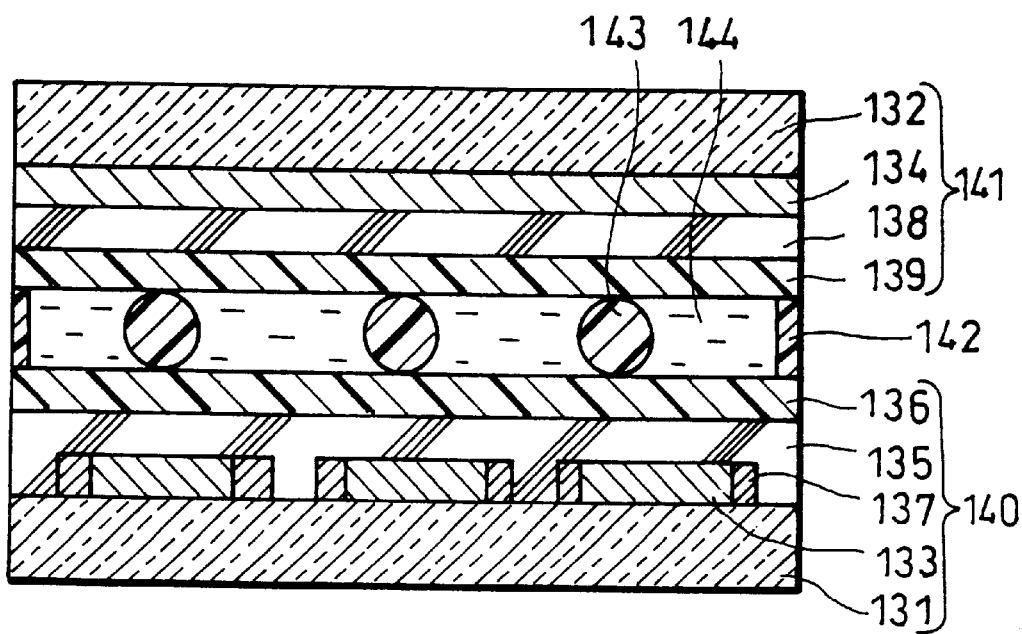
FIG. 33 is a cross sectional view showing a schematic structure of a conventional liquid crystal cell.

In order to make a comparison with the liquid crystal cells of the present embodiment, injection of liquid crystal into the conventional liquid crystal cell of FIG. 33 will be described referring to FIG. 34(b).

Figure 34A:
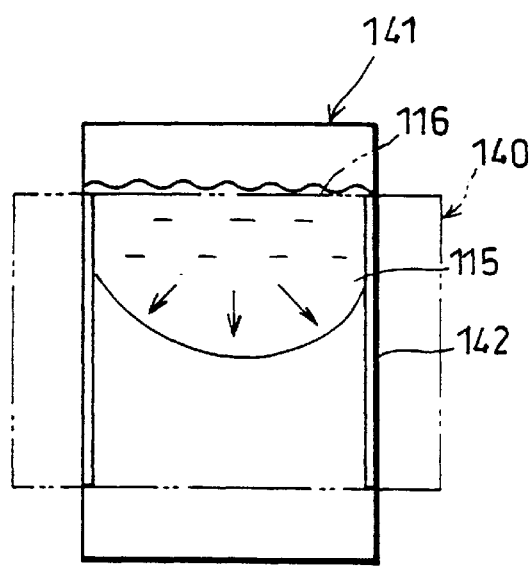
FIG. 34(a) and FIG. 34(b) are plan views respectively showing how liquid crystal is injected into the conventional liquid crystal cell.
Figure 34B:
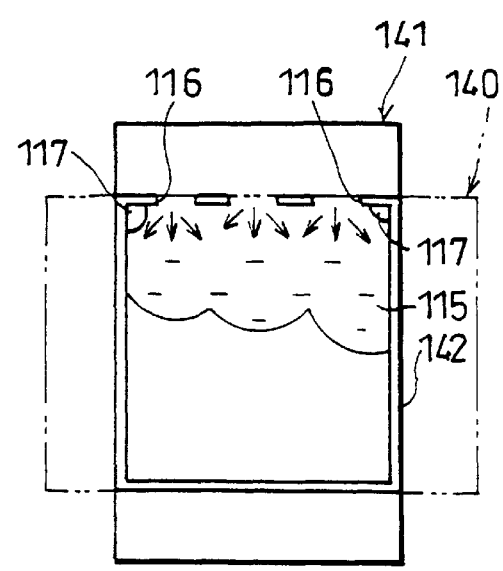

FIG. 34(b) is a plan view showing how the liquid crystal is injected into the conventional liquid crystal cell of the comparative example 3. Liquid crystal 115 injected through a plurality of injection openings 116 spreads radially between electrode substrates 140 and 141. As a result, the angle made by the injection direction and the rubbing direction differs for each pixel. Also, unfilled regions 117 are found.

When the liquid crystal cell having the described arrangement is manufactured to have a size of 150 mm×150 mm, and the liquid crystal is injected into such a liquid crystal cell, it took five hours to complete the injection. There was a large change in a cell gap before and after the injection, and the uniformity of the cell gap was 1.5±0.5 $\mu$m after the injection. Also, an alignment failure was generated when a pressure of 0.5 kgf/cm$^2$ was applied to the liquid crystal cell.

Comparative Example 4

In the present comparative example, as shown in FIG. 17(a) and FIG. 17(b), a liquid crystal cell in which the spacers 38 are provided in a direction different from that in the liquid crystal cell of FIG. 12 is manufactured. In the liquid crystal cell of FIG. 17(a), the lengthwise direction of the spacers 38 is inclined with respect to the rubbing direction, and in the liquid crystal cell of FIG. 17(b), the lengthwise direction of the spacers 38 is orthogonal to the rubbing direction. In such liquid crystal cells, when the liquid crystal is injected along the rubbing direction, smooth injection of the liquid crystal is interfered by the spacers 38. As a result, unfilled regions 59, having no liquid crystal, are generated.

As described, it was found that the liquid crystal cells of the present embodiment, compared with the liquid crystal cell manufactured by the conventional manufacturing method, have a superior alignment characteristic, uniformity of the cell gap, and shock resistance. As described, the liquid crystal display element of the present invention having an arrangement wherein a liquid crystal layer composed of liquid crystal is sandwiched between a pair of substrates, each having (1) a plurality of electrodes formed in stripes for applying a voltage to the liquid crystal layer and (2) an alignment layer for controlling the alignment of the liquid crystal, at least one of the pair of substrates being translucent, is characterized by including the following means in order to solve the above-mentioned problems. Namely, in the liquid crystal display element of the present invention, a plurality of spacers, each being formed in a form of a wall, having a uniform height are provided on at least one of the pair of substrates in a direction substantially parallel to the liquid crystal injection direction.

In the liquid crystal display element having the above-mentioned arrangement, since the spacers are provided so as to be parallel to the liquid crystal injection direction, when injecting the liquid crystal between the substrates in order to form the liquid crystal layer in the manufacturing of the present liquid crystal display element, the liquid crystal is injected along the lengthwise direction of the spacers. In other words, it is possible to control the injection direction in accordance with the direction in which the spacers are formed. This makes the angle made by the injection direction and alignment process direction coincident with respect to each pixel, thereby realizing a uniform alignment.

Also, it is possible, by the spacers, to maintain a uniform spacing (cell gap) between the substrates before and after the injection of the liquid crystal, and to improve the shock resistance.

Further, since the injection proceeds uniformly between each spacer, it is possible to eliminate regions not filled with the liquid crystal. Moreover, since the region to be filled with liquid crystal is divided into a number of narrow regions by the spacers, the liquid crystal flows smoothly through each region, thereby reducing the injection time. This makes it possible to suppress a change in composition of the liquid crystal composite, which is a problem when injecting liquid crystal under a low pressure.

It is preferable that the above liquid crystal display element is formed by injection of the liquid crystal in a direction same as or opposite to the alignment process direction of the alignment layer. With this arrangement, the liquid crystal is injected under an optimum condition wherein the angle made by the injection direction and the alignment process direction is coincident with respect to all the pixels, so that the uniformity of the alignment is further improved. Thus, it is possible to further improve the displaying quality.

In the above liquid crystal display element, it is preferable that (a) the spacers are provided on regions which are projected portions of regions between the electrodes on the substrate in a direction perpendicular to the surface of the substrate and (b) the spacers are optically isotropic.

With this arrangement, since the spacers are provided on regions other than the pixel regions, compared with the arrangement wherein the spacers are provided on the pixel regions, the problems such as below are not presented: (1) an alignment failure in a vicinity of the spacers, (2) non-uniformity in switching of liquid crystal molecules, and (3) lowering of the aperture ratio. Also, since the spacers are optically isotropic, the spacers quench under a cross nicol condition, and therefore function also as a black matrix. Thus, since the light on regions other than the pixel regions is shielded by the spacers, it is possible to improve the contrast.

Note that, the spacers are provided on regions other than the pixel regions, between all the electrodes, or on regions other than the pixel regions, between some of the electrodes.

In the liquid crystal display element, it is preferable that the injection opening for injecting liquid crystal is formed so as to have a width same as, or longer than the width of the displaying region.

In the case where a plurality of injection openings are provided on the side face of the liquid crystal display element, as shown in FIG. 34(b), the liquid crystal spreads in a wave pattern from each injection opening. Thus, in order to uniformly inject, from the injection openings, the liquid crystal into every region between the spacers, it is required to provide a certain distance between the injection openings and the spacers. For this reason, in the case where the spacers are provided on a distant position from the injection openings, it is difficult to improve the shock resistance and the uniformity of the cell gap in a region not provided with the spacers, between the injection openings and the spacers.

In contrast, in the liquid crystal display element having the above described arrangement, since the width of the injection opening is the same as, or longer than the width of the displaying region, the liquid crystal is injected uniformly into each region between the spacers through the injection opening. This makes it possible to provide the spacers without providing a distance from the injection opening, thereby making it possible to (a) improve the shock resistance of the liquid crystal cell in a vicinity of the injection opening and (b) reduce the injection time.

In the above liquid crystal display element, it is preferable that the spacers are made of light-curable resin.

In the case of forming the spacers by using, for example, an organic or inorganic material, the spacers are formed by the steps of (1) forming such a material in a predetermined thickness and (2) exposing, via a mask, the material thus formed after forming a resist film thereon. In contrast, in the case where the spacers are to be formed by adopting, as the light-curable resin, photosensitive organic resin such as photosensitive polyimide or photosensitive acrylic resin, it is not required to form the resist film, thereby simplifying the manufacturing steps and reducing the manufacturing cost.

In the above liquid crystal display element, it is preferable that the alignment layer of the substrate having the spacers is provided on the spacers, and portions of the alignment layer on the top portions of the spacers are directly bonded with the alignment layer of the other substrate so that the pair of substrates are combined with each other by the bonding of the alignment layers.

As described, since the substrates are combined with each other by the bonding of alignment layers, namely, by the direct bonding of the layers made of the same material, a problem which is presented when bonding different materials can be avoided. Specifically, it is possible to avoid problems such as (a) deformation of one of the materials due to the application of excessive heat or pressure and (b) bonding failure (insufficient bonding strength) induced by insufficient application of heat or pressure. Also, since the alignment layers are formed after providing the spacers, the alignment layers are prevented from being contaminated, deteriorated, or destroyed in the manufacturing step of the spacers, thereby achieving desirable alignment. Further, since only the alignment layers are required to be softened so as to be bonded with each other, it is not required to soften the spacers. Thus, it is possible to maintain a completely cured state of the spacers so that the cell gap can be precisely controlled. In short, in the manufacturing steps, it is possible to desirably maintain (1) the bonding of substrates, (2) the alignment of the alignment layers, (3) the uniformity of the cell gap, and (4) the shock resistance.

In the above liquid crystal display element, it is preferable that the alignment layer of the substrate having the spacers is provided on the spacers, and portions of the alignment layer on the top portions of the spacers are bonded with the alignment layer of the other substrate via an adhesive layer so that the pair of substrates are combined with each other by the bonding of the alignment layers via the adhesive layer.

As described, since the alignment layers are bonded with each other via the adhesive layer, it is not required to soften the alignment layers. Thus, the alignment effect of the alignment layers is prevented from being lost. Also, as in the afore-mentioned liquid crystal display element, it is not required to soften the spacers in order to bond the alignment layers with each other. Therefore, it is possible, in the manufacturing steps, to desirably maintain (1) the alignment effect of the alignment layers, (2) the uniformity of the cell gap, and (3) the shock resistance.

In the above liquid crystal display element, it is preferable that the spacers are provided on the alignment layer of one of the substrates, and the top portions of the spacers are bonded with the alignment layer of the other substrate so that the pair of substrates are combined with each other by the bonding of the spacers and the alignment layer.

For example, in the case where the alignment layers are formed by using a material such as soluble polyimide which has undergone imidization (although not completely), the bonding strength of the alignment layers is remarkably low. However, in the arrangement wherein the spacers are bonded with the alignment layers, even when the alignment layers are made of soluble polyimide, it is possible to strengthen the bonding strength. Thus, it is possible to precisely maintain the uniformity of the cell gap and the shock resistance, regardless of the material used to form the alignment layers.

In the above liquid crystal display element, it is preferable that the liquid crystal is made of ferroelectric liquid crystal. That is to say, as described, since the liquid crystal display element of the present invention is highly shock resistant, even when ferroelectric liquid crystal, which is not resistant to shock, is adopted, the alignment of the ferroelectric liquid crystal is prevented from being lost in response to a shock. Thus, it is possible to utilize desirable characteristics of ferroelectric liquid crystal, thereby realizing large capacity and highly detailed displaying with ease.

In order to solve the above-mentioned problems, the manufacturing method of the liquid crystal display element of the present invention for manufacturing a liquid crystal display element having an arrangement wherein a liquid crystal layer composed of liquid crystal is sandwiched between a pair of substrates, each having (1) a plurality of electrodes formed in stripes for applying a voltage to the liquid crystal layer and (2) an alignment layer for controlling the alignment of the liquid crystal, at least one of the pair of substrates being translucent, is characterized by including the following means.

Namely, the manufacturing method of the above liquid crystal display element includes the steps of (1) forming, on at least one of the pair of substrates, a plurality of spacers, each being formed in the form of a wall, having a uniform height, (2) combining the pair of substrates via the spacers, and (3) injecting liquid crystal between the pair of substrates along the lengthwise direction of the spacers.

In this manufacturing method, in the case where, in step (1), the spacers are formed in parallel to the electrodes, in step (3), upon injection of the liquid crystal along the lengthwise direction of the spacers, the direction of the liquid crystal flowing between the substrates is controlled by the spacer in a specific direction. This makes the angle made by the injection direction and the rubbing direction coincident with respect to each pixel, thereby realizing uniform alignment.

Also, by the spacers, it is possible to (1) maintain the uniformity of the cell gap before and after the injection and (2) improve the shock resistance.

Further, since the injection of liquid crystal proceeds uniformly between each spacer, it is possible to eliminate regions not filled with liquid crystal. Moreover, since the region to be filled with liquid crystal is divided into a number of narrow regions by the spacers, the liquid crystal flows smoothly through each region, thereby reducing the injection time. This makes it possible to suppress a change in composition of the liquid crystal composite, which is a problem when injecting liquid crystal under a low pressure.

In the manufacturing method of the above liquid crystal display element, it is preferable that, in step (3), the liquid crystal is injected in a direction same as, or opposite to the alignment process direction of the alignment layers.

This makes it possible to inject the liquid crystal under an optimum condition wherein the angle made by the injection direction and the alignment process direction is coincident with respect to all the pixels so that the uniformity of the alignment is further improved, thereby further improving the displaying quality.

In the manufacturing method of the above liquid crystal display element, it is preferable, in step (1), that the spacers are formed by using light-curable resin.

In the case where the spacers are to be formed by adopting, as the light-curable resin, photosensitive organic resin such as photosensitive polyimide or photosensitive acrylic resin, it is not required to form the resist film which is required when the spacers are formed by using an organic or inorganic material, thereby simplifying the manufacturing steps, and reducing the manufacturing cost.

It is preferable that the manufacturing method of the above liquid crystal display element further includes, after step (1), a step of forming the alignment layers so as to cover not only the substrates but also the spacers of the substrate provided with the spacers, and in step (2), portions of the alignment layer of one of the substrates, on the top portions of the spacers, are directly bonded with the alignment layer of the other substrate so as to combine the pair of substrates.

As described, in step (2), since the substrates are combined by the bonding of the alignment layers, namely by the direct bonding of layers made of the same material, a bonding failure which occurs when bonding different materials is not presented. Also, since the alignment layers are formed after providing the spacers, the alignment layers are prevented from being contaminated, deteriorated, or destroyed in manufacturing of the spacers. Thus, it is possible to obtain desirable alignment. Further, in step (2), since only the alignment layers are required to be softened so as to be bonded with each other, it is possible to maintain a completely cured state of the spacers. In short, in the manufacturing steps, it is possible to desirably maintain (1) the bonding of substrates, (2) the alignment of the alignment layers, (3) the uniformity of the cell gap, and (4) the shock resistance.

It is preferable that the manufacturing method of the above liquid crystal display element further includes, after step (1), the steps of (a) forming the alignment layers so as to cover not only the substrates but also the spacers of the substrate provided with the spacers, and (b) forming the adhesive layer on portions of the alignment layer covering the spacers, on the top portions of the spacers, and in step (2), the alignment layers are bonded with each other via the adhesive layer so as to combine the pair of substrates.

As described, in step (2), since the alignment layers are bonded with each other via the adhesive layers, it is not required to soften the alignment layers. Further, it is possible to bond the alignment layers with each other without completely softening the spacers. Thus, in the manufacturing steps, it is possible to desirably maintain (a) the alignment of liquid crystal, (b) the uniformity of the cell gap, and (c) the shock resistance.

It is preferable that the manufacturing method of the liquid crystal display element further includes, after step (1), the step of forming the alignment layer so as to cover the substrate, and after forming the spacer on the alignment layer thus formed, in step (2), the top portions of the spacers are bonded to the facing alignment layer so as to combine the pair of substrates.

As described, in step (2), the spacers are bonded with the alignment layer. Hence, compared with the case of bonding with each other the alignment layers made of soluble polyimide, the bonding strength can be improved, thereby making it possible to desirably maintain the uniformity of the cell gap and the shock resistance, regardless of the material used to form the alignment layers.

Fourth Embodiment

Figure 18:
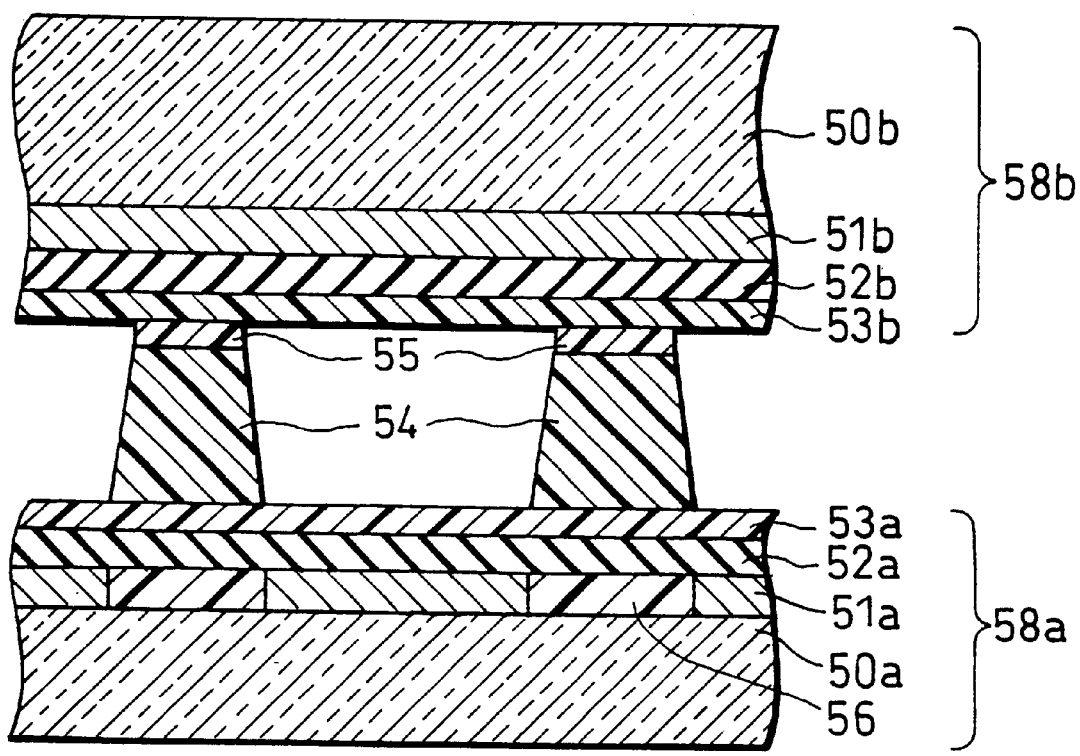
FIG. 18 is a cross sectional view showing a schematic structure of a liquid crystal cell in accordance with a fourth embodiment of the present invention.
Figure 19:
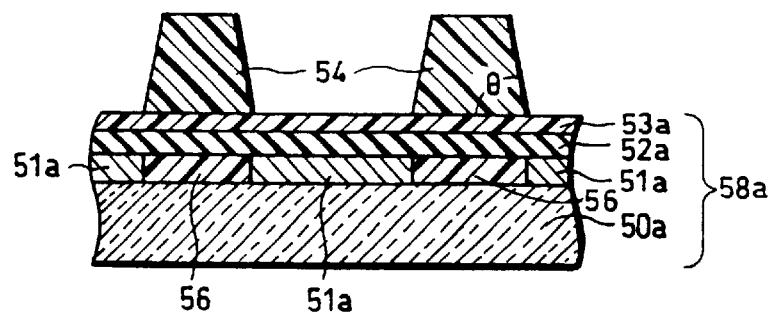
FIG. 19(a) through FIG. 19(d) are cross sectional views respectively showing main manufacturing steps of the liquid crystal cell.

The following will describe the fourth embodiment of the present invention referring to FIG. 18 and FIG. 19.

FIG. 18 is a cross sectional view showing a structure of a liquid crystal cell in accordance with the present embodiment. The liquid crystal cell is provided with two glass substrates 50a and 50b.

On the glass substrate 50a, there are provided scanning lines (scanning electrodes) 51a formed in stripes, and black matrices (light shielding layer) 56 formed so as to occupy the spaces between scanning lines 51a. On the scanning lines 51a and the black matrices 56 thus provided, an insulating layer 52a, and an alignment layer 53a are laminated in this order. Hereinafter, a structure composed of the glass substrate 50a, the scanning lines 51a, the black matrices 56, the insulating layer 52a, and the alignment layer 53a will be referred to as a scanning line substrate 58a.

On the surface of the glass substrate 50b, signal lines (signal electrodes) 51b formed in stripes, an insulating layer 52b, and an alignment layer 53b are laminated in this order. Hereinafter, a structure composed of the glass substrate 50b, the signal lines 51b, the insulating layer 52b, and the alignment layer 53b will be referred to as a signal line substrate 58b.

The scanning line substrate 58a and the signal line substrate 58b are combined with each other such that the respective surfaces thereof respectively provided with the alignment layers 53a and 53b face each other, and the scanning lines 51a and the signal lines 51b are orthogonal to each other.

Between the scanning line substrate 58a and the signal line substrate 58b, polymeric walls 54, each being formed in a wall shape, are provided along the lengthwise direction of the scanning lines 51a. The polymeric wall 54 has a trapezoidal cross section with respect to a plane perpendicular to the lengthwise direction of the scanning lines 51a. On the upper surface of the polymeric wall 54 (on the side of the upper base of the trapezoid), a bonding layer 55 is provided. By the bonding layer 55, the polymeric wall 54 and the alignment layer 53b of the signal line substrate 58 are strongly bonded with each other. Note that, liquid crystal (not shown) fills the spacing between the alignment layers 53a and 53b.

The following will describe the manufacturing method of the described liquid crystal cell referring to FIG. 19(a) through FIG. 19(d).

First, on the entire surface of the glass substrate 50a, a film made of indium-tin-oxide (ITO) having a thickness of 200 nm is formed by the spattering vapor deposition or EB vapor deposition method, thereafter a photoresist is spin-coated. Then, after patterning the photoresist in stripes by photolithography using an ITO electrode forming-use photomask and a UV light exposing device, the glass substrate 50a thus prepared so far is soaked in a solution of 47 per cent by weight of hydrogen bromide at a temperature of 35° C. for 10 minutes so as to carry out etching of the scanning lines 51a.

Note that, as the photo resist, for example, TSMR-8800 provided by Tokyo Ohka Kogyo Co., Ltd. may be adopted. Also, the etching process is carried out so that the width of a scanning line 51a is 385 $\mu$m, the length of a pixel portion is 192 mm, and the width of a space between adjacent scanning lines 51a is 15 $\mu$m.

Secondly, the glass substrate 50a thus provided with the scanning lines 51a is washed by pure water, and after drying, the black matrices 56 made of resin or Si are formed thereon. On the glass substrate complex thus prepared, the insulating layer 52a made of silicon dioxide ($SiO_2$) or silicon nitride (SiN), and the alignment layer 53a made of polyimide are formed in this order. Thereafter, the alignment layer 53a is subjected to uniaxial alignment processing by rubbing.

The scanning line substrate 58a is manufactured by the described steps.

Thirdly, negative-type photosensitive acrylic resin (V-259PA provided by Nippon Steel Chemical Co., Ltd.) is spin-coated on the surface of the alignment layer 53a, and by photolithography with a proximity gap of 50 $\mu$m, the polymeric wall 54 having a height of 1.5 $\mu$m, and a trapezoidal cross section whose lower and upper sides respectively have widths of 15 $\mu$m and 10 $\mu$m is formed.

In this step, as shown in FIG. 19(a), the polymeric wall 54 having a trapezoidal cross section is formed on the surface of the scanning line substrate 58a. Despite the fact that the polymeric wall 54 is made of a transparent material which is optically isotropic, because the polymeric wall 54 is sandwiched between two polarizing plates which are orthogonal to each other, the polymeric wall 54 has a light shielding characteristic.

Note that, in order to make sure that the polymeric wall 54 has a trapezoidal cross section, it is effective to use a photosensitive polymeric material having a resolution smaller than the width of the lower side of the trapezoid. It is also effective to (1) set it wide the proximity gap of the proximity exposing device or (2) extend the developing time.

Figure 19B:
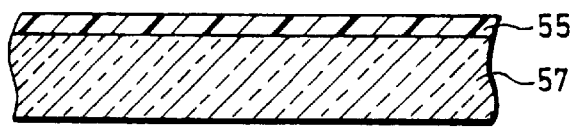
Figure 19C:
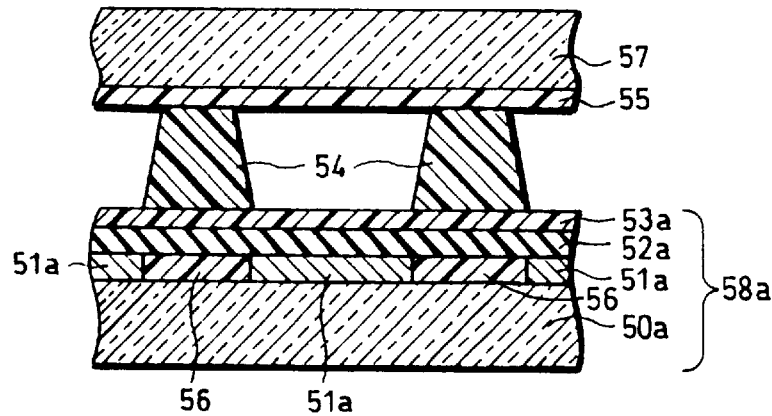
Figure 19D:
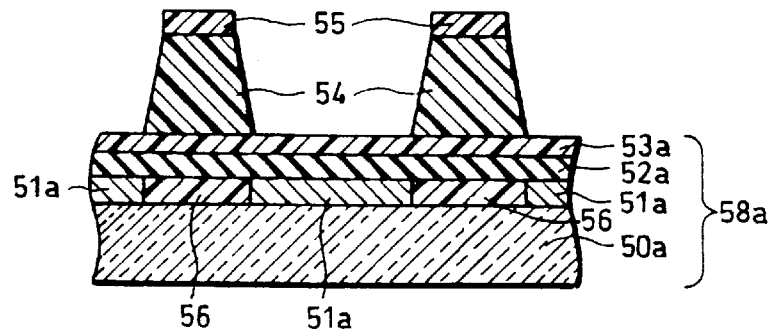

Fourthly, by the processes of FIG. 19(b) through FIG. 19(d), the bonding layer 55 is formed on the upper surface of the polymeric wall 54. As shown in FIG. 19(b), on a flat transfer substrate 57 which is used to transfer a bonding agent to the polymeric wall 54, an adhesive resin film which has been diluted in a solvent is formed. Here, a two-liquid epoxylic bonding agent (composed of 1 g of main agent and 1 g of curing agent, provided by Konishi Co., Ltd., product name "Bond E") which has been diluted in 25 cc of n-butyl cellosolve is formed by the spin coating method so as to have a film thickness of 200 nm.

Alternatively, it is also possible to form the bonding layer 55 by the spraying method in which the diluted two-liquid bonding agent is sprayed on the polyimide film formed on the transfer substrate 57. Here, a letter press, gravure, or offset printing method is adopted to transfer the bonding agent on the substrate 57.

Then, after drying the solvent contained in the bonding layer 55 at a temperature of 80° C. for 180 seconds, as shown in FIG. 19(c), the scanning line substrate 58a and the transfer substrate 57 are pneumatic-pressed under the pressure of 1.5 kgf/cm$^2$ so as to bond temporarily the scanning line substrate 58a and the transfer substrate 57 levelly. Here, the upper surface of the polymeric wall 54 and the bonding layer 55 are bonded with each other. Then, the scanning line substrate 58a and the transfer substrate 57 are slowly separated from one another. As a result, as shown in FIG. 19(d), the bonding layer 55 is transferred from the transfer substrate 57 to the upper surface of the polymeric layer 54 of the scanning line substrate 58a.

Note that, it is required that the transfer substrate 57 (1) is not deteriorated by the solvent of the adhesive resin and (2) does not interfere with the transferring of the adhesive resin.

Finally, the scanning line substrate 58a thus manufactured and the signal line substrate 58b, which has been manufactured in the same manner, are faced each other so as to inject the liquid crystal into a spacing between the substrates 58a and 58b bonded with each other by vacuuming, thereby completing the manufacturing of the liquid crystal cell.

Note that, in order to ensure the bonding of the polymeric wall 54 and the alignment layer 53b, it is preferable that the base angle θ of the trapezoid, which is a cross section of the polymeric wall 54 with respect to the plane perpendicular to the lengthwise direction of the polymeric wall 54, is between 10° to 65°. In other words, it is preferable that the lower side of the trapezoid is longer than the upper side of the trapezoid by the length of 1 to 10 times the height of the trapezoid.

As described, the liquid crystal cell in accordance with the present embodiment has an arrangement wherein a uniform spacing between the scanning line substrate 58a and the signal line substrate 58b is maintained by the polymeric wall 54 having a trapezoidal cross section with respect to the plane perpendicular to its lengthwise direction, and (1) the polymeric wall 54 and (2) the alignment layer 53b of the signal line substrate 58b are strongly bonded with each other by the bonding layer 55 selectively provided on the upper surface of the polymeric wall 54.

As described, since the scanning line substrate 58a and the signal line substrate 58b are bonded with each other by the bonding layer 55, it is possible to improve the substrate strength against an external force such as compression and tension so that it is possible to realize a liquid crystal cell which does not deform easily. As a result, a uniform cell thickness can be maintained, thereby making it possible to provide a liquid crystal cell without displaying failure.

Further, since the bonding layer 55 is selectively provided only on the upper surface of the polymeric wall 54, it is possible to reduce the adverse effect of the bonding agent on the alignment of the liquid crystal of the pixel regions so that the displaying quality is prevented from lowering. Even in the case, by a rare event, where the bonding agent of the bonding layer 55 slightly protrudes from the upper surface of the polymeric wall 54 when solderless-connecting the polymeric wall 54 and the alignment layer 53b, since the polymeric wall 54 has a trapezoidal cross section, the adverse effect of the protruded bonding agent, on the alignment of the liquid crystal, spreads no larger than the lower surface of the polymeric wall 54.

Namely, compared with the conventional spacers having a uniform width provided in the form of a wall, in the liquid crystal cell of the present embodiment, the alignment of the liquid crystal is not adversely effected by the protruded bonding agent, thereby realizing a sufficient substrate strength. Therefore, it is possible to provide a liquid crystal display element with an improved displaying quality.

Also, since the ferroelectric liquid crystal is not as shock resistant as the nematic liquid crystal or other types of liquid crystal, once the alignment state of the ferroelectric liquid crystal is disturbed by an external force, it is difficult to restore the original alignment state. For this reason, ferroelectric liquid crystal has a drawback in that displaying failure is easily generated. However, as in the liquid crystal cell of the present embodiment, by adopting the ferroelectric liquid crystal in combination with a cell structure having a sufficient substrate strength, such a drawback can be overcome, and it is possible to realize a liquid crystal cell utilizing desirable characteristics of the ferroelectric liquid crystal such as a high speed response and a memory effect.

As described, the manufacturing method of the liquid crystal display element in accordance with the present invention includes the steps of (1) forming, on the alignment layer of one of the substrates along the lengthwise direction of the electrodes, the polymeric wall having a trapezoidal cross section with respect to the plane perpendicular to the lengthwise direction of the electrodes so that the lower surface of the polymeric wall, corresponding to the longer base of the cross sectional trapezoid, is in contact with the alignment layer, (2) applying a bonding agent to the flat transfer substrate, (3) pressing against the upper surface of the polymeric wall corresponding to the shorter base of the trapezoidal cross section so as to transfer the bonding agent from the transfer substrate to the upper surface of the polymeric wall, and (4) bonding the bonding agent transferred to the upper surface of the polymeric wall to the other substrate.

With the described manufacturing method, the substrate strength can be improved against an external force such as compression and tension so that the problem of the conventional liquid crystal display element such as lowering of displaying quality in response to a change in the cell thickness can be solved. Note that, since the bonding agent is selectively transferred only to the upper surface of the polymeric wall, the alignment of the liquid crystal of the pixel regions is prevented from being adversely affected by the bonding agent. Further, even in the case, by a rare event, where the bonding agent slightly protrudes from the upper surface of the polymeric wall, since the polymeric wall has a trapezoidal cross section, the adverse effect of the bonding agent, on the alignment of the liquid crystal, protruded from the upper surface of the polymeric wall spreads no larger than the lower surface of the polymeric wall. This makes it possible to improve the substrate strength without causing disturbance in the alignment of the liquid crystal, thereby making it possible to provide a liquid crystal display element having a high displaying quality.

Note that, in the described manufacturing method, it is preferable that the base angle of the trapezoid is between 10° to 65°. This makes it possible to further improve the bonding of the pair of substrates.

The liquid crystal display element of the present invention has an arrangement wherein on the alignment layer of one of the substrates, along the lengthwise direction of the electrodes, the polymeric wall having a trapezoidal cross section with respect to the plane perpendicular to the lengthwise direction of the electrodes is provided so that (1) the lower surface corresponding to the longer base of the trapezoidal cross section contacts the alignment layer of the substrate and (2) the polymeric wall is bonded to the other substrate by the bonding agent applied only to the upper surface corresponding to the shorter base of the trapezoidal cross section.

With the described arrangement, it is possible to improve the substrate strength against an external force such as compression and tension so that the problem of the conventional liquid crystal display element such as lowering of displaying quality in response to a change in the cell thickness can be solved. Note that, since the bonding agent is selectively transferred only to the upper surface of the polymeric wall, the alignment of the liquid crystal of the pixel regions is prevented from being adversely affected by the bonding agent. Further, even in the case, by a rare event, where the bonding agent slightly protrudes from the upper surface of the polymeric wall, since the polymeric wall has a trapezoidal cross section, the adverse effect of the bonding agent, on the alignment of the liquid crystal, protruded from the upper surface of the polymeric wall spreads no larger than the lower surface of the polymeric wall. This makes it possible to improve the substrate strength without causing disturbance in the alignment of the liquid crystal, thereby making it possible to provide a liquid crystal display element having a high displaying quality.

Fifth Embodiment

Figure 20:
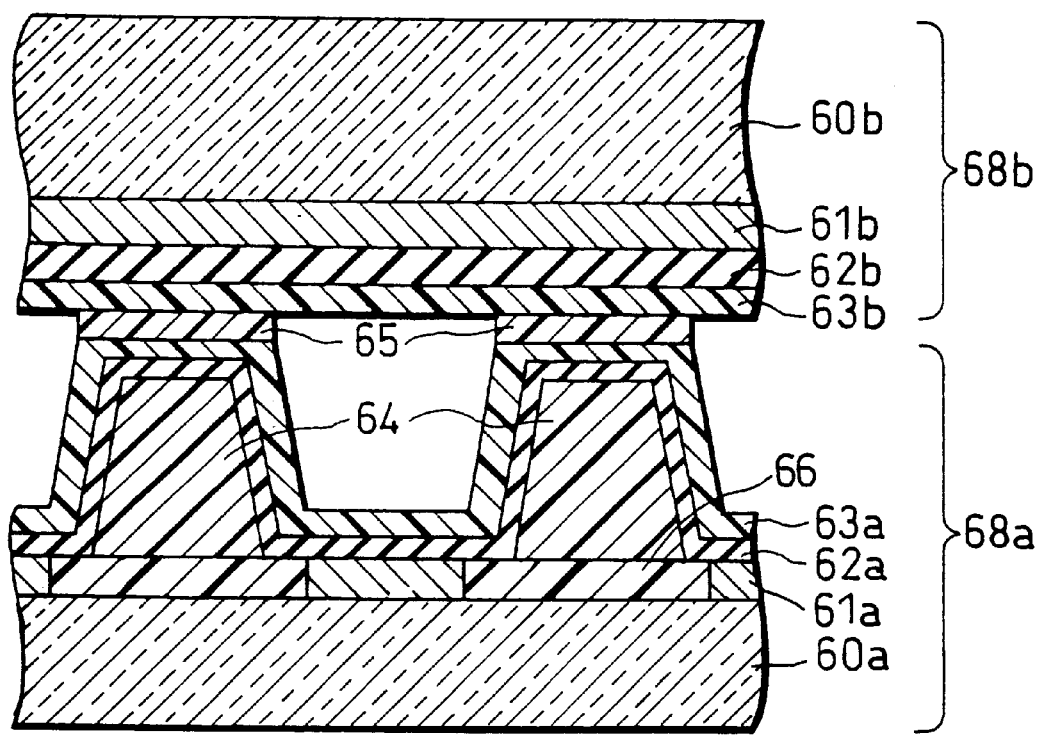
FIG. 20 is a cross sectional view showing a schematic structure of a liquid crystal cell in accordance with a fifth embodiment of the present invention.
Figure 21:
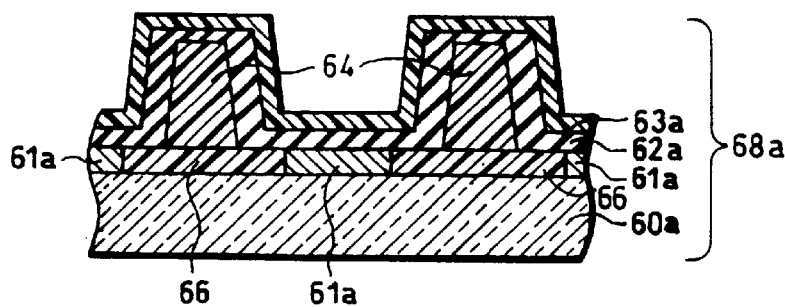
FIG. 21(a) through FIG. 21(d) are cross sectional views respectively showing main manufacturing steps of the liquid crystal cell of FIG. 20.

The following will describe the fifth embodiment of the present invention referring to FIG. 20 and FIG. 21.

FIG. 20 is a cross sectional view showing a structure of a liquid crystal cell in accordance with the present embodiment. The liquid crystal cell is provided with two glass substrates 60a and 60b.

On the surface of the glass substrate 60a, there are provided scanning lines 61a formed in stripes, and black matrices 66 occupying the spaces between the scanning lines 61a. On the black matrices 66 thus provided, polymeric walls 64 each having a width shorter than that of a black matrix 66 are provided along the lengthwise direction of the black matrices 66. The polymeric wall 64 has a trapezoidal cross section with respect to the line perpendicular to the lengthwise direction of the black matrices 66.

Further, an insulating layer 62a and an alignment layer 63a are laminated in this order so as to cover the scanning lines 61a, the black matrices 66, and the polymeric wall 64. Hereinafter, a structure composed of the glass substrate 60a, the scanning lines 61a, the black matrices 66, the polymeric wall 64, the insulating layer 62a, and the alignment layer 63a will be referred to as a scanning line substrate 68a.

In the same manner, on the glass substrate 60b, there are provided signal lines 61b formed in stripes, an insulating layer 62b, and an alignment layer 63b. Hereinafter, a structure composed of the glass substrate 60b, the signal lines 61b, the insulating layer 62b, and the alignment layer 63b will be referred to as a signal line substrate 68b.

The scanning line substrate 68a and the signal line substrate 68b are provided so that the scanning lines 61a and the signal lines 61b are orthogonal to each other, and (1) the alignment layer 63a on the upper surface portion of the polymeric wall 64 of the scanning line substrate 68a and (2) the alignment layer 63b on the side of the signal line substrate 68b are strongly bonded with each other. Note that, liquid crystal (not shown) fills the spacing between the alignment layers 63a and 63b.

The following will describe the manufacturing method of the liquid crystal cell having the described arrangement referring to FIG. 21(a) through FIG. 21(d).

First, on the entire surface of the glass substrate 60a, an indium-tin-oxide (ITO) film having a thickness of 200 nm is formed by the spattering vapor deposition or EB vapor deposition method, thereafter a photoresist is spin-coated thereon. After patterning the photoresist in stripes by photolithography using an ITO electrode forming-use photomask and a UV light exposing device, the glass substrate 60a thus prepared is soaked in a solution of 47 per cent by weight of hydrogen bromide at a temperature of 35° C. for 10 minutes so as to carry out etching of the scanning lines 61a.

Note that, as the photoresist, for example, TSMR-8800 provided by Tokyo Ohka Kogyo Co., Ltd. may be adopted.

Also, the etching process is carried out so that the width of a scanning line 61a is 385 μm, the length of a pixel portion is 192 mm, and the width of a space between adjacent scanning lines 61a is 15 μm.

Secondly, the glass substrate 60a thus provided with the scanning lines 61a is washed by pure water, and after drying, the black matrices 66 made of resin or Si are provided thereon.

Thirdly, negative-type photosensitive acrylic resin (V-259PA provided by Nippon Steel Chemical Co., Ltd.) is spin-coated on the surface of the glass substrate complex thus prepared, and by photolithography with a proximity gap of 50 μm, the polymeric wall 64 having a height, a width of the lower side, and a width of the upper side of 1.5 μm, 15 μm, and 10 μm, respectively, is formed. Despite the fact that the polymeric wall 64 is made of a transparent material which is optically isotropic, because the polymeric wall 64 is sandwitched between two polarizing plates which are orthogonal to each other, the polymeric wall 64 shows a light shielding characteristic.

On the glass substrate complex thus prepared, the insulating layer 62a made of silicon dioxide ($SiO_2$) or silicon nitride (SiN), and the alignment layer 63a made of polyimide are formed in this order. Thereafter, the alignment layer 63a is subjected to uniaxial alignment processing by rubbing.

As shown in FIG. 21(a), the scanning line substrate 68a is manufactured by the described steps.

Figure 21B:
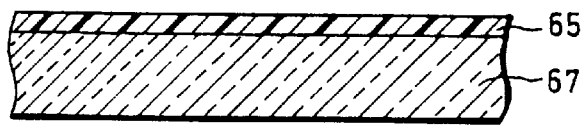
Figure 21C:
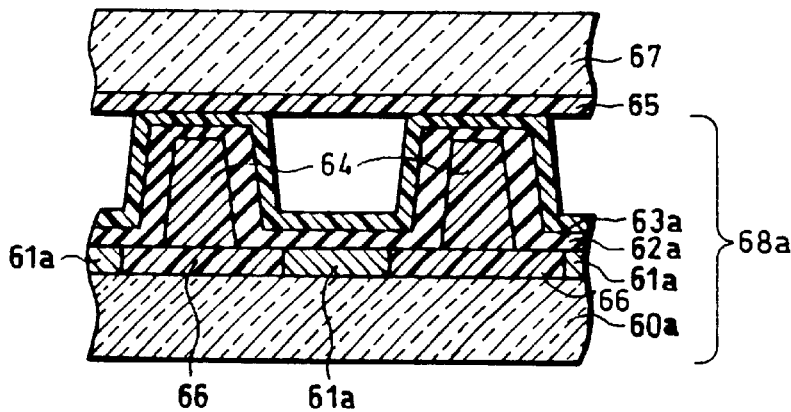
Figure 21D:
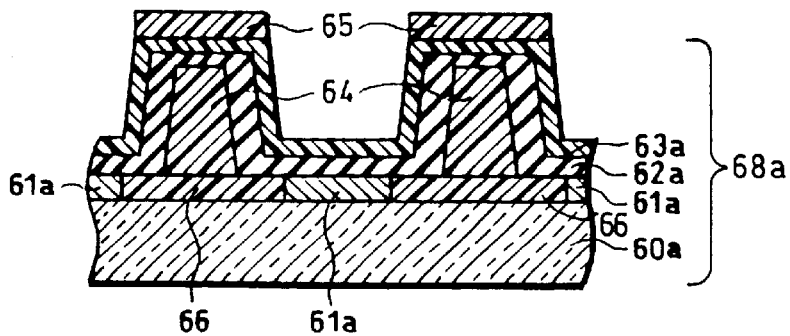

Fifth, by the processes of FIG. 21(b) through FIG. 21(d), a bonding layer 65 is formed on the surface of the alignment layer 63a on the upper surface of the polymeric wall 64. As shown in FIG. 21(b), on a flat transfer substrate 67 which is used to transfer a bonding agent to the alignment layer 63a on the upper surface of the polymeric wall 64, an adhesive resin film which has been diluted in a solvent is formed. Here, a two-liquid epoxylic bonding agent (composed of 1 g of main agent and 1 g of curing agent, provided by Konishi Co., Ltd., product name "Bond E") which has been diluted in 25 cc of n-butyl cellosolve is formed by the spin coating method so as to have a thickness of 200 nm.

Alternatively, it is also possible to form the bonding layer 65 by the spraying method in which the diluted two-liquid bonding agent is sprayed on the polyimide film formed on the transfer substrate 67. Here, a letter press, gravure, or offset printing method is adopted to transfer the bonding agent on the substrate 67.

Then, after drying the solvent contained in the bonding layer 65 at a temperature of 80° C. for 180 seconds, as shown in FIG. 21(c), the scanning line substrate 68a and the transfer substrate 67 are pneumatic-pressed under the pressure of 1.5 kgf/cm² so as to bond temporarily the scanning line substrate 68a and the transfer substrate 67 levelly. Here, (a) the alignment layer 63a on the upper surface of the polymeric wall 64 and (b) the bonding layer 65 are bonded with each other. Then, the scanning line substrate 68a and the transfer substrate 67 are slowly separated from one another. As a result, as shown in FIG. 21(d), the bonding layer 65 is transferred from the transfer substrate 67 to the alignment layer 63a on the upper surface of the polymeric layer 64 of the scanning line substrate 68a.

Note that, it is required that the transfer substrate 67 (a) is not deteriorated by the solvent of the adhesive resin and (b) does not interfere with the transferring of the adhesive resin.

Finally, the scanning line substrate 68a thus manufactured and the signal line substrate 68b, which has been manufactured in the same manner, are faced each other so as to inject the liquid crystal into a spacing between the substrates 68a and 68b bonded with each other by vacuuming, thereby completing the manufacturing of the liquid crystal cell.

As described, the liquid crystal cell in accordance with the present embodiment has an arrangement wherein a uniform spacing between the scanning line substrate 68a and the signal line substrate 68b is maintained by the polymeric wall 64 having a trapezoidal cross section with respect to the plane perpendicular to its lengthwise direction, and (1) the polymeric wall 64 and (2) the alignment layer 63b of the signal line substrate 68b are strongly bonded with each other by the bonding layer 65 selectively provided on the upper surface of the polymeric wall 64.

With this arrangement, it is possible to improve the substrate strength against an external force such as compression and tension so that it is possible to realize a liquid crystal cell which does not deform easily. As a result, a uniform cell thickness can be maintained, thereby making it possible to provide a liquid crystal cell without displaying failure.

Further, since the bonding layer 65 is selectively provided only on portions of the alignment layer 63a covering the upper surface of the polymeric wall 64, it is possible to prevent lowering of the displaying quality due to protrusion of the bonding agent on the pixel regions. Even in the case, by a rare event, where the bonding agent of the bonding layer 65 slightly protrudes from the upper surface of the polymeric wall 64 when solderless-connecting the alignment layers 63a and 63b, since the polymeric wall 64 has a trapezoidal cross section, the adverse effect of the protruded bonding agent, on the alignment of the liquid crystal, spreads no larger than the lower surface of the polymeric wall 64, thereby realizing a liquid crystal cell with an improved displaying quality.

Further, since the polymeric wall 64 is covered with the alignment layer 63a, compared with the arrangement described in the fourth embodiment, the polymeric wall 64 does not come in a direct contact with the liquid crystal; thus, the alignment of the liquid crystal is not disturbed by the polymeric wall, thereby making it possible to provide a liquid crystal cell with a further improved displaying quality.

The invention being thus described, it will be obvious that the same way may be varied in many ways. Such variations are not to be regarded as a departure from the spirit and scope of the invention. For example, the manufacturing conditions such as the material of the bonding layers 55 and 56, various film thicknesses, and the strength of solderless-connecting specified in the above explanations are one example, and therefore the present invention is not limited to the specified ones.

As described, the manufacturing method of the liquid crystal display element in accordance with the present invention includes the steps of (1) forming, on one of the substrates along the lengthwise direction of the electrodes, the polymeric wall having a trapezoidal cross section with respect to the plane perpendicular to the lengthwise direction of the electrodes so that the lower surface of the polymeric wall, corresponding to the longer base of the trapezoidal cross section, is in contact with the alignment layer, (2) forming the alignment layer so as to cover the polymeric wall, (3) applying a bonding agent on the flat transfer substrate, (4) pressing against the alignment layer on the upper surface of the polymeric wall corresponding to the shorter base of the trapezoidal cross section so as to transfer the bonding agent from the transfer substrate to the alignment layer on the upper surface of the polymeric wall, and (5) bonding the bonding agent transferred to the alignment layer to the other substrate.

With the described manufacturing method, the substrate strength can be improved against an external force such as compression and tension so that the problem of the conventional liquid crystal display element such as lowering of displaying quality in response to a change in the cell thickness can be solved. Note that, since the alignment layer is formed so as to cover the polymeric wall, compared with the afore-mentioned manufacturing method, such a problem that the alignment of the liquid crystal is disturbed at the periphery of the polymeric wall is not presented, thereby having an advantage in that a desirable alignment state can be obtained.

Note that, since the bonding agent is selectively transferred only to the alignment layer covering the upper surface of the polymeric wall, the alignment of the liquid crystal of the pixel regions is prevented from being adversely affected by the bonding agent. Further, even in the case, by a rare event, where the bonding agent slightly protrudes from the alignment layer covering the upper surface of the polymeric wall, since the polymeric wall has a trapezoidal cross section, the adverse effect of the protruded bonding agent, on the alignment of the liquid crystal, spreads no larger than the lower surface of the polymeric wall. This makes it possible to improve the substrate strength without causing disturbance in the alignment of the liquid crystal, thereby making it possible to provide a liquid crystal display element having a high displaying quality.

Note that, in the described manufacturing method, it is preferable that the base angle of the trapezoid is between 10° to 65°. This makes it possible to further improve the bonding of the pair of substrates.

The liquid crystal display element of the present invention has an arrangement wherein on one of the substrates, along the lengthwise direction of the electrodes, there are provided (1) the polymeric wall having a trapezoidal cross section with respect to the plane perpendicular to the lengthwise direction of the electrodes and (2) the alignment layer provided so as to cover the polymeric wall, and a bonding agent is applied to a portion of the alignment layer covering the surface corresponding to a shorter base of the trapezoidal cross section, the bonding agent bonding the other substrate.

With the described arrangement, it is possible to improve the substrate strength against an external pressure such as compression and tension so that the problem of the conventional liquid crystal display element such as lowering of displaying quality in response to a change in the cell thickness can be solved. Note that, since the alignment layer is formed so as to cover the polymeric wall, compared with the liquid crystal display element of the fourth embodiment, such a problem that the alignment of the liquid crystal is disturbed at the periphery of the polymeric wall is not presented, thereby having an advantage in that a desirable alignment state can be obtained.

Note that, since the bonding agent is selectively transferred only to the alignment layer covering the upper surface of the polymeric wall, the alignment of the liquid crystal of the pixel regions is prevented from being adversely affected by the bonding agent. Further, even in the case, by a rare event, where the bonding agent slightly protrudes from the alignment layer covering the upper surface of the polymeric wall, since the polymeric wall has a trapezoidal cross section, the adverse effect of the protruded bonding agent, on the alignment of the liquid crystal, spreads no larger than the lower surface of the polymeric wall. This makes it possible to improve the substrate strength without causing disturbance in the alignment of the liquid crystal, thereby making it possible to provide a liquid crystal display element having a high displaying quality.

Sixth Embodiment

Figure 22:
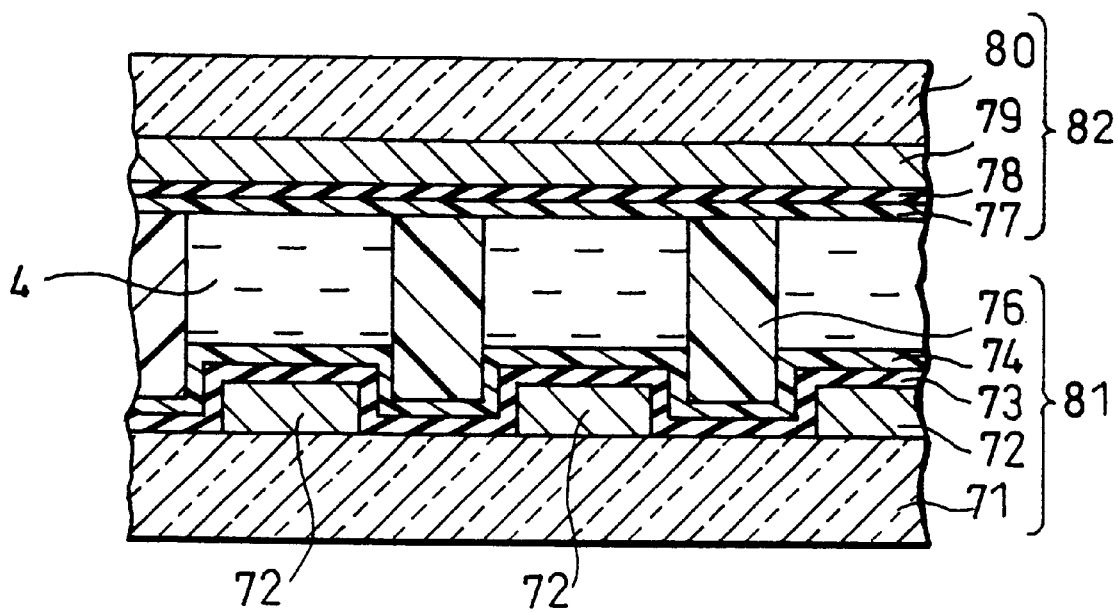
FIG. 22 is a cross sectional view showing a schematic structure of a liquid crystal display element in accordance with a sixth embodiment of the present invention.

The following will describe the sixth embodiment of the present invention referring to FIG. 22 and FIG. 23.

First of all, a schematic structure of the liquid crystal display element in accordance with the present embodiment will be described referring to FIG. 22.

The liquid crystal display element of the present embodiment is provided with a pair of glass substrates 71 and 80. On the glass substrate 71, electrodes 72 made of transparent and conductive metal are provided in stripes. An insulating layer 73 and an alignment layer 74 are laminated in this order so as to cover the glass substrate 71 and the electrodes 72.

On the alignment layer 74, spacers 76 made of an organic material having a shape memory are provided. The spacer 76 is provided in the form of a wall with a uniform width and height along the lengthwise direction of the electrodes 72. Note that, it is not required to provide the spacer 76 necessarily in the form of a continuous wall, but the spacer 76 can be provided in the form of a plurality of discontinuous pillars arranged along the lengthwise direction of the electrodes 72.

Hereinafter, a structure composed of the glass substrate 71, the electrodes 72, the insulating layer 73, the alignment layer 74, and the spacer 76 will be referred to as a substrate 81.

On the glass substrate 80, in the same manner as the electrodes 72, the insulating layer 73, and the alignment layer 74 of the substrate 81, there are provided electrodes 79, an insulating layer 78, and an alignment layer 77. Hereinafter, a structure composed of glass substrate 80, the electrodes 79, the insulating layer 78, and the alignment layer 77 will be referred to as a substrate 82.

The substrates 81 and 82 are positioned so that the alignment layers 74 and 77 face each other and the electrodes 72 and 79 are orthogonal to each other. Also, the substrates 81 and 82 are combined with each other so that a uniform spacing is maintained by the spacer 76. On the periphery of the spacing between the substrates 81 and 82, a sealant (not shown) is provided so as to seal the spacing between the substrates 81 and 82 filled with liquid crystal 4.

Figure 23A:
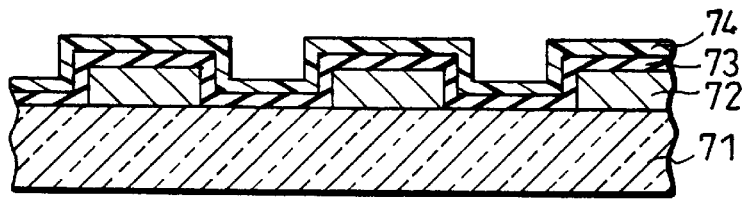
FIG. 23(a) through FIG. 23(d) are cross sectional views respectively showing the schematic structure of the liquid crystal display element in each step of the manufacturing steps.
Figure 23B:
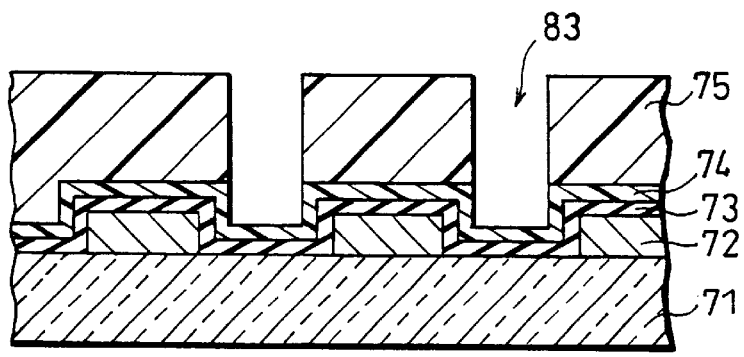
Figure 23C:
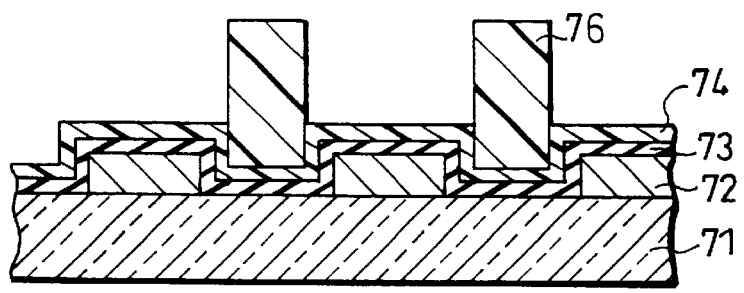
Figure 23D:
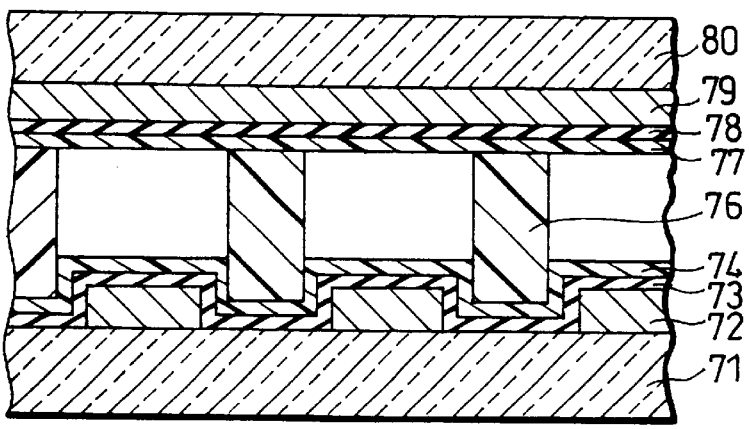

The following will describe, specifically, one example of the manufacturing steps of the liquid crystal display element of the present embodiment referring to FIG. 23 (a) through FIG. 23(d). Note that, the manufacturing conditions indicated in the following explanations such as a name of a material constituting each member, a film thickness, and a reaction temperature specified in each step are one example, and therefore the present invention is not limited to the specified ones.

First, on the glass substrate 71, after forming an indium-tin-oxide (hereinafter, referred to as ITO) film having a thickness of 0.1 μm by the spattering method, the ITO film thus formed is patterned in stripes so as to form the electrodes 72.

Secondly, after forming the insulating layer 73 so as to cover the glass substrate 71 and the electrode 72, the alignment layer 74 is formed so as to cover the insulating layer 73, thereby forming a glass substrate complex shown in FIG. 23(a). Here, as the insulating layer 73, an insulating layer material (product name NHC-A-2014) provided by Nissan Chemical Industries Ltd. is adopted, and the insulating layer 73 is formed so as to have a film thickness of 0.1 μm. As the alignment layer 74, an alignment layer material (product name PSI-A-X007) provided by Chisso Corporation is adopted, and the alignment layer 74 is formed so as to have a film thickness of 70 nm.

Thirdly, on the surface of the glass substrate 71 thus provided with the electrodes 72, the insulating layer 73, and the alignment layer 74 in this order, a water soluble resin solution (provided by Tokyo Ohka Kogyo Co., Ltd., product name TPF) is applied so as to form a film having a thickness of 1.8 μm, and the film thus formed is baked at a temperature of 180° C. for 10 minutes so as to form a water soluble resin film 75.

Fourthly, a photoresist (provided by Tokyo Ohka Kogyo Co., Ltd., product name TSMR-8800) is applied to the surface of the water soluble resin film 75 so as to form a film having a thickness of 1.0 μm, thereafter pre-baking is carried out at a temperature of 90° C. for 30 minutes. Then, after exposing UV light using a photo mask, development is carried out by using an alkaline developer (provided by Tokyo Ohka Kogyo Co., Ltd., product name NMD-W). This removes simultaneously (a) the photoresist of the exposed portion and (b) portions of water soluble resin film 75 underlying the exposed portion.

Fifth, the glass substrate complex thus prepared is rinsed by pure water for substantially 5 minutes. This removes the remaining water soluble resin film 75 so that, as shown in FIG. 23(b), grooves 83 to be provided with spacers 76 are formed through the water soluble resin film 75. Then, after drying, the entire substrate complex is irradiated by UV light and washed by acetone so as to remove the remaining photoresist.

Sixth, a solution of shape memory polyurethane which has been mixed beforehand with granular silica having a diameter of 1.4 μm is applied on the water soluble resin film 75 so as to be dried. As the granular silica, "HIGH-PRESICA" provided by Ube-Nitto Kasei Co., Ltd. may be adopted, and as the shape memory polyurethane, "MS5500" provided by Mitsubishi Heavy Industries, Ltd. may be adopted.

Note that, the granular silica is applied in order to give a predetermined strength to the spacer 76. In the case where the granular silica is not applied, the spacer is crushed by the applied heat and pressure in the step of combining the substrates (mentioned later) so that it becomes difficult to realize a predetermined spacing between the substrates. For this reason, it is preferable to mix beforehand the granular silica having an appropriate diameter with the shape memory polyurethane.

Seventh, the glass substrate complex thus prepared is rinsed by pure water so as to remove the water soluble resin film 75. This, as shown in FIG. 23(c), forms the spacer 76 made of the shape memory polyurethane containing the granular silica, having a height of substantially 1.8 μm.

Note that, it is possible to determine the shape of the spacer 76 as desired in accordance with the patterning of the water soluble resin film 75. As described, it is preferable to form the spacer 76 in the form of a wall or pillar; nevertheless, the spacer 76 can be formed at any position on the alignment layer 74 in any shape, provided that a predetermined substrate strength (pressure resistance) is obtained.

Eighth, after removing a contaminated portion of the surface of the alignment layer 74 by carrying out oxygen plasma processing, the alignment layer 74 is subjected to uniaxial alignment processing by rubbing.

Also, on the surface of the glass substrate 80, in the same manner as above, electrodes 79 made of ITO, an insulating layer 78, and an alignment layer 77 are formed in this order, and the rubbing process is carried out with respect to the alignment layer 77 so as to manufacture the substrate 82 as a counter substrate of the substrate 81.

Ninth, a heat-curable bonding agent (provided by Lodik Co., product name DSA-7111) is applied to the peripheries of the substrates 81 and 82 so that (1) the electrodes 72 and 79 formed on the substrates 81 and 82, respectively, are orthogonal to each other and (2) the respective rubbing directions of the alignment layers 74 and 77 are parallel to each other. Thereafter, a heating process is carried out at a temperature of 150° C. for 30 minutes while applying a pressure of 1 kg/cm² so as to combine the substrates 81 and 82 with each other, thereby forming an element structure having a substantially 1.5 $\mu$m spacing between the substrates (cell gap).

Note that, since the glass transition point of polyurethane (product name MS5500) constituting the spacer 76 is in a vicinity of 55° C., the heating process not only cures the bonding agent but also eliminates the effect of the rubbing process (generation of uniaxial alignment in a polymerized chain on the surface of the spacer 76) on the spacer 76. Further, since the polyurethane has thermoplasticity, by pressing against each other the substrates 81 and 82 while applying heat, it is possible to strongly bond the substrates 81 and 82 with each other.

Finally, the spacing between the substrates 81 and 82 are filled with the liquid crystal 4, and the peripheries of the substrates 81 and 82 are sealed by the sealant (not shown). This completes the liquid crystal display element. As the sealant, a two-liquid mixed-type bonding agent provided by Konishi Co., Ltd. may be adopted.

Note that, as the liquid crystal 4, a ferroelectric liquid crystal material (provided by Merck & Co., Inc., product name SCE8) is adopted. In the element structure of the present embodiment, the spacer 76 is provided in the form of a wall or pillar. Thus, the spacing between the substrates 81 and 82 can be precisely controlled, and compared with an arrangement wherein bead spacers are scattered, the substrate strength can be improved.

The ferroelectric liquid crystal is bistable, and therefore has an advantage over the nematic liquid crystal or other types of liquid crystal, in a simple matrix structure adopting no active elements such as transistors, in that higher speed driving can be realized. However, on the other hand, the ferroelectric liquid crystal has a drawback, compared with nematic liquid crystal or other types of liquid crystal, in that once the alignment state of the ferroelectric liquid crystal is disturbed by a shock or pressure, it is difficult to restore the original state so that non-uniformity of the alignment and switching failure are easily generated.

Nevertheless, in the liquid crystal display deice of the present embodiment, since a sufficient substrate strength is realized, the described drawback of the ferroelectric liquid crystal is compensated by the element structure, thereby making it possible to provide a liquid crystal display element which can be applied in practical applications.

Note that, in the liquid crystal display element of the present embodiment, deterioration of the alignment characteristic of the liquid crystal is not observed at the periphery of the spacer 76. Also, it was observed in an experiment that, under the pressure of 10 kg/cm², there were (1) no disturbance in the alignment of the liquid crystal and (2) no fracture of the spacer 76, thereby showing that the liquid crystal of the present embodiment is strong enough to be applied in practical applications.

As described, in the liquid crystal display element of the present embodiment, the rubbing process is carried out after forming the spacer 76 on the alignment layer 74. Thus, compared with the case where the spacer 76 is formed on the alignment layer 74 after the rubbing process is carried out with respect to the alignment layer 74, such a problem that the effect of the rubbing process on the alignment layer is weakened by the solution, etc., used in the step of forming the spacer, is not presented.

Further, in the present embodiment, even in the case where non-uniformity of the alignment of the liquid crystal is generated by the rubbing process on the spacer 76, by the heating process to be carried out later at a temperature in a vicinity of, or at a temperature not less than the glass transition point of the material of the spacer 76, it is possible to eliminate the non-uniformity, thereby making it possible suppress the generation of abnormal alignment or switching failure induced by the rubbing process on the spacer 76. Also, the spacer 76, made of resin, provided in the form of the wall or pillar has an advantage, compared with an arrangement wherein commonly adopted spacers composed of scattered glass fibers, glass beads, or resin beads, in that the spacer 76 can be strongly bonded with the substrate, and a uniform spacing between the substrates can be maintained, thereby making it possible provide a liquid crystal display element having a high pressure resistance capable of high quality displaying.

Seventh Embodiment

The following will describe the seventh embodiment of the present invention. Note that, members having the same functions as the members indicated in the sixth embodiment are given the same reference numerals, and the explanations thereof are omitted.

In the sixth embodiment, as the bonding agent bonding the substrates 81 and 82, a heat-curable bonding agent (provided by Lodik Co., product name DSA-7111) is adopted. However, in the present embodiment, a two-liquid mixed-type bonding agent (provided by Konishi Co., Ltd.) is adopted instead, and the substrates 81 and 82 are bonded with each other at room temperature. Note that, the substrates 81 and 82 are bonded with each other by connecting thereof under the pressure of 2 kg/cm².

After sealing a spacing filled with liquid crystal 4 between the substrates 81 and 82 thus combined, the substrates 81 and 82 are connected under the pressure of 1 kg/cm² for 2 hours at a temperature of 120° C. Except this step, the liquid crystal display element of the present embodiment is manufactured in the same manner as that of the sixth embodiment.

Namely, the liquid crystal display element of the present embodiment differs from that of the sixth embodiment in that in the present embodiment, the heating process on the polyurethane constituting the spacer 76 is carried out at a temperature in a vicinity of, or at a temperature not less than the glass transition point of the polyurethane after injecting the liquid crystal 4.

Note that, when a driving voltage was applied to the liquid crystal display element of the present embodiment before carrying out the heating process, it was found that portions in a vicinity of the spacer 76 in the liquid crystal 4 do not respond to the electric field, namely, switching failure was generated. The switching failure is likely to be caused by the rubbing process carried out on the spacer 76 made of an organic material.

On the contrary, when a driving voltage was applied again after carrying out the heating process in which the substrates 81 and 82 are connected under a pressure of 1 kg/cm² for 2 hours at a temperature of 120° C., the portions which had been showing the switching failure prior to the heating process regained a normal switching operation.

This indicates that it is possible to carry out the heating process on the spacer 76 made of, for example, an organic material such as polyurethane having a shape memory, after injecting the liquid crystal 4, thereby making it possible to obtain the same effect as that obtained in the sixth embodiment.

Note that, when the heating process was carried out at a temperature of 50° C. or 60° C. in a vicinity of the glass transition point (55° C.) of the polyurethane, it was found that while the time required for the heating process increased, the effect of the rubbing process on the spacer 76 was eliminated as in the sixth embodiment.

Comparative Example 5

Here, in order to make a comparison with the sixth and seventh embodiment, an example of a structure provided with a spacer made of an organic material having no shape memory will be described and examined.

By using the same materials used for the glass substrate 71, the electrodes 72, the insulating layer 73, and the alignment layer 74 of the sixth embodiment, and by adopting the same method as that of the sixth embodiment, electrodes, an insulating layer, and an alignment layer are formed in this order on a glass substrate, and the rubbing process is carried out on the alignment layer thus formed. Thereafter, on the substrate complex thus prepared, an organic material having no shape memory, for example, photosensitive resin provided by Ube Industries, Ltd. (product name Lithocoat PI-400), is applied so as to form a film having a thickness of 1.5 μm.

Then, the photosensitive resin is exposed using a photomask, developed, and baked so as to form spacers, each having a wall shape, along the lengthwise direction of the electrodes provided on the alignment layer.

Finally, the substrate thus provided with the spacer in the form of a wall is combined with a counter substrate which has been formed in the same manner as that of the sixth embodiment, and liquid crystal same as the one adopted in the sixth embodiment is injected into the spacing between the substrates, thereby completing the manufacturing of the liquid crystal display element of the comparative example 5.

In the liquid crystal display element of the comparative example 5, it was found that uniform liquid crystal alignment is not obtained, and that the alignment controlling ability of the alignment layer was insufficient. This is likely to be caused by the spacer formed after the rubbing process is carried out, which induces the contamination of the alignment layer when applying the photosensitive resin or carrying out the developing process, thereby reducing the effect of the rubbing process (alignment controlling ability).

Comparative Example 6

Further, in order to make a comparison with the sixth and seventh embodiment, another example of a structure provided with a spacer made of an organic material having no shape memory will be described and examined.

By using the same materials used for the glass substrate 71, the electrodes 72, the insulating layer 73, and the alignment layer 74 of the sixth embodiment, and by adopting the same method as that of the sixth embodiment, electrodes, an insulating layer, and an alignment layer are formed in this order on a glass substrate. Thereafter, without carrying out the rubbing process on the alignment layer thus formed, photosensitive resin provided by Ube Industries, Ltd. (product name Lithocoat PI-400), is applied so as to form a film having a thickness of 1.5 μm.

Then, the photosensitive resin is exposed using a photomask, developed, and baked so as to form, on the alignment layer, spacers each having the same shape as the spacer 76, thereafter the rubbing process is carried out on the alignment layer thus provided with the spacer.

Finally, the substrate thus provided with the spacer is combined with a counter substrate which has been formed in the same manner as that of the sixth embodiment, and liquid crystal same as the one adopted in the sixth embodiment is injected into the spacing between the substrates, thereby completing the manufacturing of the liquid crystal display element of the comparative example 6.

In the liquid crystal display element of the comparative example 6, it was found that portions of the liquid crystal at the periphery of the spacer do not respond to the electric field, namely, switching failure was generated in these portions. Even though the heating process similar to the one carried out in the seventh embodiment was carried out on the liquid crystal display element, the switching failure persisted. The switching failure is likely to be caused by the effect of the rubbing process on the spacer, namely, by the generation of uniaxial alignment in a polymerized chain on the surface of the spacer, which induces abnormal alignment in the liquid crystal in the vicinity thereof.

As described, the liquid crystal display element of the present embodiment is composed of the alignment layer and an organic material having a shape memory, and is provided with a spacer formed on the alignment layer in the form of a wall or pillar.

With this arrangement, compared with a commonly adopted liquid crystal display element wherein glass fibers, glass beads, or resin beads are scattered as spacers, substrates can be strongly bonded with each other, and a uniform spacing between the substrates can be maintained, thereby permitting a liquid crystal display element to be applied in practical use, which requires a precise control of the spacing between the substrates, such as the liquid crystal display element adopting ferroelectric liquid crystal. Moreover, even in the case where non-uniformity is generated in the liquid crystal by the rubbing process on the spacer, it is possible to eliminate the non-uniformity by carrying out the heating process in a later step, thereby providing a liquid crystal display element capable of high quality displaying, in which no non-uniformity of the alignment of the liquid crystal or switching failure is generated.

Also, the liquid crystal display element of the present embodiment has an arrangement wherein the rubbing process on the alignment layer is carried out after forming the spacer, and the heating process is carried out after the rubbing process is carried out at a temperature in a vicinity of, or at a temperature not less than the glass transition point of the organic material.

With this arrangement, even in the case where non-uniformity is generated in the liquid crystal by the rubbing process on the spacer, it is possible to eliminate the non-uniformity by carrying out the heating process in a later step. Thus, it is possible to (a) precisely control the spacing between the substrates and (b) provide a liquid crystal display element, in which no non-uniformity of the alignment the liquid crystal or switching failure is generated, capable of high quality displaying.

Further, in the liquid crystal display element of the present embodiment, the drawback of the ferroelectric liquid crystal such as weaker resistance to an external force, e.g., a shock and a pressure, compared with the nematic liquid crystal, is compensated by adopting the ferroelectric liquid crystal, thereby providing a display element adopting the ferroelectric liquid crystal which has more desirable characteristics than the nematic liquid crystal.

Also, the method for manufacturing the liquid crystal display element of the present embodiment includes the steps of (1) forming the alignment layer in a coating manner on the substrate, (2) forming on the alignment layer a spacer containing an organic material having a shape memory in the form of a wall or pillar, (3) carrying out a rubbing process on the alignment layer after forming the spacer, and (4) carrying out a heating process at a temperature in a vicinity of, or at a temperature not less than the glass transition point of the organic material after the rubbing process.

With this manufacturing method, the effect of the rubbing process on the alignment layer is not weakened by the solution, etc., used in the step of forming the spacer; thus, the spacer can be provided without causing lowering of the alignment controlling force. Also, since the effect of the rubbing process on the spacer is eliminated by the heating process, in the liquid crystal display element, which is the final product of the manufacturing steps, the conventional problem of non-uniformity of the liquid crystal alignment or switching failure, induced by the rubbing process on the spacer is not presented, thereby providing a highly pressure resistant liquid crystal display element, in which no non-uniformity of the alignment or switching failure is generated, capable of high quality displaying.

Eighth Embodiment

Figure 24:
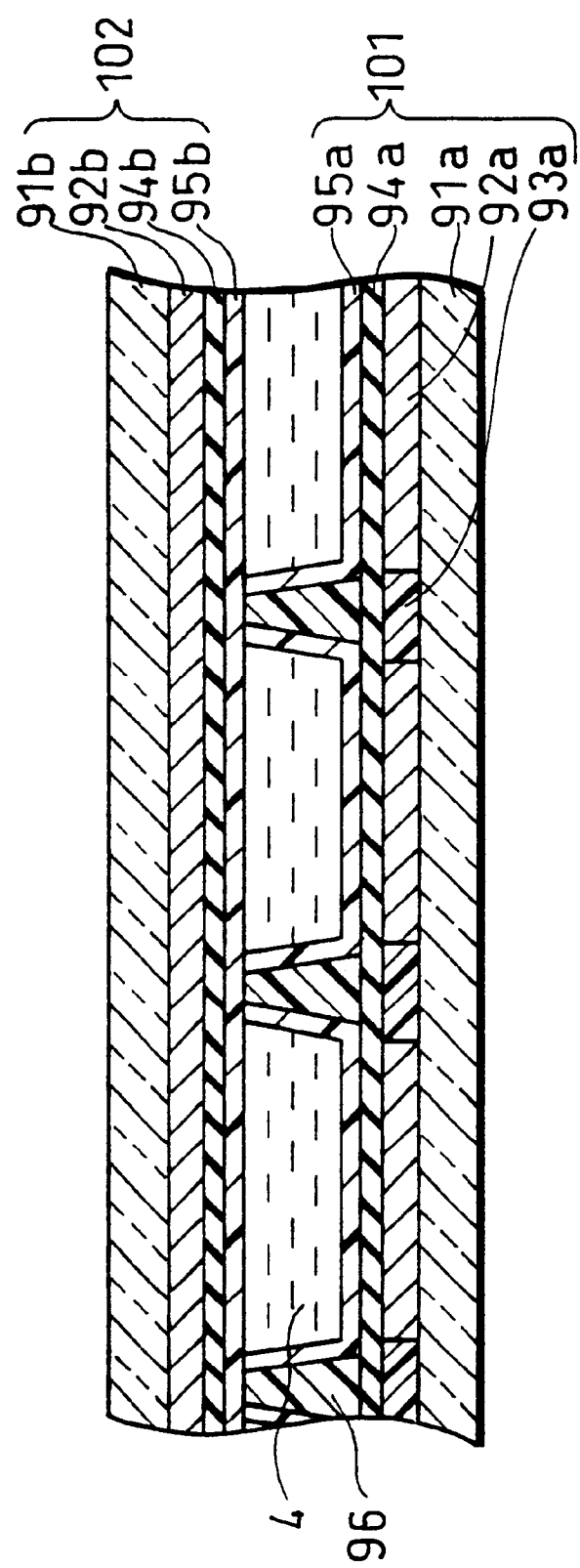
FIG. 24 is a cross sectional view showing a schematic structure of a liquid crystal display element in accordance with an eighth embodiment of the present invention.
Figure 25:
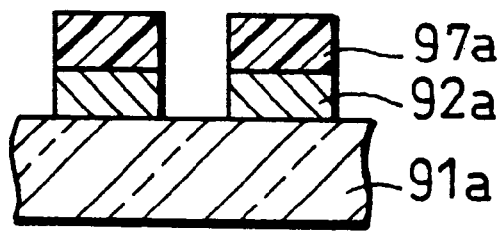
FIG. 25(a) through FIG. 25(e) are cross sectional views respectively showing the schematic structure of the liquid crystal display element in main steps of the manufacturing steps.
Figure 25:
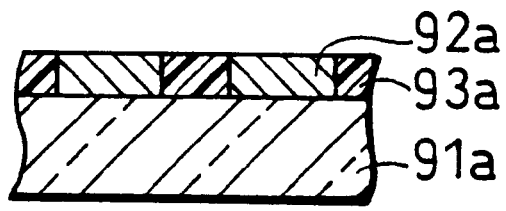
Figure 25:
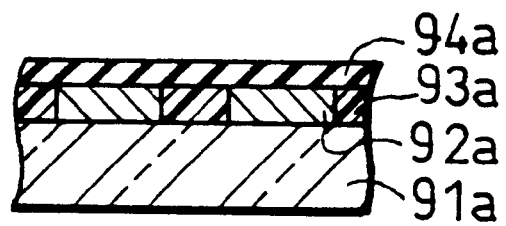
Figure 25:
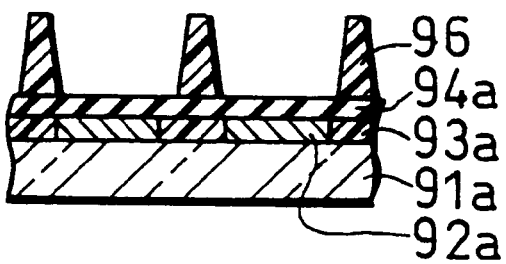
Figure 25:
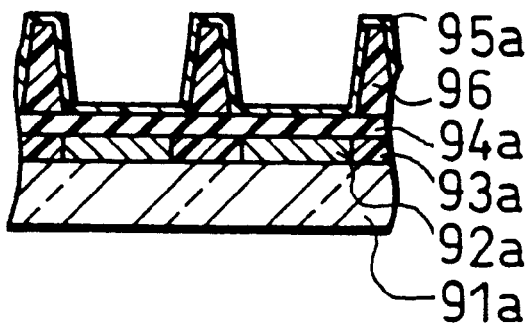
Figure 26:
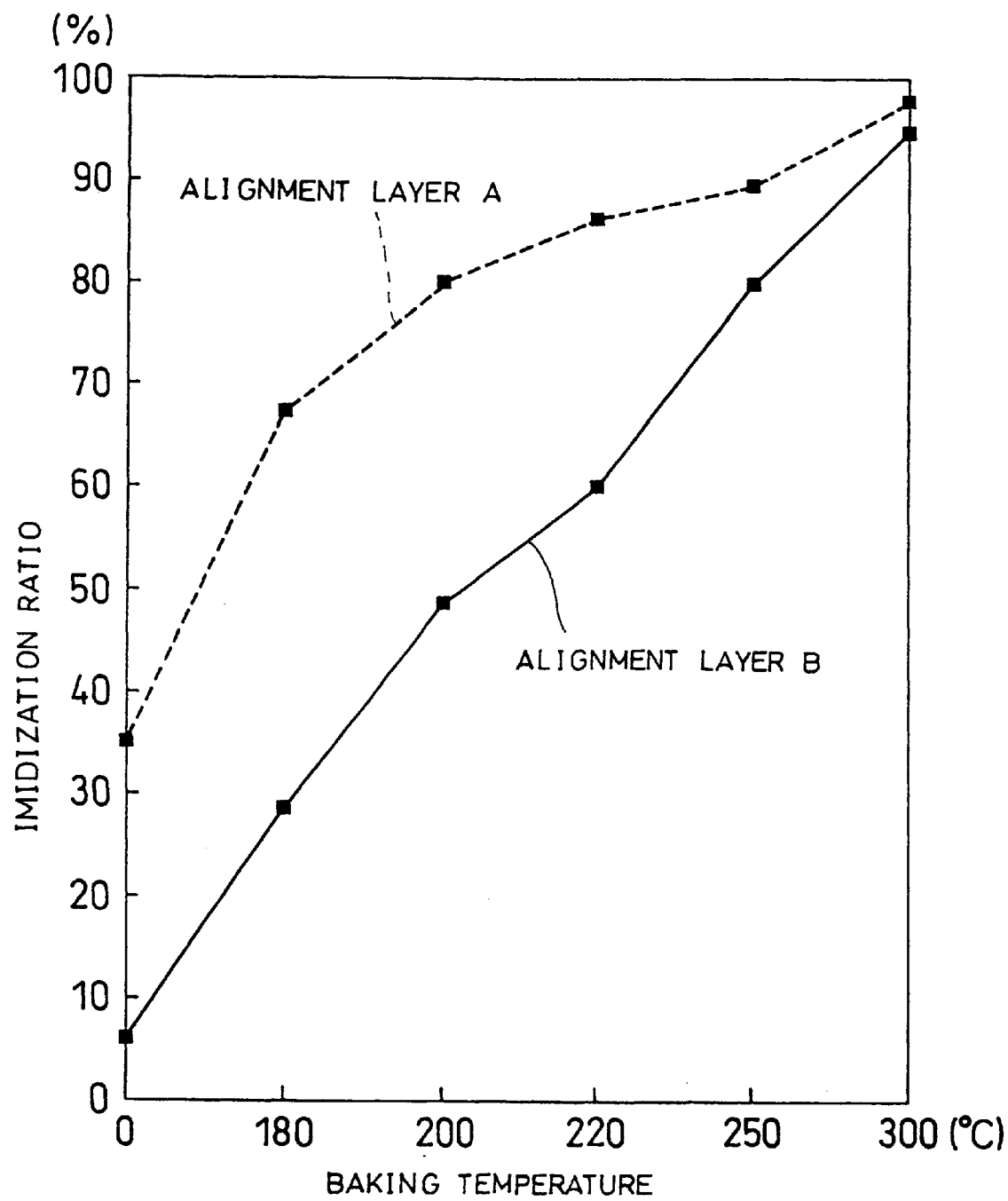
FIG. 26 is a graph showing a relationship between a baking temperature and an imidization ratio of polyamic acid resin.

The following will describe the eighth embodiment of the present invention referring to FIG. 24 through FIG. 26.

FIG. 24 is a cross sectional view showing a schematic structure of the liquid crystal display element in accordance with the present embodiment.

The liquid crystal display element of the present embodiment is provided with a pair of substrates 101 and 102, and the spacing between the substrates is filled with liquid crystal 4.

The substrate 101 is composed of (1) an insulating substrate 91a, (2) a plurality of electrodes 92a provided in parallel, (3) a light shielding layer 93a, (4) an insulating layer 94a provided so as to cover the electrodes 92a and the light shielding layer 93a, (5) spacers 96 provided on the insulating layer 94a, and (6) an alignment layer 95a provided so as to cover the insulating layer 94a and the spacers 96.

The substrate 102 is composed of (1) an insulating substrate 91b, (2) a plurality of electrodes 92b provided in parallel, (3) an insulating layer 94b, and (4) an alignment layer 95b laminated on the surface of the insulating layer 94b.

The insulating substrates 91a and 91b are respectively made of a transparent material such as glass or plastic. As the material of the electrodes 92a and 92b, indium-tin-oxide (ITO) is commonly adopted; nevertheless, the material is not limited to the specified one. In the case where the electrodes 92a and 92b are to be provided in a transmissive-type liquid crystal display element, any material may be adopted provided that the material is transparent. In the case where the electrodes 92a and 92b are to be provided in a reflection-type liquid crystal display element, only one of the electrodes 92a and 92b is required to be transparent.

As the light shielding layer 93a, an Si film or other films is adopted. However, provided that the material to be adopted as the light shielding layer 93a is transparent, the material can be selected from a variety of different materials such as an inorganic material or organic resin.

The following will describe the manufacturing steps of the liquid crystal display element of the present embodiment.

First, on the surface of the insulating substrate 91a, an ITO film having a thickness of 1000 Å is formed by the spattering method. On the surface of the ITO film thus formed, a photo resist is spin-coated, and the electrodes 92a is patterned by photolithography. Here, if the photoresist is not removed, as shown in FIG. 25(a), the unremoved photoresist 97a remains on the patterned electrodes 92a.

Secondly, an Si film having a thickness of 1000 Å is formed by the spattering method on the entire substrate thus prepared, and by lifting off, as shown in FIG. 25(b), the light shielding layer 93a is formed between adjacent electrodes 92a.

Note that, here, as the material of the light shielding layer 93a, Si is adopted, and as the method of patterning the light shielding layer 93a, the lifting-off method is adopted. Nonetheless, other materials and methods may be adopted as well. For example, in the case of adopting, as the material of the light shielding layer 93a, an organic material or an inorganic material which allows etching to be carried out with ease, a method of patterning the light shielding layer 93a after patterning the electrodes 92a, or inversely, a method of patterning the electrodes 92a after patterning the light shielding layer 93a may be adopted.

Thirdly, the substrate complex thus prepared so far is baked at a temperature of 200° C. after applying thereon an insulating material by the spin coating method. This, as shown in FIG. 25(c), forms the insulating layer 94a having a uniform surface. Note that, as the material of the insulating layer 94a, for example, A2014 (product name) provided by Nissan Chemical Industries Ltd. may be adopted.

Fourthly, on the insulating layer 94a thus formed, UV light curable resin is applied by the spin coating method so as to have a thickness of 1.5 μm after baking (described later). Thereafter, the UV light curable resin is patterned in stripes using a photo mask so as to avoid regions above the electrodes 92a. Then, baking is carried out for 1 hour at a temperature of 200° C. so as to form, above the light shielding layer 93a, as shown in FIG. 25(d), the spacers 96, each having a wall shape, parallel to the electrodes 92a.

Note that, as the material of the UV light curable resin, for example, V259-PA (product name) provided by Nippon Steel Chemical Co., Ltd. may be adopted. However, other UV light curable resin provided by other manufacturers may be adopted as well, or alternatively, an inorganic material or organic resin may be adopted in accordance with the adopted photoresist.

Also, the spacers 96 are formed in stripes above the light shielding layer 93a so as to avoid regions above the electrodes 92a. However, the arrangement of the spacers 96 is not limited to the specified one. For example, the spacers 96 can be provided in the form of a plurality of cylinders discontinuously arranged along the lengthwise direction of the electrodes 92a. Alternatively, each spacer 96 may be provided in the form of a prism.

Fifth, on the substrate provided with the spacer 96, polyamic acid resin is applied by the spin coating method, and the substrate is baked at a temperature of 100° C. (step (1)). Thereafter, the rubbing process is carried out on the resin film thus formed so as to form, as shown in FIG. 25(e), the alignment layer 95a covering the insulating layer 94a and the spacer 96. 281. The substrate 101 is prepared by the described steps.

Note that, the polyamic acid resin is a compound prepared by converting the carboxylic group of a polycarboxylic acid compound into a carboxamide. For example, SE7792 (product name) provided by Nissan Chemical Industries Ltd. is available in the market. The polyamic acid resin is represented by the general formula below where $R^1$ and $R^2$ are an aromatic ring compound.

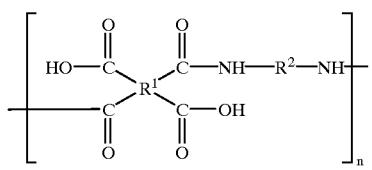

The substrate 102 is prepared by the same steps as the steps of preparing the substrate 101. Namely, the electrodes 92b, a light shielding layer (not shown), the insulating layer 94b, and the alignment layer 95b are formed in this order on the insulating substrate 91b.

Note that, in the present embodiment, the spin coating method is adopted in order to apply, on the substrates, respective materials of the insulating layers 94a and 94b, the alignment layers 95a and 95b, and the spacer 96. However, the materials may be applied by, for example, the roll coating method or the printing method.

Sixth, the substrates 101 and 102 are faced each other so that the respective rubbing directions of the alignment layers 95a and 95b are coincident, and the substrates 101 and 102 are pressed against each other for 1 hour at a temperature of 200° C. under the pressure of 1 kg/cm$^2$ so as to be combined with each other (step (2)). In other words, the alignment layers 95a and 95b are baked at a temperature of 200° C.

Finally, the liquid crystal 4 is injected into the spacing between the substrates 101 and 102, thereby completing the liquid crystal display element of the present embodiment. Note that, as the liquid crystal 4, ferroelectric liquid crystal is adopted.

In the liquid crystal display element manufactured in the described manner, it is possible to (a) uniformalize the cell thickness with an accuracy of within 0.03 μm and (b) obtain uniform alignment and switching characteristic in the pixel displaying region.

Also, in present embodiment, the baking of the alignment layers 95a and 95b are carried out (1) at a temperature of 100° C. when applying the alignment layers 95a and 95b to the substrates 101 and 102, respectively and (2) at a temperature of 200° C. when combining the substrates 101 and 102. In this manner, by setting the baking temperature when combining the substrates 101 and 102 higher than that when applying the alignment layers 95a and 95b, it is possible to promote imidization of the alignment layers 95a and 95b when combining the substrates. Here, the imidization of the alignment layers 95a and 95b when combining the substrates 101 and 102 proceeded by substantially 40 per cent from the imidization of the alignment layers 95a and 95b when applying the alignment layers 95a and 95b.

In this manner, by promoting imidization when combining the substrates 101 and 102 so as to induce chemical bonding of the alignment layers 95a and 95b, it is possible to bond the substrates 101 and 102 with each other with a sufficient strength.

Note that, the substrates 101 and 102 are bonded with each other when respective baking temperatures when applying the alignment layers 95a and 95b and when combining the substrates 101 and 102 are both 120° C. The substrates 101 and 102 are also bonded with each other when respective baking temperatures when applying the alignment layers 95a and 95b and when combining the substrates 101 and 102 are both 180° C. That is to say, by adopting the polyamic acid resin as the material of the alignment layer, it is possible to bond the substrates even in the case where the respective baking temperatures when applying the layers and when combining the substrates are the same.

The following will describe the reason for this phenomenon referring to FIG. 26. FIG. 26 is a graph showing the result of a measurement in which an imidization ratio was measured at different baking temperatures with respect to alignment layers A and B respectively made of two types of polyamic acid resin which can be adopted as the materials of the alignment layers 95a and 95b of the present embodiment. As is clear from FIG. 26, at a temperature in a range of 120° C. to 200° C., the imidization of the polyamic acid resin is incomplete so that the hydroxy group or the hydrogen group remains in the compound. Thus, when combining the substrates, even when the bonding due to the imidization (chemical bonding) of the polyamic acid resin is incomplete, it is likely that the substrates are bonded with each other by the hydrogen bonding. Also, because the imidization is incomplete, the alignment layers are not cured completely. This strengthens the affinity between the substrates, thereby improving the bonding of the substrates.

However, it is preferable to set the respective baking temperatures when applying the alignment layers and when combining the substrates so that the imidization ratio of when applying the alignment layers and the imidization ratio of when combining the substrates are respectively in a range of 10 per cent to 50 percent and in a range of 50 per cent to 100 per cent. This promotes the imidization when combining the substrates, thereby further strengthening the bonding of the substrates.

Also, it is further preferable to set the respective baking temperatures when applying the alignment layers and when combining the substrates so that the difference between the imidization ratio of when combining the substrates and the imidization ratio of when applying the alignment layers is in a range of 10 per cent to 90 per cent.

Note that, for comparison, when an alignment layer was formed by using a polyimide-type alignment layer material by the process described in the present embodiment, it was found that the alignment layer thus formed shows no adhesion at all. This can be explained by the following. In a polyimide-type alignment layer material, imidization is complete; thus, adhesion due to imidization (chemical bonding) is not obtained. Another explanation is that because the molecules of the polyimide-type alignment layer material have substantially no hydroxy group or hydrogen group, adhesion due to hydrogen bonding is not obtained.

As described, in the liquid crystal display element of the present embodiment, the substrates 101 and 102 are strongly bonded with each other. Thus, it is possible to obtain a uniform cell thickness, sufficient shock resistance, and a desirable displaying quality.

Also, since the spacer 96 is formed before the alignment layer 95a is provided, the alignment layer 95a is prevented from being contaminated or damaged by the solvent or a developer used when forming the spacer 96, thereby eliminating lowering of alignment controlling ability.

Note that, in the described processes, the spacer 96 is provided only on the side of the substrate 101. However, the present embodiment is not limited to the specified arrangement, but it is possible to provide the spacer on both the substrates 101 and 102, and thereafter the substrates 101 and 102 are combined with each other.

Ninth Embodiment

Figure 27:
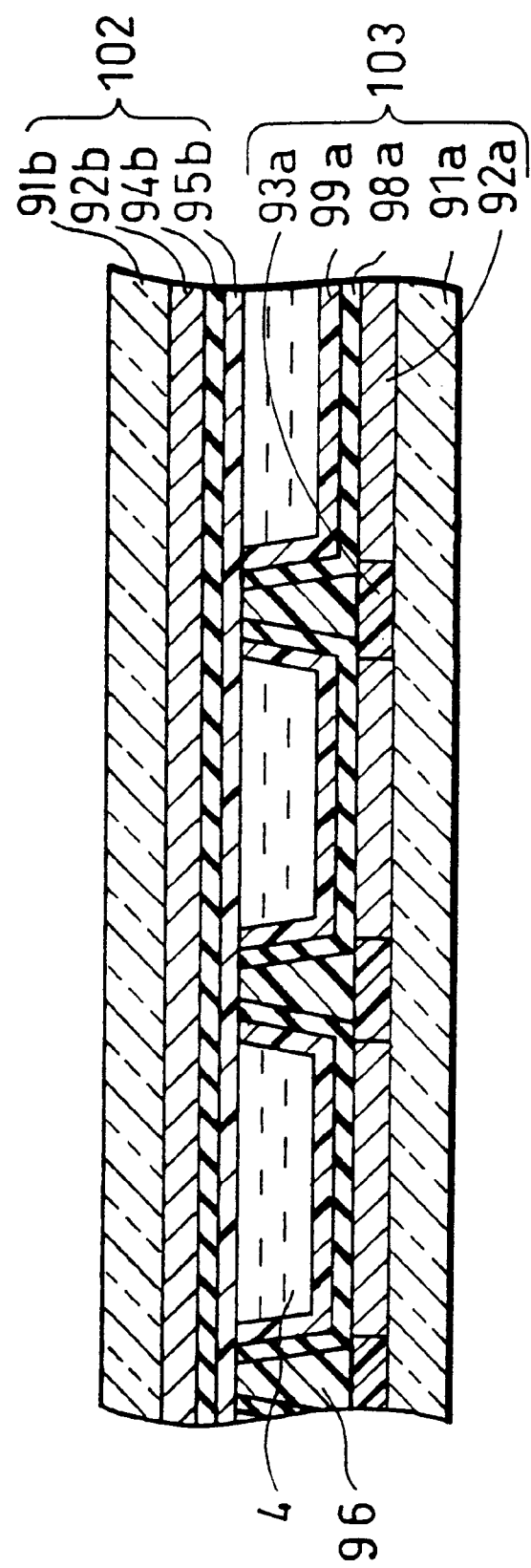
FIG. 27 is a cross sectional view showing a schematic structure of a liquid crystal display element in accordance with a ninth embodiment of the present invention.
Figure 28:
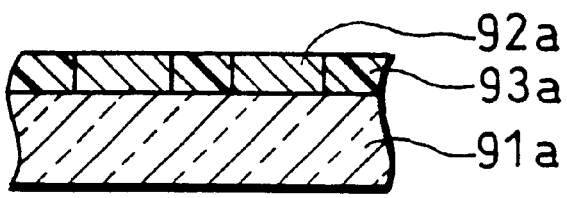
FIG. 28(a) through FIG. 28(d) are cross sectional views respectively showing the schematic structure of the liquid crystal display element of FIG. 27 in the manufacturing steps.
Figure 28:
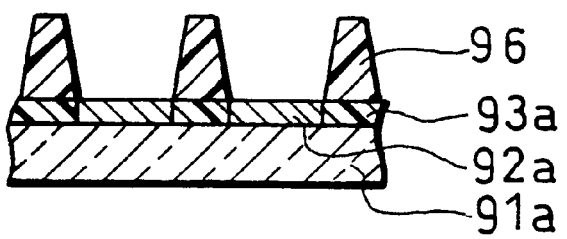
Figure 28:
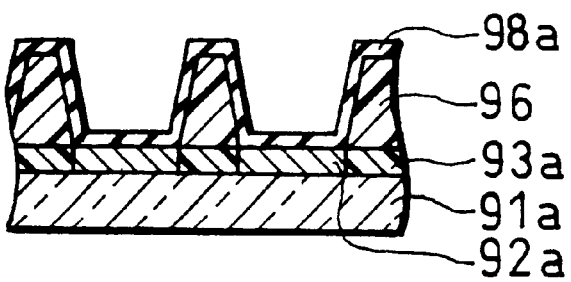
Figure 28:
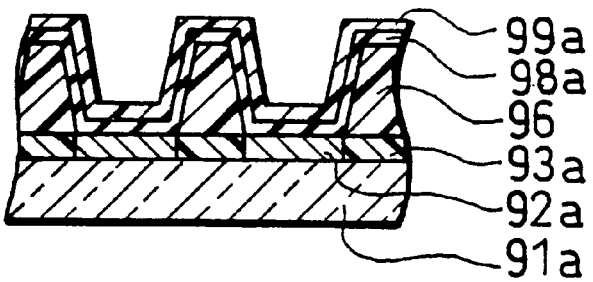

The following will describe the ninth embodiment of the present invention referring to FIG. 27 and FIG. 28. Note that, members having the same functions as the members indicated in the eighth embodiment are given the same reference numerals, and the explanations thereof are omitted.

FIG. 27 is a cross sectional view showing a schematic structure of a liquid crystal display element of the present embodiment. As shown in FIG. 27, the liquid crystal display element of the present embodiment is provided with a substrate 103 instead of the substrate 101 of the eighth embodiment. The substrate 103 is provided with the insulating substrate 91a, the electrodes 92a, and the light shielding layer 93a of the eighth embodiment. On the light shielding layer 93a, the spacer 96 is provided in the form of a wall along the light shielding layer 93a. An insulating layer 98a and an alignment layer 99a equivalent of the insulating layer 94a and the alignment layer 95a, respectively, are provided so as to cover the substrate complex thus prepared.

The following will describe manufacturing steps of the liquid crystal display element of the present embodiment.

First, by the steps described in the eighth embodiment, the electrodes 92a and the light shielding layer 93a are formed on the insulating substrate 91a. This forms the substrate complex of FIG. 28(a).

Secondly, on the surface of the electrodes 92a and the light shielding layer 93a, UV light curable resin is applied by the spin coating method so as to have a thickness of 1.5 μm after baking (described later). Thereafter, the UV light curable resin thus applied is patterned in stripes using a photo mask so as to avoid regions above the electrodes 92a. Then, baking is carried out for 1 hour at a temperature of 200° C. so as to form, above the light shielding layer 93a, as shown in FIG. 28(b), the spacer 96 in the form of a wall parallel to the electrodes 92a.

Note that, as the material of the UV light curable resin constituting the spacer 96, for example, V259-PA (product name) provided by Nippon Steel Chemical Co., Ltd. may be adopted. However, other UV light curable resin provided by other manufacturers may be adopted as well, or alternatively, an inorganic material or organic resin may be adopted in accordance with the adopted photoresist.

Also, the spacer 96 is formed in stripes above the light shielding layer 93a so as to avoid regions above the electrodes 92a. However, the arrangement of the spacer 96 is not limited to the specified one. For example, the spacer 96 can be provided in the form of a plurality of cylinders discontinuously arranged along the lengthwise direction of the electrodes 92a, or alternatively, the spacer 96 may be provided in the form of a prism.

Thirdly, on the substrate provided with the spacer 96, an insulating layer material is applied by the spin coating method so as to form, as shown in FIG. 28(c), the insulating layer 98a having a uniform surface. Note that, as the insulating layer material, A2014 (product name) provided by Nissan Chemical Industries Ltd. may be adopted.

Fourthly, polyamic acid resin is applied on the insulating layer 98a by the spin coating method so as to carry out baking at a temperature of 100° C. Thereafter, the rubbing process is carried out on the resin film thus formed so as to form, as shown in FIG. 28(d), the alignment layer 99a. Note that, as the polyamic acid resin, for example, SE7792 (product name) provided by Nissan Chemical Industries Ltd. may be adopted.

Finally, the substrate 103 thus prepared by the described steps and the substrate 102 are combined with each other by the steps described in the eighth embodiment, then the liquid crystal 4 is injected into the spacing between the substrates 103 and 102, thereby completing the liquid crystal display element of the present embodiment.

As described, the liquid crystal display element of the present embodiment differs from that of the eighth embodiment in that in the present embodiment, the spacer 96 is formed prior to the formation of the insulating layer 98a. However, in a respect that the upper and lower substrates are bonded with each other by the bonding of the alignment layers, the present embodiment is the same as the eighth embodiment.

Therefore, with respect to the bonding strength of the upper and lower substrates, the effect same as that obtained in the eighth embodiment can be obtained. Consequently, the effect same as that obtained in the eighth embodiment can also be obtained with respect to the uniformity of the cell thickness, desirability of the displaying quality, and the shock resistance. Further, in the present embodiment, as the material of the spacer 96, a material whose baking temperature is higher than that of the insulating layer 98a may be adopted, thereby having an advantage in that a material for the spacer 96 can be selected from a wider variety of spacer materials.

Tenth Embodiment

Figure 29:
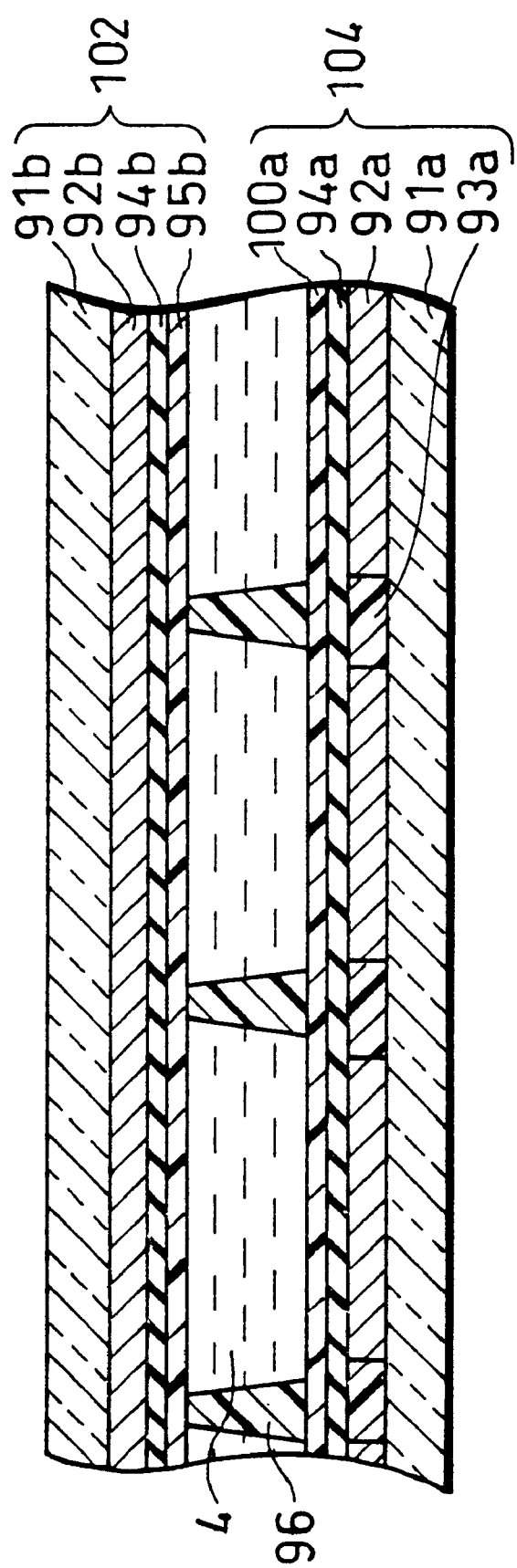
FIG. 29 is a cross sectional view showing a schematic structure of a liquid crystal display element in accordance with a tenth embodiment of the present invention.
Figure 30:
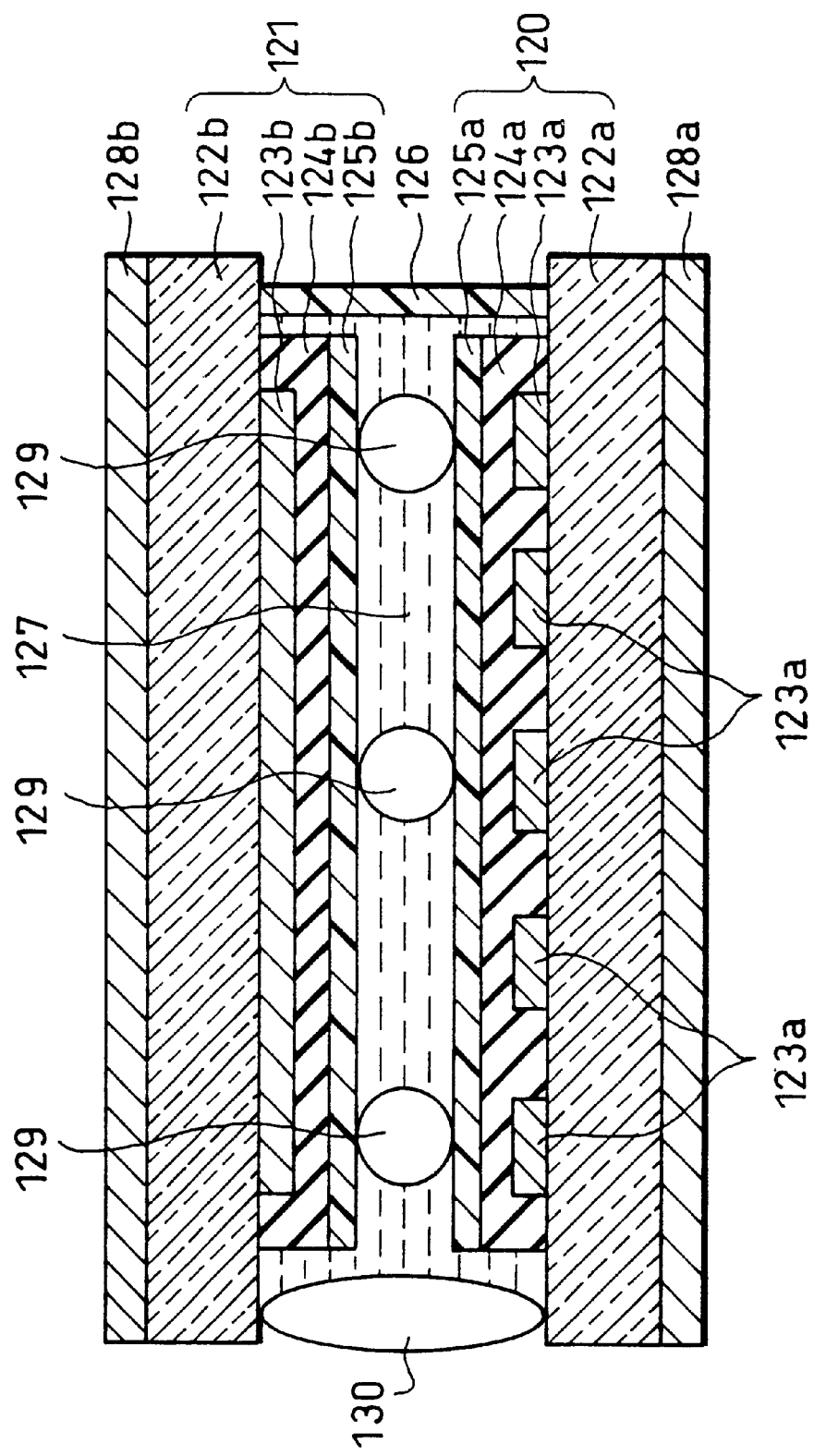
FIG. 30 is a cross sectional view showing a schematic structure of a conventional ferroelectric liquid crystal display device.
Figure 31:
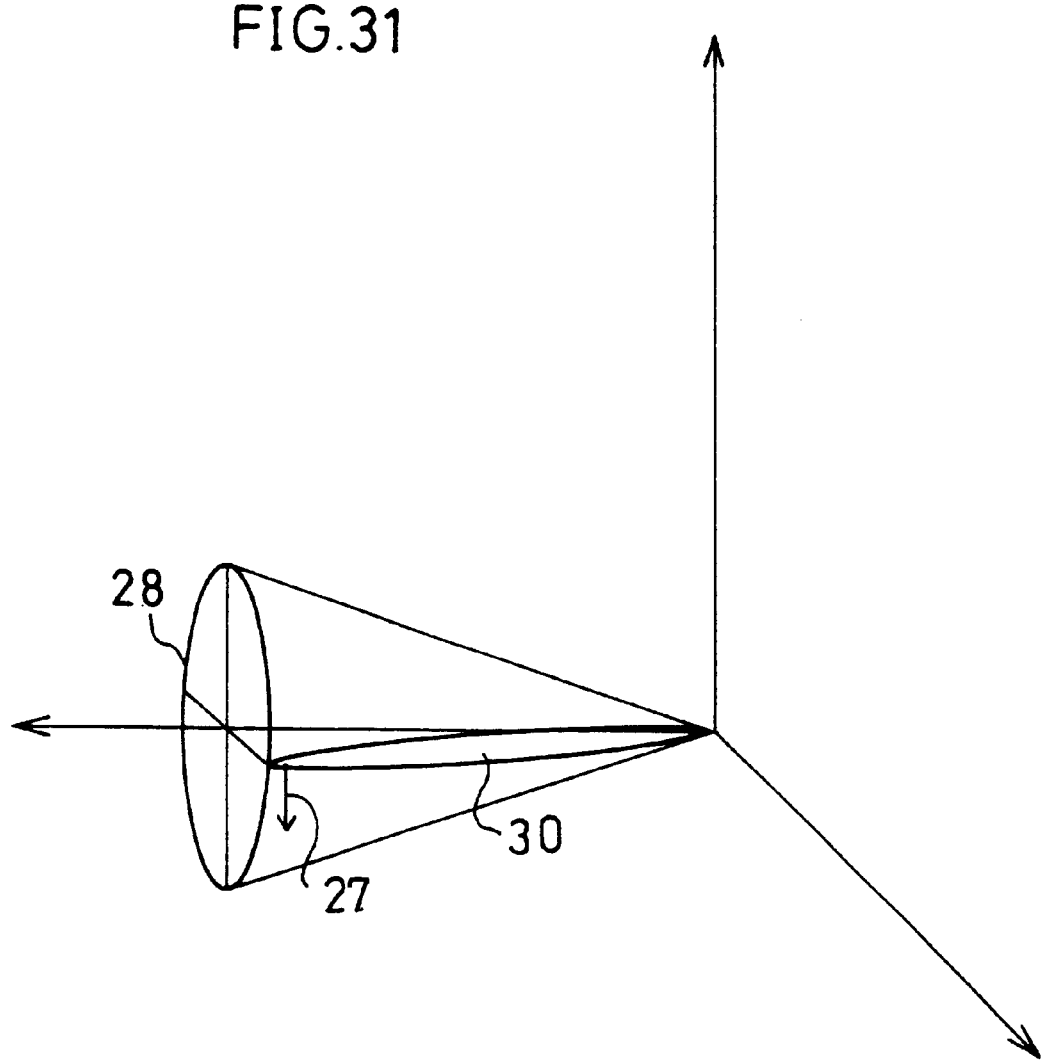
FIG. 31 is a drawing explaining how a ferroelectric liquid crystal molecule responds to an electric field.
Figure 32:
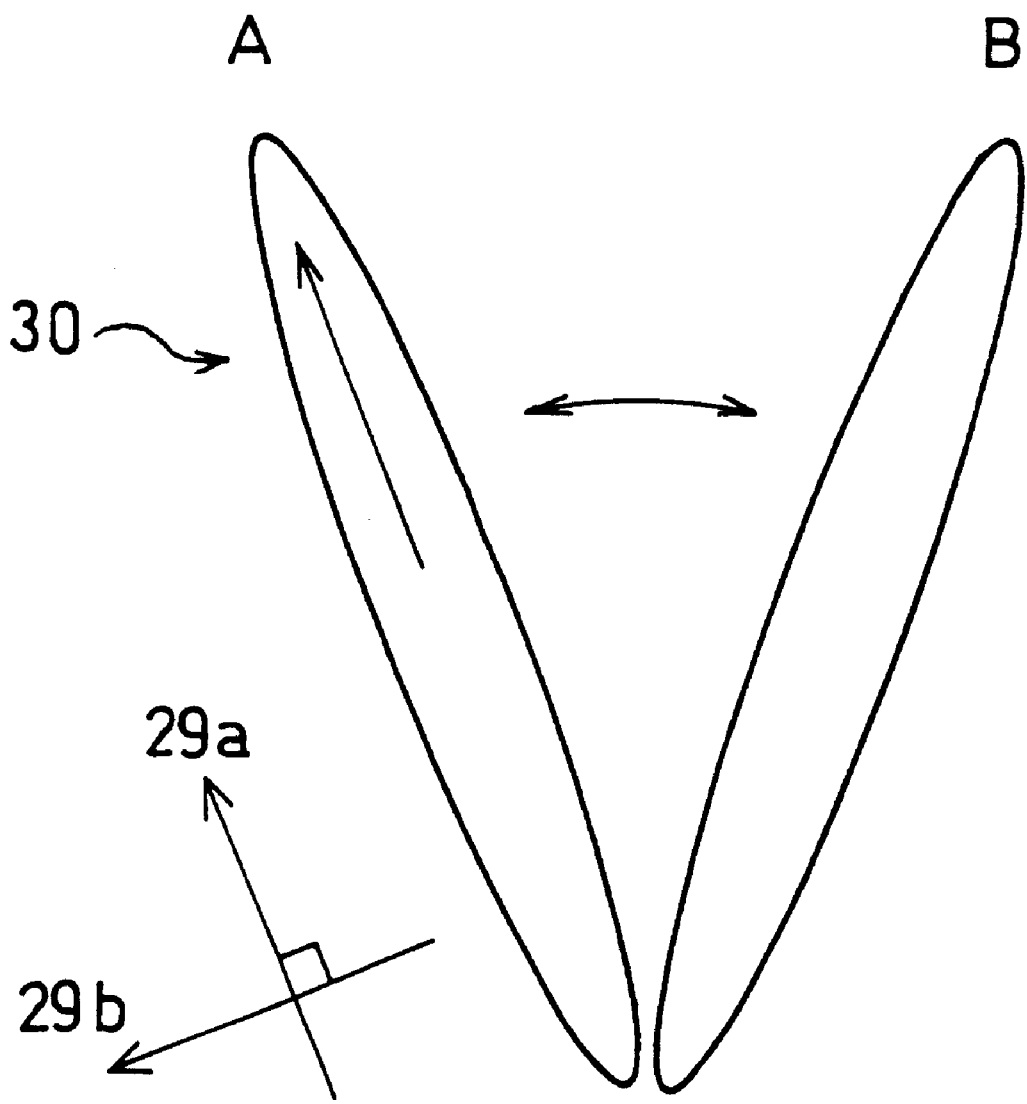
FIG. 32 is a drawing explaining a switching operation of a ferroelectric liquid crystal molecule.

The following will describe the tenth embodiment of the present invention referring to FIG. 29. Note that, members having the same functions as the members indicated in each of the previous embodiment are given the same reference numerals, and the explanations thereof are omitted.

FIG. 29 is a cross sectional view showing a schematic structure of a liquid crystal display element of the present embodiment.

The liquid crystal display element of the present embodiment is provided with a substrate 104 instead of the substrate 101 of the eighth embodiment. The substrate 104, in the same manner as the substrate 101 of the eighth embodiment, is provided with the insulating layer 91a, the electrodes 92b, the light shielding layer 93a, and the insulating layer 94a.

Additionally, an alignment layer 100a is provided so as to cover the insulating layer 94a, and on the alignment layer 100a, the spacers 96, each having a wall shape, are provided in stripes so as to avoid regions above the electrodes 92a.

The following will describe manufacturing method of the liquid crystal display element of the present embodiment.

First, by the steps described in the eighth embodiment, the electrodes 92a and the light shielding layer 93a are formed on the insulating substrate 91a.

Secondly, on the surface of the electrodes 92a and the light shielding layer 93a thus formed, an insulating layer material is applied by the spin coating method so as to form the insulating layer 94a having a uniform surface. Note that, as the insulating layer material, A2014 (product name) provided by Nissan Chemical Industries Ltd. may be adopted.

Thirdly, on the insulating layer 94a, polyamic acid resin is applied by the spin coating method, and after carrying out pre-baking on a hot plate having a temperature of 80° C., baking is carried out in an oven having a temperature of 200° C. Thereafter, the rubbing process is carried out with respect to the resin film thus formed so as to form the alignment layer 100a. Note that, as the polyamic acid resin, for example, SE7792 (product name) provided by Nissan Chemical Industries Ltd. may be adopted.

Fourthly, on the surface of the alignment layer 100a thus formed, UV light curable resin is applied by the spin coating method so as to have a thickness of 1.5 $\mu$m after baking (described later). Thereafter, the UV light curable resin is patterned in stripes so as to avoid regions above the electrodes 92a. Then, baking is carried out for 1 hour at a temperature of 200° C. so as to form the spacer 96.

Note that, as the material of the UV light curable resin constituting the spacer 96, V259-PA (product name) provided by Nippon Steel Chemical Co., Ltd. may be adopted. However, other UV light curable resin provided by other manufacturers may be adopted as well, or alternatively, an inorganic material or organic resin may be adopted in accordance with the adopted photoresist.

Also, here, the spacers 96 are formed in stripes so as to avoid regions above the electrodes 92a. However, the arrangement of the spacers 96 is not limited to the specified one. For example, the spacer 96 can be provided in the form of a plurality of cylinders discontinuously arranged along the lengthwise direction of the electrodes 92a. Alternatively, each of the spacers 96 may be provided in the form of a prism.

Finally, the substrate 104 thus prepared by the described steps and the substrate 102 are combined with each other by heating at a temperature of 200° C. under the pressure of 1 kg/cm², then the liquid crystal 4 is injected into the spacing between the substrates 104 and 102, thereby completing the liquid crystal display element of the present embodiment.

As described, the liquid crystal display element of the present embodiment differs from that of the eighth embodiment in that in the present embodiment, the spacer 96 is formed after forming the alignment layer 100a, and that the lower substrate 104 and the upper substrate 102 are combined with each other by the bonding of the spacer 96 and the alignment layer 95b.

Note that, because the imidization ratio of the alignment layer 100a baked at a temperature of 200° C. is substantially 50 per cent, the hydroxy group and the hydrogen group remain in the compound, and the alignment layers 100a and 95b are bonded with each other via the spacer 96 by the hydrogen bonding. Also, since the spacer 96 is made of acrylic resin, and therefore is adhesive, the substrate 102 and the substrate 104 are strongly bonded with each other, thereby realizing a liquid crystal display element having a uniform cell thickness, high shock resistance, and a desirable displaying quality.

Note that, for comparison, when a liquid crystal display element was manufactured by using a polyimide-type alignment layer material (product name A15417 provided by Japan Synthetic Rubber Co., Ltd.) by the processes described in the present embodiment, it was found that the bonding of the upper and lower substrates of this liquid crystal display element is (1) not as strong as that of the liquid crystal display element of the present embodiment and (2) susceptible to fracture.

Also, when the spacer 96 was formed by using an inorganic material, it was found that while the substrates can be bonded with each other if the material adopted for the alignment layer is polyamic acid resin, in the case where a polyimide-type material is adopted as the alignment layer, the substrates cannot be bonded with each other.

This indicates that by adopting polyamic acid resin which has not been imidized completely as the material of the alignment layer, it is possible to obtain a desirable bonding strength between spacers and the alignment layer, regardless of the material adopted as the spacers.

As described, the liquid crystal display element in accordance with the eighth through tenth embodiment has an arrangement wherein at least one of first and second substrates is provided with spacers, each having a wall or pillar shape, and at least the alignment layer of the first substrate is made of thermopolymerized polyamic acid resin, wherein (1) the alignment layer of the first substrate and (2) the second substrate are bonded with each other by the heating process.

In this manner, since the first and second substrates are bonded with each other by the spacer provided in the form of a wall or pillar so as to maintain a uniform spacing therebetween, compared with the method in which conventional bead spacers are scattered over the substrate, it is possible to improve the uniformity of the cell thickness and the shock resistance. Further, since the alignment layer of the first substrate is made of thermopolymerized polyamic acid resin, which is highly adhesive, the first and second substrates can be strongly bonded with each other, thereby providing a liquid crystal display element having a uniform cell thickness, high shock resistance, and a high quality displaying ability.

Alternatively, the liquid crystal display element can have an arrangement wherein the spacer is covered with the alignment layer, and the respective alignment layers of the first and second substrates are bonded with each other.

With this arrangement, it is possible to (a) prevent the alignment layer from being contaminated or damaged by a solution or a developer which are commonly used in the step of forming the spacer and (b) adopt a spacer material requiring a baking temperature higher than that of the alignment layer in the case where a baking process is required in forming the spacer, thereby permitting that a material for the spacer can be selected from a wide variety of spacer materials.

Also, the liquid crystal display element can have an arrangement wherein the spacer is provided on the alignment layer of the second substrate, and (1) the alignment layer of the first substrate and (2) the upper surface of the spacer are bonded with each other.

With this arrangement, since the alignment layer of the first substrate is made of thermopolymerized polyamic acid resin which is highly adhesive, it is possible to strongly bond the first and second substrates regardless of the material adopted as the spacer, thereby providing a liquid crystal display element having a uniform cell thickness, a high shock resistance, and a high quality displaying ability.

Further, the liquid crystal display element can have an arrangement wherein ferroelectric liquid crystal is adopted as the liquid crystal.

The ferroelectric liquid crystal, compared with, for example, nematic liquid crystal, has drawbacks in that the ferroelectric liquid crystal is not shock resistant, and that it is required to precisely uniformalize the cell thickness in order to realize a desirable displaying quality. However, in the above described arrangement, a uniform cell pressure and high shock resistance are realized; thus, such drawbacks of the ferroelectric liquid crystal are compensated, thereby making it possible to apply in practical use a liquid crystal display element adopting the ferroelectric liquid crystal having desirable characteristics.

The manufacturing method of the liquid crystal display element of the present embodiment includes the steps of (1) forming the alignment layer at least on the first substrate by applying and baking the thermopolymerized polyamic acid resin, and (2) bonding (a) the alignment layer of the first substrate and (b) the second substrate by baking.

As described, first baking is carried out when forming the alignment layer, and after carrying out the rubbing process as required, second baking is carried out in the step of combining the substrates. This permits the polyamic acid resin to be adhesive so that the first and second substrates are strongly bonded with each other, thereby providing a liquid crystal display element having a uniform cell thickness, high shock resistance, and a high quality displaying ability.

Alternatively, the manufacturing method of the liquid crystal display element can further include the step of forming the spacer in the form of a wall or pillar at least on one of the first and second substrates prior to step (1), wherein in step (1), the alignment layer made of thermopolymerized polyamic acid resin is formed, and in step (2), the respective alignment layers of the first and second substrates are bonded with each other on the upper surface of the spacer at a baking temperature higher than that in step (1).

The baking temperature and the imidization ratio are proportionally related to each other so that the imidization ratio increases as the baking temperature is increased. Thus, when the baking in step (2) (combining substrates) is carried out at a temperature higher than the baking temperature of step (1) (forming alignment layers), it is possible to promote imidization in step (2). Namely, chemical bonding due to imidization is induced when combining the substrates; thus, it is possible to obtain a higher bonding strength.

Also, in the described manufacturing method, the spacer is formed prior to the formation of the alignment layer. This makes it possible to (a) prevent the alignment layer from being contaminated or damaged by a solution or a developer which are commonly used in the step of forming the spacer and (b) adopt a spacer material requiring a baking temperature higher than that of the alignment layer in the case where a baking process is required in forming the spacer, thereby permitting that a material for the spacer can be selected from a wide variety of spacer materials.

Further, it is preferable that the described manufacturing method satisfies the inequality:

$$10 \leq b-a \leq 90$$

where "a" and "b" in the inequality respectively represent in per cent (a) imidization ratio of the thermopolymerized polyamic acid resin at the baking temperature of step (1) and (b) imidization ratio of the thermopolymerized polyamic acid resin at the baking temperature of step (2).

As described, by setting the baking temperature so that the difference between (a) the imidization ratio of "a" per cent at the baking temperature of step (1) and (b) the imidization ratio of "b" per cent at the baking temperature of step (2) is in a range of 10 per cent to 90 per cent, it is possible to obtain a desirable bonding strength. Note that, as the difference between imidization ratios become greater, the chemical bonding due to imidization of the thermopolymerized polyamic acid resin in step (2) is promoted further, thereby further improving the bonding of the first and second substrates.

In the described manufacturing method, it is preferable that the imidization ratio of the thermopolymerized polyamic acid resin at the baking temperature of step (1) is in a range of 10 per cent to 50 per cent.

As described, by providing the surface of the alignment layer with a large number of reactive groups capable of bonding even after the baking is carried out in step (1), it is possible to promote imidization in step (2), thereby further improving the bonding of the first and second substrates.

In the described manufacturing method, it is preferable that the imidization ratio of the thermopolymerized polyamic acid resin at the baking temperature of step (2) is in a range of 50 per cent to 100 per cent.

With this manufacturing method, it is possible, in step (2), to promote imidization of the alignment layer made of the thermopolymerized polyamic acid resin, thereby further improving the bonding of the first and second substrates.

In the described manufacturing method, it is possible that the baking temperatures of step (1) and step (2) are equal.

In the described manufacturing method, compared with a method in which the first baking is carried out at a temperature higher than that of the second baking, the bonding strength of the substrates is weaker. However, the first and second substrates can be bonded with each other with a bonding strength sufficient enough for a liquid crystal display element which does not require a significant mechanical strength, thereby providing a liquid crystal display element with a desirable bonding of the substrates and alignment characteristic of the liquid crystal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of manufacturing a liquid crystal display element which includes a liquid crystal sandwiched between a pair of substrates, each having at least electrodes and an alignment layer, comprising the steps of:

(a) forming along a lengthwise direction of the electrodes a spacer wall on said alignment layer on one of said pair of substrates, said spacer wall having a uniform height and a trapezoidal cross section with respect to a plane perpendicular to the lengthwise direction so that a lower surface corresponding to a longer base of the trapezoidal cross section contacts said alignment layer;

(b) applying an adhesive onto a transfer substrate;

(c) transferring said adhesive from said transfer substrate to an upper surface of said spacer wall by pressing the upper surface against said transfer substrate having said adhesive applied thereto, the upper surface of said spacer wall corresponding to a shorter base of said trapezoidal cross section; and (d) making the other of said pair of substrates adhere to said adhesive transferred to the upper surface.

2. The method of manufacturing a liquid crystal display element as defined in claim 1, wherein:

a base angle of said trapezoidal cross section is in a range of 10° to 65°.

3. The method of manufacturing a liquid crystal display element as defined in claim 1, wherein:
said spacer wall is made of a transparent and optically isotropic material.

4. The method of manufacturing a liquid crystal display element as defined in claim 1, further comprising the step of:
forming a black matrix on said one of said pair of substrates, which covers at least a region to which the lower surface of said spacer wall is projected in a direction perpendicular to a surface of said one of said pair of substrates before carrying out said step (a).

5. The method of manufacturing a liquid crystal display element as defined in claim 1, further comprising the step of:
injecting the liquid crystal between said pair of substrates along the lengthwise direction of said spacer wall after carrying out said step (d).

6. A method of manufacturing a liquid crystal display element which includes a liquid crystal sandwiched between a pair of substrates, each having at least electrodes and an alignment layer, comprising the steps of:
(a) forming along a lengthwise direction of the electrodes a spacer wall on said alignment layer on one of said pair of substrates, said spacer wall having a uniform height and a trapezoidal cross section with respect to a plane perpendicular to the lengthwise direction so that a lower surface corresponding to a longer base of the trapezoidal cross section is positioned on a side of said one of said pair of substrates;
(b) forming an alignment layer so as to cover said spacer wall;
(c) applying an adhesive onto a transfer substrate;
(d) transferring said adhesive from said transfer substrate to the alignment layer on an upper surface of said spacer wall by pressing the alignment layer on the upper surface against said transfer substrate having said adhesive applied thereto, the upper surface of said spacer wall corresponding to a shorter base of said trapezoidal cross section; and
(e) making the other of said pair of substrates adhere to said adhesive transferred to the alignment layer on the upper surface.

7. The method of manufacturing a liquid crystal display element as defined in claim 6, wherein:
a base angle of said trapezoidal cross section is in a range of 10° to 65°.

8. The method of manufacturing a liquid crystal display element as defined in claim 6, wherein:
said spacer wall is made of a transparent and optically isotropic material.

9. The method of manufacturing a liquid crystal display element as defined in claim 6, further comprising the step of:
forming a black matrix on said one of said pair of substrates, which covers at least a region to which the lower surface of said spacer wall is projected in a direction perpendicular to a surface of said one of said pair of substrates before carrying out said step (a).

10. The method of manufacturing a liquid crystal display element as defined in claim 6, further comprising the step of:
injecting the liquid crystal between said pair of substrates along the lengthwise direction of said spacer wall after carrying out said step (e).

11. A method of manufacturing a liquid crystal display element which includes a liquid crystal sandwiched between a pair of substrates, comprising the steps of:
(a) forming an alignment control layer on at least one of said pair of substrates by applying thereto thermally polymerizable polyamic acid resin and baking the thermally polymerizable polyamic acid resin so that unreacted groups remain; and
(b) connecting said pair of substrates together by baking them.

12. The method of manufacturing a liquid crystal display element as defined in claim 11, further comprising the step of:
forming a spacer in a wall or pillar shape on at least one of said pair of substrates before carrying out said step (a),
wherein in said step (a), alignment control layers made of thermally polymerizable polyamic acid resin are formed on said pair of substrates respectively, and
in said step (b), said alignment control layers formed on said pair of substrates respectively are made adhere to each other on an upper surface of said spacer by baking them at a higher baking temperature than a baking temperature in said step (a).

13. The method of manufacturing a liquid crystal display element as defined in claim 12, satisfying the condition of:

$$10 \leq b-a \leq 90,$$

wherein an imidization ratio of said thermally polymerizable polyamic acid resin at the baking temperature in said step (a) is "a" percent, and an imidization ratio of said thermally polymerizable polyamic acid resin at the baking temperature in said step (b) is "b" percent.

14. The method of manufacturing a liquid crystal display element as defined in claim 12, wherein:
said imidization ratio of said thermally polymerizable polyamic acid resin at the baking temperature in said step (a) is in a range of 10 percent to 50 percent.

15. The method of manufacturing a liquid crystal display element as defined in claim 12, wherein:
said imidization ratio of said thermally polymerizable polyamic acid resin at the baking temperature in said step (b) is in a range of from 50 percent to 100 percent.

16. The method of manufacturing a liquid crystal display element as defined in claim 11, wherein:
said baking temperature in said step (a) is equal to said baking temperature in said step (b).

17. A method of manufacturing a liquid crystal display element including a pair of substrates which are connected together via a spacer between them, comprising the steps of:
(a) forming on one of said pair of substrates said spacer in a wall or pillar shape, at least a tip portion of said spacer being made of a material which exhibits adhesive properties by a heat treatment in a state where a dissolvable layer of a material dissolvable in a predetermined solvent is laminated on the tip portion;
(b) forming an alignment control layer so as to cover said spacer and said dissolvable layer;
(c) removing said dissolvable layer together with said alignment control layer formed thereon by dissolving them in the predetermined solvent; and
(d) connecting the tip portion of said spacer and the other one of said pair of substrates at or in a vicinity of a glass transition point of the material used in the tip portion of said spacer.

18. The method of manufacturing a liquid crystal display element as defined in claim 17, wherein said step (a) includes the steps of:
(a-1) forming on said one of said pair of substrates photosensitive resin in a form of a coat as a material for use in a base portion of said spacer;

(a-2) forming on said photosensitive resin a thermoplastic adhesive in a form of a coat as a material for use in the tip portion of said spacer;

(a-3) forming on said thermoplastic adhesive a material in a form of a coat for use in said dissolvable layer; and (a-4) removing said photosensitive resin together with said thermoplastic adhesive and said dissolvable layer formed thereon from regions other than a region where said spacer is to be formed using a photolithographic method.

19. The method of manufacturing a liquid crystal display element as defined in claim 18, wherein:

said step (a-2) includes the step of dispersing onto said photosensitive resin a solvent containing fine particles of said thermoplastic adhesive dissolved therein.

20. The method of manufacturing a liquid crystal display element as defined in claim 17, further comprising the step of:

forming an insulating layer so as to cover said spacer and said dissolvable layer between said step (a) and said step (b), wherein in said step (c), said dissolvable layer is removed together with said insulating layer and said alignment control layer on said dissolvable layer by dissolving said dissolvable layer in the predetermined solvent.

21. The method of manufacturing a liquid crystal display element as defined in claim 17, wherein said step (a) includes the steps of:

forming on said one of said pair of substrates photosensitive resin in a form of a coat which exhibits adhesive properties by a heat treatment as a material for use in said spacer;

forming on said photosensitive resin a material in a form of a coat for use in said dissolvable layer; and removing said photosensitive resin together with said material for use in said dissolvable layer formed thereon from other regions than a region where said spacer is to be formed using a photolithographic method.

22. The method of manufacturing a liquid crystal display element as defined in claim 17, wherein:

in said step (a), a plurality of spacers are formed in a wall shape in parallel, said method further comprising the step of:

injecting the liquid crystal along the lengthwise direction of said spacers after carrying out said step (d).

23. A method of manufacturing a liquid crystal display element comprising:

a first step of forming photosensitive resin in a form of a coat after forming electrodes on a substrate;

a second step of dispersing either a first polymeric material having thermoplasticity or powders of the first polymeric material onto said photosensitive resin; and a third step of forming a second polymeric material in a form of a coat which is dissolvable in a predetermined solvent on said first polymeric material; and a fourth step of forming an original spacer in a stripe or pillar shape from residues of said photosensitive resin, said first polymeric material and said second polymeric material, remaining after removing them from regions other than a predetermined region;

a fifth step of laminating on said electrodes and said original spacer, either (i) an alignment control layer or (ii) an insulating layer and an alignment control layer in this order;

a sixth step of removing either (i) said alignment control layer or (ii) said insulating layer and said alignment control layer from said original spacer, by stripping said second polymeric material; and a seventh step of connecting said substrate and another substrate together by making them adhere to each other at or in a vicinity of a glass transition point of said first polymeric material.

24. The method of manufacturing a liquid crystal display element as defined in claim 23, wherein:

in said second step, said first polymeric material is not formed, and in said first step, a photosensitive resin having adhesive properties is formed in a form of a coat, and in said seventh step, said two substrates are connected together at or in a vicinity of a glass transition point of said photosensitive resin having adhesive properties.

25. A method of manufacturing a liquid crystal display element which includes a liquid crystal sandwiched between a pair of substrates, each having electrodes, comprising the steps of:

(a) forming an alignment control layer in a form of a coat on each of said pair of substrates;

(b) forming on said alignment control layer a spacer in a wall or pillar shape including an organic material having a shape memory;

(c) applying a rubbing process on said alignment control layer after said spacer is formed; and (d) applying a heat treatment at or in a vicinity of a glass transition point of said organic material after carrying out said step (c).

26. The method of manufacturing a liquid crystal display element as defined in claim 25, further comprising the step of:

injecting the liquid crystal between said pair of substrates after carrying out said step (d).

27. The method of manufacturing a liquid crystal display element as defined in claim 25, further comprising the step of:

injecting the liquid crystal between said pair of substrates before carrying out said step (d).

28. The method of manufacturing a liquid crystal display element as defined in claim 25, wherein:

in said step (b), a plurality of said spacers are formed in a wall shape in parallel, said method further comprising the step of:

injecting the liquid crystal between said pair of substrates along a lengthwise direction of said spacers.

* * * * *